United States Patent
Miller

(10) Patent No.: US 12,011,697 B2
(45) Date of Patent: *Jun. 18, 2024

(54) METHODS AND SYSTEMS FOR SPILLBACK CONTROL OF IN-LINE MIXING OF HYDROCARBON LIQUIDS

(71) Applicant: MARATHON PETROLEUM COMPANY LP, Findlay, OH (US)

(72) Inventor: Kyle E. Miller, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,280

(22) Filed: Jul. 7, 2023

(65) Prior Publication Data
US 2023/0347303 A1 Nov. 2, 2023

Related U.S. Application Data

(63) Continuation of application No. 17/566,768, filed on Dec. 31, 2021, now Pat. No. 11,752,472, which is a
(Continued)

(51) Int. Cl.
*B01F 23/40* (2022.01)
*B01F 25/53* (2022.01)
(Continued)

(52) U.S. Cl.
CPC .............. *B01F 23/49* (2022.01); *B01F 25/53* (2022.01); *B01F 35/833* (2022.01); *B01F 2025/919* (2022.01)

(58) Field of Classification Search
CPC ......... B01F 23/49; B01F 25/53; B01F 35/833
See application file for complete search history.

(56) References Cited

U.S. PATENT DOCUMENTS

| 3,504,686 A | 4/1970 | Cooper et al. |
| 3,608,869 A | 9/1971 | Woodle |

(Continued)

FOREIGN PATENT DOCUMENTS

| AU | 2010241217 | 11/2010 |
| AU | 2013202839 | 5/2014 |

(Continued)

OTHER PUBLICATIONS

Neutrik XXR-2 XX Series, https://www.parts-express.com/Neutrik-XXR-2-XX-Series-Color-Coding_Ring-Red, 2022.
(Continued)

*Primary Examiner* — Reinaldo Sanchez-Medina
(74) *Attorney, Agent, or Firm* — Womble Bond Dickinson (US) LLP

(57) ABSTRACT

Methods and systems of admixing hydrocarbon liquids from two or more sets of tanks into a single pipeline to provide in-line mixing thereof. In an embodiment of the in-line mixing system, hydrocarbon liquids stored in at least one tank of each of two or more sets of tanks positioned at a tank farm are blended into a blend flow pipe via in-line mixing and the blended mixture is pumped through a single pipeline. In one or more embodiments, the in-line mixing system employs a separate spillback or recirculation loop that is fluidly connected to each set of the two or more sets of tanks to control the flow of the hydrocarbon fluid/liquid from each set of tanks to the blend flow pipe. Associated methods of operating one or more embodiments of the system include regulation of spillback or recirculation loop flow rate and/or pressure to drive the actual blend ratio towards a desired blend ratio.

33 Claims, 23 Drawing Sheets

Related U.S. Application Data continuation of application No. 17/247,880, filed on Dec. 29, 2020, now Pat. No. 11,247,184, which is a continuation-in-part of application No. 17/247,700, filed on Dec. 21, 2020, now Pat. No. 11,774,990, and a continuation-in-part of application No. 17/247,704, filed on Dec. 21, 2020, now Pat. No. 10,990,114.

(60) Provisional application No. 63/198,356, filed on Oct. 13, 2020, provisional application No. 62/705,538, filed on Jul. 2, 2020, provisional application No. 62/954,960, filed on Dec. 30, 2019.

(51) Int. Cl.
*B01F 35/83* (2022.01)
*B01F 25/00* (2022.01)

(56) References Cited

U.S. PATENT DOCUMENTS

| | | |
|---|---|---|
| 4,320,775 A | 3/1982 | Stirling et al. |
| 4,420,008 A | 12/1983 | Shu |
| 4,488,570 A | 12/1984 | Jiskoot |
| 4,964,732 A | 10/1990 | Cadeo et al. |
| 5,050,064 A | 9/1991 | Mayhew |
| 5,469,830 A | 11/1995 | Gonzalez |
| 5,533,912 A | 7/1996 | Fillinger |
| 5,873,916 A | 2/1999 | Cemenska et al. |
| 5,962,774 A | 10/1999 | Mowry |
| 5,993,054 A | 11/1999 | Tan et al. |
| 6,050,844 A | 4/2000 | Johnson |
| 6,186,193 B1 | 2/2001 | Phallen et al. |
| 6,383,237 B1 | 5/2002 | Langer et al. |
| 6,427,384 B1 | 8/2002 | Davis, Jr. |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 7,032,629 B1 | 4/2006 | Mattingly et al. |
| 7,631,671 B2 | 12/2009 | Mattingly et al. |
| 7,749,308 B2 | 7/2010 | McCully |
| 7,810,988 B2 | 10/2010 | Kamimura et al. |
| 8,282,265 B2 | 10/2012 | Breithhaupt |
| 8,597,380 B2 | 12/2013 | Buchanan |
| 8,632,359 B2 | 1/2014 | Grimm |
| 8,748,677 B2 | 6/2014 | Buchanan |
| 9,038,855 B2 | 5/2015 | Lurcott et al. |
| 9,162,944 B2 | 10/2015 | Bennett et al. |
| 9,388,350 B2 | 7/2016 | Buchanan |
| 9,643,135 B1 | 5/2017 | Mazzei et al. |
| 10,833,434 B1 | 11/2020 | Tassell, Jr. |
| 10,990,114 B1 | 4/2021 | Miller |
| 11,132,008 B2 | 9/2021 | Miller |
| 11,247,184 B2 | 2/2022 | Miller |
| 11,416,012 B2 | 8/2022 | Miller |
| 11,559,774 B2 | 1/2023 | Miller |
| 11,565,221 B2 | 1/2023 | Miller |
| 11,596,910 B2 | 3/2023 | Miller |
| 11,607,654 B2 | 3/2023 | Miller |
| 11,662,750 B2 | 5/2023 | Miller |
| 11,752,472 B2 | 9/2023 | Miller |
| 11,794,153 B2 | 10/2023 | Miller |
| 11,920,504 B2 | 3/2024 | Thobe |
| 11,965,317 B2 | 4/2024 | Jordan |
| 2002/0178806 A1 | 12/2002 | Valentine |
| 2003/0041518 A1 | 3/2003 | Wallace et al. |
| 2003/0158630 A1 | 8/2003 | Pham et al. |
| 2003/0227821 A1 | 12/2003 | Bae et al. |
| 2004/0057334 A1 | 3/2004 | Wilmer et al. |
| 2004/0125688 A1 | 7/2004 | Kelley et al. |
| 2004/0249105 A1 | 12/2004 | Nolte et al. |
| 2005/0058016 A1 | 3/2005 | Smith et al. |
| 2005/0150820 A1 | 7/2005 | Guo |
| 2006/0278304 A1 | 12/2006 | Mattingly et al. |
| 2007/0175511 A1 | 8/2007 | Doerr |
| 2008/0115834 A1 | 5/2008 | Geoffrion et al. |
| 2009/0175738 A1 | 7/2009 | Shaimi |
| 2009/0188565 A1 | 7/2009 | Satake |
| 2010/0031825 A1 | 2/2010 | Kemp |
| 2013/0048094 A1 | 2/2013 | Ballantyne |
| 2014/0194657 A1 | 7/2014 | Wadhwa et al. |
| 2016/0091467 A1 | 3/2016 | Morris |
| 2017/0131728 A1 | 5/2017 | Lambert et al. |
| 2017/0248569 A1 | 8/2017 | Lambert et al. |
| 2017/0259229 A1 | 9/2017 | Chou et al. |
| 2017/0326474 A1 | 11/2017 | Olovsson |
| 2018/0002617 A1 | 1/2018 | Umansky et al. |
| 2018/0223202 A1 | 8/2018 | Fransham et al. |
| 2018/0312391 A1 | 11/2018 | Borg |
| 2019/0121373 A1 | 4/2019 | Panigrahi |
| 2019/0338203 A1 | 11/2019 | Umansky et al. |
| 2019/0359899 A1 | 11/2019 | Umansky et al. |
| 2021/0197151 A1 | 7/2021 | Miller |
| 2021/0232163 A1 | 7/2021 | Miller |
| 2022/0001969 A1 | 1/2022 | Pugnetti |
| 2022/0401899 A1 | 12/2022 | Miller |
| 2023/0129513 A1 | 4/2023 | Miller |
| 2023/0333577 A1 | 10/2023 | Miller |
| 2023/0333578 A1 | 10/2023 | Miller |
| 2023/0347303 A1 | 11/2023 | Miller |
| 2023/0415106 A1 | 12/2023 | Miller |
| 2024/0060189 A1 | 2/2024 | Ell |

FOREIGN PATENT DOCUMENTS

| | | |
|---|---|---|
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 106764463 | 1/2019 |
| CN | 110513604 | 11/2019 |
| CN | 210176958 | 3/2020 |
| CN | 111537157 | 8/2020 |
| CN | 114001278 | 2/2022 |
| CN | 114877263 | 4/2023 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| KR | 20110010316 | 2/2011 |
| KR | 20130038986 | 4/2013 |
| KR | 102129951 | 7/2020 |
| KR | 102169280 | 10/2020 |
| KR | 102281640 | 7/2021 |
| RU | 2760879 | 12/2021 |
| WO | 1996006685 | 5/1996 |

(56) References Cited

FOREIGN PATENT DOCUMENTS

| | | |
|---|---|---|
| WO | 1997006004 | 2/1997 |
| WO | 1997006298 | 2/1997 |
| WO | 1998003711 | 1/1998 |
| WO | 2000063108 | 10/2000 |
| WO | 2002030551 | 4/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |
| WO | 2010042704 | 4/2010 |
| WO | 2010103260 | 9/2010 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2023287276 | 1/2023 |
| WO | 2023038579 | 3/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
Lloyd's Register, Using technology to trace the carbon intensity of sustainable marine fuels, Feb. 15, 2023.
Skelton et al., Onboard Refueling Vapor Recovery Systems Analysis of Widespread Use,Nescaum, Boston MA, Aug. 20, 2007.
Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.

METHODS AND SYSTEMS FOR SPILLBACK CONTROL OF IN-LINE MIXING OF HYDROCARBON LIQUIDS

CROSS-REFERENCE TO RELATED APPLICATIONS

The present application is a Continuation of U.S. application Ser. No. 17/566,768, filed Dec. 31, 2021, titled "METHODS AND SYSTEMS FOR INLINE MIXING OF HYDROCARBON LIQUIDS BASED ON DENSITY OR GRAVITY", which is a Continuation of U.S. application Ser. No. 17/247,880, filed Dec. 29, 2020, titled "METHODS AND SYSTEMS FOR INLINE MIXING OF HYDROCARBON LIQUIDS BASED ON DENSITY OR GRAVITY", now U.S. Pat. No. 11,247,184, issued Feb. 15, 2022, which is a Continuation-in-Part of U.S. application Ser. No. 17/247,700, filed Dec. 21, 2020, titled "METHODS AND SYSTEMS FOR INLINE MIXING OF HYDROCARBON LIQUIDS BASED ON DENSITY OR GRAVITY", which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", and, the disclosures of which are incorporated herein by reference in their entirety. U.S. application Ser. No. 17/247,880 is further a Continuation-in-Part of U.S. application Ser. No. 17/247,704, filed Dec. 21, 2020, titled "METHODS AND SYSTEMS FOR INLINE MIXING OF HYDROCARBON LIQUIDS", now U.S. Pat. No. 10,990,114, issued Apr. 27, 2021, which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entirety.

FIELD OF DISCLOSURE

The disclosure herein relates to systems and methods for providing in-line mixing of hydrocarbon liquids, and one or more embodiments of such systems and methods may be suitable for providing multi-component mixing of two or more hydrocarbon liquids.

BACKGROUND

Different types of hydrocarbon liquids, such as petroleum and renewable liquid products (e.g., such as crude oil), are often mixed upstream of a refinery to reduce the viscosity of heavy crude and maximize capacity, or to create a desired set of properties (TAN, sulfur, etc.). Given the multitude of crude types, the potential mixtures and component ratios are numerous. In some situations, multiple different types of hydrocarbon liquids, e.g., crude oil and renewable products, from different tanks may need to be mixed in a particular ratio. Further, there may also be a need to create a desired mixture on demand and ship the mixture through a pipeline as one homogenous product. In such examples, the mixing of different types of hydrocarbon liquid, e.g., crude and renewable liquid, may be performed at a pipeline origination station. Often, the pipeline origination station may include a tank farm (e.g., having multiple tanks for storage and mixing of the crude oils) and extensive piping capable of transporting hydrocarbon liquids from each of the tanks to one or more mainline booster pumps, which raise the hydrocarbon liquids to high pressures for traveling on a long pipeline.

Historically, crude mixing occurred by blending the crude oils in one or more tanks. Tank mixing is the most common form of crude mixing in the oil and gas industry. While relatively inexpensive, such methods have several undesirable drawbacks. For example, the extent and/or accuracy of the mixing may be less precise (e.g., having an error rate of +/−about 10% based on a target set point). Such methods typically require an entire tank to be dedicated to blending the crude oils along with separate distribution piping therefrom. In addition, the mixed crude product tends to stratify in the tank without the use of tank mixers, which also require additional capital investment. Further, the mixed crude product is generally limited to a 50/50 blend ratio.

An alternative to tank mixing is parallel mixing, which uses two pumps to pump two controlled feed streams (e.g., one pump per feed stream) on demand from separate tanks and into the pipeline. While parallel mixing is typically more precise than tank mixing, it is also more difficult to control because both streams are pumped by booster pumps into a common stream. Typically, the two pumped streams are individually controlled by variable speed pumps or pumps with flow control valves; therefore, the two sets of independent controls may interfere with each other and/or may have difficulty reaching steady state if not programmed correctly.

Applicant has recognized, however, that in parallel mixing operations, both streams need to be boosted to about 50-200 psi of pressure in the tank farm to provide adequate suction pressure to a mainline booster pump that is positioned downstream of the boosters. Even if one stream operates at a fixed flow while the other varies, the need to boost the pressure of each stream to about 50-200 psi may require high horsepower boost pumps dedicated to each line. Such dedicated pumps may be needed to supply streams at adequate pressure to the mainline pumps and may require significant capital investment. From a commercial standpoint, for example, parallel mixing operations require much more infrastructure, representing a 180% to 200% increase in cost difference compared to the in-line mixing systems disclosed herein. Therefore, there is a need in the industry for accurate and cost-effective blending methods and systems for crude and other hydrocarbon liquid products.

SUMMARY

The disclosure herein provides embodiments of systems and methods for in-line fluid mixing of hydrocarbon liquids. In particular, in one or more embodiments, the disclosure provides in-line mixing systems that may be positioned at a tank farm, including at two or more sets of tanks positioned to each store one or more hydrocarbon liquids. Such an embodiment of an in-line mixing system is positioned to admix two or more of those hydrocarbon liquids contained within the two or more sets of tanks to provide a blended mixture within a single pipeline. In some embodiments, the systems and methods of the disclosure may provide for in-line mixing of at least two hydrocarbon liquids, at least three hydrocarbon liquids, or more to form a blended fluid flow in a single pipeline, e.g., which may be referred to herein as two-component blend, three-component blends, or a blend containing more than three hydrocarbon liquids.

In one or more embodiments, an in-line fluid mixing system may be positioned at a tank farm to admix hydrocarbon liquids from a plurality of tanks into a single pipeline. The in-line fluid mixing system may comprise a first set of tanks positioned at a tank farm with at least one tank containing a hydrocarbon fluid therein. Each tank in the first set of tanks may be connected to and in fluid communication with a first header. The first header may be configured to transport a flow of one or more hydrocarbon fluids from the first set of tanks as a first fluid. The system may include a second set of tanks positioned at the tank farm with at least one tank containing a hydrocarbon fluid therein. Each tank in the second set of tanks may be connected to and in fluid communication with a second header. The second header may be configured to transport a flow of one or more hydrocarbon fluids from the second set of tanks as a second fluid. The system may include a first pump having an inlet and an outlet. The outlet of the first pump may be connected to a first booster pipe. The inlet of the first pump may be connected to the first header to increase pressure of hydrocarbon fluid flow therethrough. The system may include a first meter connected to the first booster pipe and configured to measure a first flow rate. The system may include a first spillback pipe having a first connection to the first booster pipe between the first meter and the first pump and a second connection to the first header upstream of the first set of tanks. The first spillback pipe may include a first control valve disposed therein. The first control valve may be configured to adjust a flow rate of hydrocarbon flow through the first spillback pipe between the first booster pipe and the first header. The system may include a second pump having an inlet and an outlet. The outlet of the second pump may be connected to a second booster pipe and the inlet of the second pump may be connected to the second header to increase pressure of hydrocarbon fluid flow therethrough. The system may include a second spillback pipe having a first connection to the second booster pipe downstream of the second pump and a second connection to the second header upstream of the second set of tanks. The second spillback pipe may include a second control valve disposed therein, with the second control valve configured to adjust a flow rate of hydrocarbon flow through the second spillback pipe between the second booster pipe and the second header. The system may include a blend pipe configured to admix hydrocarbon fluid that flows from the first booster pipe downstream of the first meter with hydrocarbon fluid that flows from the second booster pipe downstream of the first connection of the second spillback pipe in order to create a blend flow. The system may include a blend meter connected to the blend pipe that measures flow rate of the blend flow through the blend pipe.

Another embodiment may include a method of admixing hydrocarbon liquids from a plurality of sets of tanks into a single pipeline to provide in-line mixing thereof. The method may include initiating a blending process. The blending process may include blending two or more hydrocarbon liquids over a period of time. At least one of the two or more hydrocarbon liquids may be stored in a tank of a first set of tanks and at least another of the two or more hydrocarbon liquids being stored in a tank of a second set of tanks. Each tank of the first and second sets of tanks may be connected, via one or more pipes, to a blend pipe that is configured to blend the two or more hydrocarbon liquids into a blended hydrocarbon liquid. The method may include determining a density of each of the two or more hydrocarbon liquids to be blended during the blending process. Upon initiation of the blending process, the method may include determining a first flow rate of hydrocarbon liquids that flow from the first set of tanks into the blend pipe. The method may include determining a blend flow rate of the blended hydrocarbon liquid in the blend pipe. The method may include determining a second flow rate of hydrocarbon liquids that flow from the second set of tanks into the blend pipe. The method may include determining a first spillback flow rate of a flow of hydrocarbon liquids from the first set of tanks that is recirculated in a first spillback loop positioned upstream of the blend pipe. The determining the first spillback flow rate may be based on a function of density of the hydrocarbon liquids flowing from the first set of tanks, a differential pressure upstream and downstream of a first flow control valve disposed in the first spillback loop, and one or more control valve characteristics. The method may include determining a second spillback flow rate of a flow of hydrocarbon liquids from the second set of tanks that is recirculated in a second spillback loop positioned upstream of the blend pipe. The determining the second spillback flow rate may be based on a function of density of the hydrocarbon liquids flowing from the second set of tanks, a differential pressure upstream and downstream of a second flow control valve disposed in the second spillback loop, and one or more control valve characteristics. In response to a difference between a target ratio and a ratio of the first flow rate and the second flow rate, the method may include determining ratio adjustments for the first flow rate relative to the second flow rate. The method may include adjusting the first flow control valve based on the ratio adjustments to modify the first spillback flow rate thereby adjusting the first flow rate to drive the ratio towards the target ratio.

Another embodiment may include a controller for an in-line mixing system for admixing hydrocarbon liquids from a plurality of sets of tanks into a single pipeline via spillback loops. The controller may include a user interface input/output in signal communication with a user interface. The controller may be configured to, in relation to the user interface, receive a target blend ratio of a first liquid to a second liquid, receive a first density of the first liquid, and receive a second density of the second liquid. The controller may include a first input in signal communication with a first meter to measure a first flow rate of the first liquid. The first meter may be connected to a first pipe that is connected to a first set of tanks of a tank farm. One or more tanks of the first set of tanks may be configured to store the first liquid of the first density and to transfer the first liquid from the first set of tanks through the first pipe. The controller may be configured to obtain the first flow rate from the first meter via the first input after initiation of the blending operation. The controller may include a second input in signal communication with a blend meter connected to a blend pipe to measure a blend flow rate of a blended liquid with the blended liquid being the first liquid entering the blend pipe from the first set of tanks and the second liquid entering the blend pipe from a second set of tanks. The blend pipe may be connected to the first set of tanks via the first pipe and to the second set of tanks via a second pipe. One or more tanks of the second set of tanks may be configured to store the second liquid of the second density and to transfer the second liquid from the second set of tanks through the second pipe. The controller may be configured to obtain the blend flow rate from the blend meter via the second input after initiation of the blending operation. The controller may include a first input/output in signal communication with a first flow control device. The first flow control device may be designed to adjust recirculation of the first liquid via a first spillback pipe connected to the first pipe and positioned upstream of the blend pipe, thereby modifying the first flow rate. The controller may be configured to, in relation to the first input/output and after initiation of the blending operation, determine whether the first flow rate is to be modified based on at least two of the first flow rate, the blend flow rate, or the target blend ratio. In response to a determination that the first flow rate is to be modified, the controller may adjust an open percentage of the first flow control valve that adjusts recirculation of the first liquid via the first spill back pipe, thereby modifying the first flow rate. The controller may include a second input/output in signal communication with a second flow control device. The second flow control device may be designed to adjust recirculation of the second liquid via a second spillback pipe connected to the second pipe and positioned upstream of the blend pipe. The controller may be configured to, in relation to the second input/output and after initiation of the blending operation, determine whether flow of the second liquid into the blend pipe is to be modified based on at least two of the first flow rate, the blend flow rate, or the target blend ratio. The controller may, in response to a determination that flow of the second liquid into the blend pipe is to be modified, adjust the open percentage of the second flow control valve that adjusts recirculation of the second liquid via the second spill back pipe, thereby modifying flow of the second liquid into the blend pipe.

Another embodiment may include a method of admixing hydrocarbon liquids from a plurality of sets of tanks into a single pipeline to provide in-line mixing thereof. The method may include initiating a blending process that includes blending two or more hydrocarbon liquids over a period of time. At least one of the two or more hydrocarbon liquids may be stored in a tank of a first set of tanks. At least another of the two or more hydrocarbon liquids may be stored in a tank of a second set of tanks. Each tank of the first and second sets of tanks may be connected, via one or more pipes, to a blend pipe. The blend pipe may be configured to blend the two or more hydrocarbon liquids into a blended hydrocarbon liquid. The method may include determining a density of each of the two or more hydrocarbon liquids to be blended during the blending process. Upon initiation of the blending process, the method may include determining a first flow rate of hydrocarbon liquids flowing from the first set of tanks into the blend pipe. The method may further include determining a blend flow rate of the blended hydrocarbon liquid in the blend pipe. The method may include determining a second flow rate of hydrocarbon liquids flowing from the second set of tanks into the blend pipe. The method may include passing a first portion of hydrocarbon liquids from the first set of tanks through a first spillback loop positioned upstream of the blend pipe. An amount of the first portion of hydrocarbon liquids may be controlled by a first flow control valve disposed in the first spillback loop. The method may include passing a second portion of hydrocarbon liquids from the second set of tanks through a second spillback loop positioned upstream of the blend pipe. An amount of the second portion of hydrocarbon liquids may be controlled by a second flow control valve disposed in the second spillback loop. In response to a difference between a target ratio and a ratio of the first flow rate and the second flow rate, the method may include determining ratio adjustments for the first flow rate relative to the second flow rate. The method may include adjusting the first flow control valve based on the ratio adjustments to modify the amount of the first portion of hydrocarbon liquids thereby adjusting the first flow rate to drive the ratio towards the target ratio.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1:
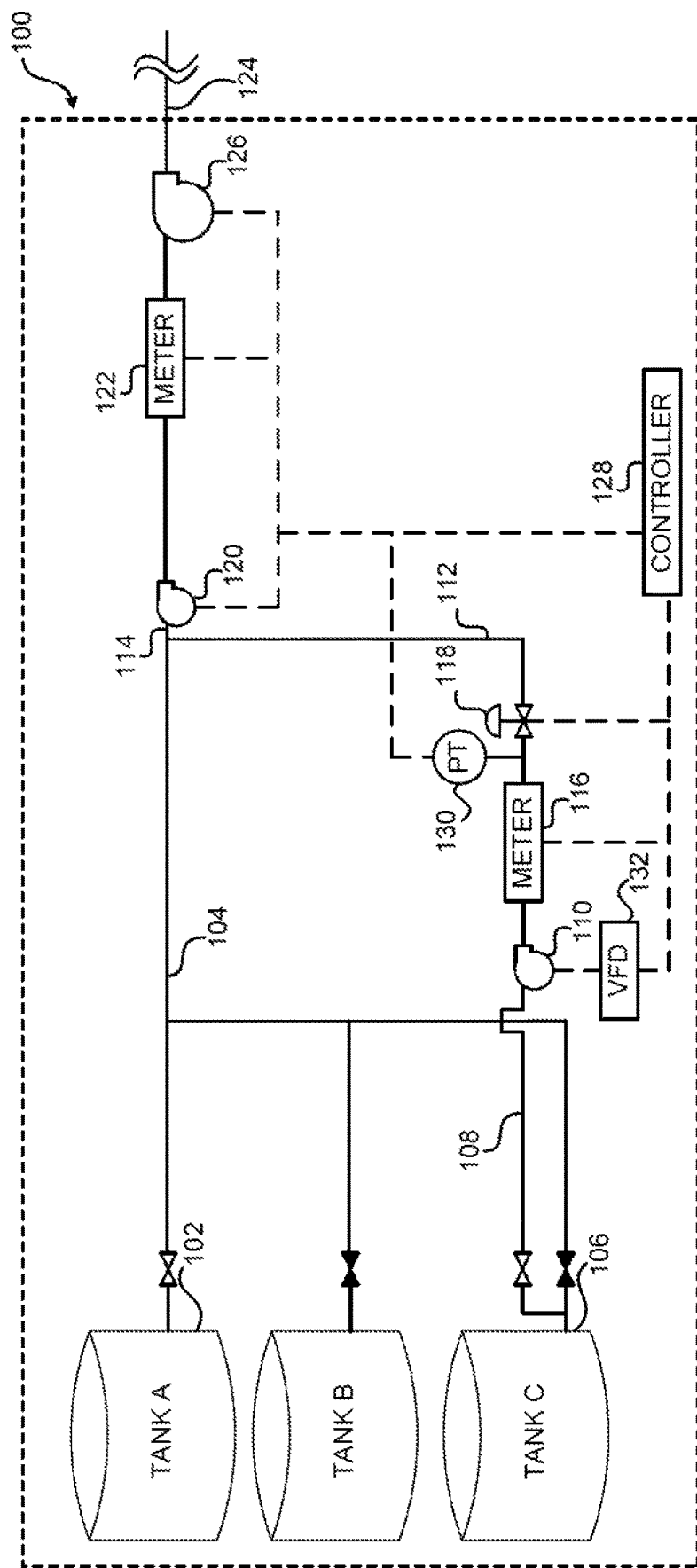
FIG. 1 is a schematic diagram of a two-component in-line mixing system positioned at a tank farm to admix two hydrocarbon liquids from separate tanks into a single pipeline according to an embodiment of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure provides embodiments of systems and methods for in-line fluid mixing of hydrocarbon liquids. "Hydrocarbon liquids" as used herein, may refer to petroleum liquids, renewable liquids, and other hydrocarbon based liquids. "Petroleum liquids" as used herein, may refer to liquid products containing crude oil, petroleum products, and/or distillates or refinery intermediates. For example, crude oil contains a combination of hydrocarbons having different boiling points that exists as a viscous liquid in underground geological formations and at the surface. Petroleum products, for example, may be produced by processing crude oil and other liquids at petroleum refineries, by extracting liquid hydrocarbons at natural gas processing plants, and by producing finished petroleum products at industrial facilities. Refinery intermediates, for example, may refer to any refinery hydrocarbon that is not crude oil or a finished petroleum product (e.g., such as gasoline), including all refinery output from distillation (e.g., distillates or distillation fractions) or from other conversion units. In some non-limiting embodiments of systems and methods, petroleum liquids may include heavy blend crude oil used at a pipeline origination station. Heavy blend crude oil is typically characterized as having an American Petroleum Institute (API) gravity of about 30 degrees or below. However, in other embodiments, the petroleum liquids may include lighter blend crude oils, for example, having an API gravity of greater than 30 degrees. "Renewable liquids" as used herein, may refer to liquid products containing plant and/or animal derived feedstock. Further, the renewable liquids may be hydrocarbon based. For example, a renewable liquid may be a pyrolysis oil, oleaginous feedstock, biomass derived feedstock, or other liquids, as will be understood by those skilled in the art. The API gravity of renewable liquids may vary depending on the type of renewable liquid.

In particular, in one or more embodiments, the disclosure provides an in-line mixing system that may be positioned at a tank farm that includes a plurality of tanks configured to store one or more hydrocarbon liquids. Such an in-line mixing system may provide admixing of two or more of those hydrocarbon liquids contained within the plurality of tanks to provide a blended mixture within a single pipeline. In some embodiments, the systems and methods of the disclosure may provide for in-line mixing of at least two hydrocarbon liquids, at least three hydrocarbon liquids, or more than three hydrocarbon liquids to form a blended fluid flow in a single pipeline, e.g., which may be referred to herein as two-component blends, three-component blends, or a blend containing more than three hydrocarbon liquids. Advantageously, in-line mixing operations (sometimes referred to as "series mixing") may utilize one or more controlled, tank output streams (e.g., controlled via a low horsepower mixing booster pump and flow control valve) and a gravity-fed stream, all of which are upstream of a common booster pump used to pump a blended fluid stream through a pipeline. Further, the in-line mixing system may include sensors, disposed throughout the tank farm, to determine density or gravity, allowing for the in-line mixing system to blend the hydrocarbon liquids according to a target blend density or gravity, providing a precisely blended fluid or liquid stream.

In some embodiments, the systems and methods as described herein may provide for in-line, on-demand, blending of crude oil, other hydrocarbon liquids, and/or renewable liquids at a pipeline origination station. A pipeline origination station is typically located at or near a tank farm (e.g., having a plurality of tanks containing hydrocarbon liquids). The pipeline origination station includes extensive piping capable of transporting the hydrocarbon liquids from each of the nearby tanks in the tank farm to one or more mainline booster pumps, which raise the hydrocarbon liquids to very high pressures for passage through the long pipeline. A "tank farm" as used herein, refers to a plurality of tanks positioned in an area, each of the plurality of tanks configured to hold one or more hydrocarbon liquids therein. In some embodiments, the plurality of tanks may be positioned proximate to each other or the plurality of tanks may be spread out across a larger area. In some embodiments, the plurality of tanks may be positioned sequentially such that each tank is equally spaced apart. Generally, the number of individual tanks in a tank farm may vary based on the size of the pipeline origination station and/or based on the amount of hydrocarbon liquids being stored in that facility. For example, the tank farm may include at least 2, at least 4, at least 6, at least 8, at least 10, at least 12, or more individual tanks within the tank farm.

As noted above, typical pipeline origination stations require blending of two or more different hydrocarbon liquids in a blending tank prior to pumping the blended hydrocarbon liquids from the blending tank itself. However, the systems and methods of this disclosure advantageously provide in-line, on-demand mixing directly in a pipe in the tank farm prior to the blended liquid being pumped to the pipeline. Such pipe blending may eliminate stratification of mixed oil in tanks and does not require the use of individual tank mixers in each of the tanks. These systems and methods may also eliminate the need to mix the hydrocarbon liquids in one or more tanks before the hydrocarbon liquids are pumped therefrom, which advantageously allows for the changing of the blend on-demand and on-demand blending during operation of the pipeline origination station. In some embodiments, for example, a separate blending tank in the tank farm is not necessary, and thus, one or more tanks in the tank farm previously used for blending may beneficially be used for storage of additional hydrocarbon liquids, which may also be blended in-line. Further, basing blending operations on gravity measurements may increase accuracy and precision of blending. While a blending operation constantly or continuously checking gravity and adjusting may produce a less accurate blend, due to the lagging nature of gravity adjustments versus flow rate, checking the gravity and adjusting flow rates at specified time intervals (for example, 10 to 20 minute intervals) may allow for an accurate and precise blend. Further, adjusting while continuing a blending operation or process ensures an accurate and precise blend, as well as a blend produced in the same amount of time as a typical blending operation. Further still, such gravity measuring and adjusting systems may include little additional equipment (e.g., flow meters included in the tank farm may be Coriolis meters or density or gravity sensors may be added near the meter or to a pipe or tank).

Other typical pipeline origination stations may use parallel mixing of two or more hydrocarbon liquids, which may be expensive and of lower efficiency. In particular, typical parallel mixing operations require a dedicated high horsepower mixing booster pump (e.g., greater than 750 hp, greater than 850 hp, greater than 950 hp or even greater than 1050 hp) for each of the mixing streams and an additional static mixer to blend the hydrocarbon liquids pumped through each of the mixing streams. However, the systems and methods of this disclosure advantageously provide cost and energy savings, because such systems and methods do not require high horsepower mixing booster pumps or the additional static mixer. For example, the mixing booster pumps typically used in the mixing streams of the systems and methods described herein typically have lower horsepower ratings (e.g., less than 250 hp, less than 200 hp, less than 150 hp, or even less than 100 hp). In addition, the in-line mixing systems, according to this disclosure, may eliminate the need for two or more variable speed pumps and/or control valves (i.e., one for each of the streams), because as further disclosed herein, one stream may be gravity-fed from the tank and thus controls itself in physical response to the other controlled, tank output stream(s). Further, in-line mixing systems as described herein may provide for more accurate control of blended hydrocarbon liquids, for example, within 1.0 percent or less of the desired set point (e.g., desired flow rate and/or density or gravity) for the blended fluid flow.

FIG. 1 depicts a process diagram of a non-limiting, two-component in-line mixing system according to one or more embodiments of the disclosure. In particular, FIG. 1 illustrates a two component in-line mixing system 100 positioned at a tank farm (e.g., as depicted by the dashed rectangular box in FIG. 1) to admix two hydrocarbon liquids from separate tanks into a single pipeline to provide a two-component blended fluid flow. As shown in FIG. 1, the two-component in-line mixing system includes a first tank 102 (e.g., tank A) positioned in a tank farm and containing a first fluid therein. Generally, the first fluid includes one or more hydrocarbon liquids, of a first density or gravity, as defined herein above and as would be understood by a person of skill in the art. In some embodiments, the first tank 102 may have a first output pipe 104 connected to the first tank 102 proximate a bottom portion thereof and the first output pipe 104 may be in fluid communication with the first fluid to transport a flow of the first fluid from the first tank 102 through the first output pipe 104 at a first pressure. In some embodiments, the first pressure may be in the range of about 0.1 pound per square inch (psi) to about 100 psi, about 0.5 psi to about 50 psi, or about 1 psi to about 10 psi. In some embodiments, the first pressure may be less than about 20 psi, less than about 10 psi, less than about 5 psi, or less than about 1 psi. In some embodiments, the first pressure results from force of gravity on the first fluid contained in the first tank. For example, gravity rather than a pump transports the flow of the first fluid from the first tank and through the first outlet pipe. An outlet pipe having a pressure that results from force of gravity, and not by a pump, may be referred to herein as a "gravity-fed" line.

In one or more embodiments, the two-component in-line mixing system may include a second tank 106 (e.g., tank C) positioned in the tank farm and containing a second fluid therein. Generally, the second fluid includes one or more hydrocarbon liquids, of a second density or gravity, as defined herein above and as would be understood by a person of skill in the art. In some embodiments, the second tank 106 may have a second output pipe 108 connected to the second tank 106 proximate a bottom portion thereof and the second output pipe 108 may be in fluid communication with the second fluid to transport a flow of the second fluid from the second tank 106 through the second output pipe 108 at a second pressure. In some embodiments, the second pressure may be in the range of about 0.1 pound per square inch (psi) to about 100 psi, about 0.5 psi to about 50 psi, or about 1 psi to about 10 psi. In some embodiments, the second pressure may be less than about 20 psi, less than about 10 psi, less than about 5 psi, or less than about 1 psi. Similar to the first pressure, the second pressure also results from force of gravity on the second fluid contained in the second tank. For example, gravity rather than a pump transports the flow of the second fluid from the second tank and through the second outlet pipe.

In one or more embodiments, two-component in-line mixing systems as described herein may include a first pump 110 having an inlet and an outlet. For example, the inlet of the first pump 110 may be connected to the second output pipe 108 to increase pressure of the flow of the second fluid from the second pressure to a pump pressure at the outlet. In some embodiments, the pump pressure at the outlet of the first pump may be in the range of about 1 psi to about 100 psi, about 10 psi to about 50 psi, or about 25 psi to about 35 psi. In some embodiments, the pump pressure at the outlet of the first pump may be at least about 10 psi, at least about 20 psi, at least about 30 psi, at least about 40 psi, at least about 50 psi, or higher. Further, this first pump 110 may have a horsepower between 1 hp and 500 hp, between 50 and 250 hp or between 125 hp and 175 hp. In such embodiments, the first pump 110 may have a horsepower of 500 hp or less, 400 hp or less, 300 hp or less, 200 hp or less, 100 hp or less, and lower. Generally, the pump pressure at the outlet of the first pump is greater than the second pressure in the second output pipe. In some embodiments, in-line mixing systems as described herein may include a variable speed drive (VFD) 132 connected to the first pump 110 to control pump speed to thereby adjust the flow of the second fluid through the first pump. Generally, variable speed drives, which may also be referred to as adjustable speed drives, are devices that may vary the speed of a normally fixed speed motor and/or pump based on feedback from one or more control components. The specific type of variable speed drive may vary as would be understood by a person of skill in the art.

As depicted in FIG. 1, in some embodiments, two-component in-line mixing systems as described herein may include a mixing booster pipe 112 connected to the outlet of the first pump 110 to transport the flow of the second fluid therethrough. In some embodiments, a blended fluid pipe 114 may be connected to and in fluid communication with the first output pipe 104 and the mixing booster pipe 112 to admix the flow of first fluid at the first pressure and the flow of second fluid into a blended fluid flow. In one or more embodiments, the pump pressure of the second fluid may be about equal to pressure of the first fluid at the portion of the blended fluid pipe 114 configured to admix the flow of first fluid and the flow of second fluid into a blended fluid flow. In some embodiments, a tank flow meter 116 may be connected to the mixing booster pipe 112 and positioned between the first pump 110 and the blended fluid pipe 114 to measure flow rate of the flow of the second fluid between the first pump 110 and the blended fluid pipe 114. The tank flow meter 116 may be a turbine flow meter or another type of flow meter as would be known to those skilled in the art. Generally, the tank flow meter may provide flow readings in the form of barrels per hour of hydrocarbon liquids. In another embodiment the tank flow meter 116 may include a sensor or functionality to measure a density or gravity of the liquid (e.g., a mass flow meter or other meter as will be understood by those skilled in the art). In certain embodiments, a flow control valve 118 may also be connected to the mixing booster pipe 112 between the tank flow meter 116 and the blended fluid pipe 114 to control flow of the second fluid between the first pump 110 and the blended fluid pipe 114. In some embodiments, a pressure sensor/transducer 130 may also be connected to the mixing booster pipe 112 and positioned upstream of the flow control valve 118. In some embodiments, for example, the pressure sensor/transducer 130 may be connected to the mixing booster pipe 112 proximate the tank flow meter 116. The pressure sensor/transducer 130 may be configured to measure the back pressure at the flow control valve. Any type of pressure sensor/transducer may be used to measure the back pressure at the flow control valve as would be understood by a person of skill in the art.

In one or more embodiments, two-component in-line mixing systems as described herein may include a second pump 120 having an inlet in fluid communication with the blended fluid pipe 114 and an outlet. Generally, the second pump 120 will have a greater horsepower than the first pump 110 and thus, the pump pressure at the outlet of the second pump may be greater than the pump pressure at the outlet of the first pump as noted above. In some embodiments, for example, the pump pressure at the outlet of the second pump may be in the range of about 50 psi to about 500 psi, about 100 psi to about 300 psi, or about 150 psi to about 200 psi. In some embodiments, the pump pressure at the outlet of the second pump may be at least about 50 psi, at least about 100 psi, at least about 150 psi, at least about 200 psi, or higher. Further, this second pump 120 may have a horsepower between 250 hp and 2,500 hp, between 500 and 2,000 hp or between 750 hp and 1,500 hp. In such embodiments, the second pump 120 may have a horsepower of as much as 250 hp, 500 hp, 750 hp, 1,000 hp, 1,250 hp, 1,500 hp or more. The second pump 120 is positioned relative to the first pump 110 and the first tank 102 such that the pressure in the blended fluid pipe 114 at the inlet or suction of the second pump 120 is sufficiently high to preclude cavitation within the second pump 120. Generally, the pump pressure at the outlet of the second pump 120 is considerably higher than the pressure at the outlet of the first pump 110 to ramp up the pressure of the blended fluid flow prior to transfer to the pipeline.

In some embodiments, two-component in-line mixing systems as described herein may include a booster flow meter 122 in fluid communication with the blended fluid pipe 114 to measure total flow rate of the blended fluid flow transported through the blended fluid pipe 114. The booster flow meter 122 may be a turbine flow meter or another type of flow meter as would be known to those skilled in the art. Generally, the booster flow meter 122 may provide flow readings in the form of barrels per hour of hydrocarbon liquids. In another embodiment the booster flow meter 122 may include a sensor or functionality to measure a density or gravity of the blended fluid or liquid (e.g., a mass flow meter or other meter as will be understood by those skilled in the art). In some embodiments, the in-line mixing systems as described herein may include a pipeline 124 connected to the outlet of the second pump 120 to transport the blended fluid flow therethrough and away from the tank farm, e.g., to a pipeline origination station. In one or more embodiments, the in-line mixing systems described herein and shown in FIG. 1, may optionally include a third pump 126 positioned between the outlet of the second pump 120 and the pipeline 124. The third pump 126 is thus arranged to be in fluid communication with the outlet of the second pump 120, the booster flow meter 122, and the pipeline 124. Generally, the third pump 126 will have a greater horsepower and a greater outlet pump pressure than either of the first pump 110 and the second pump 120 in order to transport the blended fluid flow at much higher pressures through the pipeline 124. Such higher pressures are generally required for pumping the blended fluid flow along long pipelines before reaching a final destination. For example, such pipelines may be in excess of hundreds of miles in length. In some embodiments, the pump pressure at the outlet of the optional third pump may be in the range of about 100 psi to about 10,000 psi, about 500 psi to about 5,000 psi, or about 1,000 psi to about 2,000 psi. In some embodiments, the pump pressure at the outlet of the third pump 126 may be at least about 500 psi, at least about 1,000 psi, at least about 1,500 psi, or higher. Further, this third pump 126 may have a horsepower between 1,000 hp and 5,000 hp, between 2,000 and 4,500 hp or between 3,000 hp and 4,000 hp. In such embodiments, the third pump 126 may have a horsepower of as much as 2,500 hp, 3,000 hp, 3,500 hp, 4,500 hp, 5,000 hp or more. While the third pump 126 is shown in FIG. 1 as being within the tank farm (e.g. as depicted by the dashed rectangular box in FIG. 1), the third pump 126 (and start of the pipeline 124) may be located a distance apart from the tank farm, e.g., less than one mile, less than two or less than three miles. However, the third pump 126 is positioned relative to the second pump 120 such that the pressure at the inlet or suction of the third pump 126 is sufficiently high to preclude cavitation within the third pump 126.

In one or more embodiments, in-line mixing systems as described herein may include one or more controllers 128 in communication with the tank flow meter 116, the booster flow meter 122, the pressure sensor/transducer 130, and the variable speed drive (VFD) 132. Generally, the one or more controllers 128 may perform a variety of functions (e.g., determining mix ratios, flow rates, various densities, various gravities, corrected mix ratios, and/or controlling one or more functions of various components within the in-line mixing system 100). In some embodiments, the one or more controllers 128 may be configured to determine a ratio of the flow of second fluid to the flow of first fluid responsive to one or more signals received from the tank flow meter 116 and the booster flow meter 122. For example, the booster flow meter 122 may be configured to measure a total flow rate of the blended fluid flow therethrough and the tank flow meter 116 may be configured to measure the flow rate of the flow of the second fluid therethrough, such that the difference in the total flow rate of the blended fluid flow and the flow rate of the flow of the second fluid is approximately equal to the flow rate of the flow of the first fluid (e.g., which is gravity-fed). In some embodiments, both of the tank flow meter 116 and the booster flow meter 122 may provide flow readings in units of barrels per hour of hydrocarbon liquids. For example, if the booster flow meter 122 indicates that the blended flow has a flow rate of 10,000 barrels per hour and the tank flow meter 116 indicates that the flow rate of the flow of the second fluid is 4,000 barrels per hour, then the calculated flow rate of the flow of the first liquid is 6,000 barrels per hour (e.g., providing a mix ratio in the blended flow of approximately 40:60 (second fluid:first fluid)). In some embodiments, the one or more controllers 128 may be in communication with each of the tank flow meter 116 and the booster flow meter 122 to determine flow rate of the first fluid from the first tank 102 responsive to signals received from the tank flow meter 116 and the booster flow meter 122. In some embodiments, the tank flow meter 116 and booster flow meter 122 may include other sensors or functionality to provide a density or gravity of the second fluid (as well as the first fluid, in another example). If provided as a gravity, the tank flow meter 116 and booster flow meter 122 may indicate the gravity as a specific gravity. The one or more controllers 128 may further determine a density or gravity of the first fluid, based on the densities or gravities of the second fluid and blended fluid. Further, the controller 128 may adjust the flow rate of second flow, based on the densities or gravities of the first fluid, the second fluid, and the blended fluid and the target blend density or gravity.

In such embodiments, the ratio of the flow of the second fluid to the flow of the first fluid may be referred to herein as the mix ratio of the blended fluid flow. In some embodiments, the mix ratio may be varied in the range of about 1:99 (second fluid:first fluid) to about 99:1 (second fluid:first fluid). For example, in some embodiments, the blended fluid flow may include the flow of the second fluid in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the blended fluid flow may include the flow of the first fluid in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more.

As noted above, the mix ratio (also referred to as the blend ratio) generally refers to the ratio of the second fluid to the first fluid in the total blended fluid flow. For example, a hypothetical blended fluid flow having a total flow rate of 10,000 barrels per hour with a mix ratio of 60:40 (second fluid:first fluid) would equate to a second fluid flow rate of 6,000 barrels per hour and a first fluid flow rate of 4,000 barrels per hour. Thus, the actual mix ratio may be constantly calculated during operation of the in-line mixing system based on measurement of the individual flow rates of the flow of the second fluid and the flow of the first fluid. It should be noted that the actual mix ratio will inherently fluctuate above and below a set point in a controlled system (e.g., such as in-line mixing systems 100 as described herein) based on control adjustments being made on-demand, in real-time. In addition, the amount of fluctuation in the actual mix ratio (e.g., the variance in the mix ratio) may be higher at the beginning of a blending operation run (e.g., operation for 30 minutes or less, 20 minutes or less, 10 minutes or less, or 5 minutes or less after a new set point mix ratio is input into the system) relative to a later time in the same blending operation run when steady state control has been achieved (e.g., operation for 30 minutes or longer, 1 hour or longer, 2 hours or longer, 4 hours or longer, 8 hours or longer, 12 hours or longer, or 24 hours or longer after a new set point mix ratio is input into the system). Generally, longer blending operation runs may provide better accuracy because steady state is reached within the in-line mixing system and this steady state is maintained for a longer period of time. Advantageously, the systems and methods of in-line mixing as described herein provide far more accurate control of the mix ratio (both at the beginning of a blending operation run and for the duration of the blending operation run) than typically provided with other blending methods commonly used in the art. In-line mixing systems 100 according to the disclosure may maintain the mix ratio within about +/−1.0 percent of the desired/pre-selected set point mix ratio. In certain embodiments, in-line mixing systems according to the disclosure may maintain the mix ratio within about +/−1.0 percent, about +/−0.5 percent, about +/−0.25 percent, about +/−0.1 percent, or about +/−0.05 percent of the desired/pre-selected set point mix ratio.

In one or more embodiments, the one or more controllers 128 may include a programmable logic controller. The one or more controllers 128 may be in communication with the variable speed drive 132, which may be connected to the first pump 110, and configured to control the variable speed drive 132. In such embodiments, the one or more controllers 128 may be configured to compare the mix ratio to a pre-selected set point ratio and to determine a modified flow of the second fluid, if necessary, to bring the mix ratio closer to the pre-selected set point ratio. For example, the one or more controllers 128 may be configured to send a control signal to the variable speed drive 132 to control the pump speed and thereby adjust the flow of the second fluid in order to drive the mix ratio toward the pre-selected set point ratio. If the mix ratio is lower than the pre-selected set point ratio, then the flow of the second fluid may be increased to drive the mix ratio toward the pre-selected set point ratio. Likewise, if the mix ratio is higher than the pre-selected set point ratio, then the flow of the second fluid may be decreased to drive the mix ratio toward the pre-selected set point ratio.

In one or more embodiments, the one or more controllers 128, e.g., a programmable logic controller, may be in communication with the flow control valve 118 and configured to control the flow control valve. For example, in some embodiments, the one or more controllers 128 may govern the flow control valve 118 to maintain pressure at the tank flow meter 116 between about 15 psi and about 25 psi. In at least one embodiment, the one or more controllers 128 may be configured to compare the mix ratio to a pre-selected set point ratio to determine a modified flow of the second fluid. In some embodiments, the one or more controllers 128 may be configured to send a control signal to the flow control valve 118 to control the valve setting and thereby the flow of the second fluid in order to drive the mix ratio toward the pre-selected set point ratio. If the mix ratio is lower than the pre-selected set point ratio, then the flow control valve 118 may be opened to increase the flow of the second fluid to drive the mix ratio toward the pre-selected set point ratio. Likewise, if the mix ratio is higher than the pre-selected set point ratio, then the flow control valve 118 may be pinched to reduce the flow of the second fluid to drive the mix ratio toward the pre-selected set point ratio.

In one or more embodiments of in-line mixing systems 100, the variable speed drive (VFD) 132 and the flow control valve 118 may work together based on input from the one or more controllers 128, including the programmable logic controller. In some embodiments, for example, when the speed of the first pump 110 drops below 60%, the programmable logic controller may send a signal to pinch the flow control valve 118 (e.g., reducing the pressure at the output of the flow control valve by about 5 psi) to force the first pump 110 to increase speed to maintain the mix ratio. Likewise, if the speed of the first pump 110 increases to 100%, the programmable logic controller may send a signal to the flow control valve 118 to open the flow control valve 118 (e.g., increasing the pressure at the output of the flow control valve by about 5 psi) to force the first pump 110 to decrease speed to maintain the mix ratio. Generally, the pressure at the flow control valve 118 is maintained at about 20 psi when the in-line mixing system is maintained at steady state.

Figure 2:
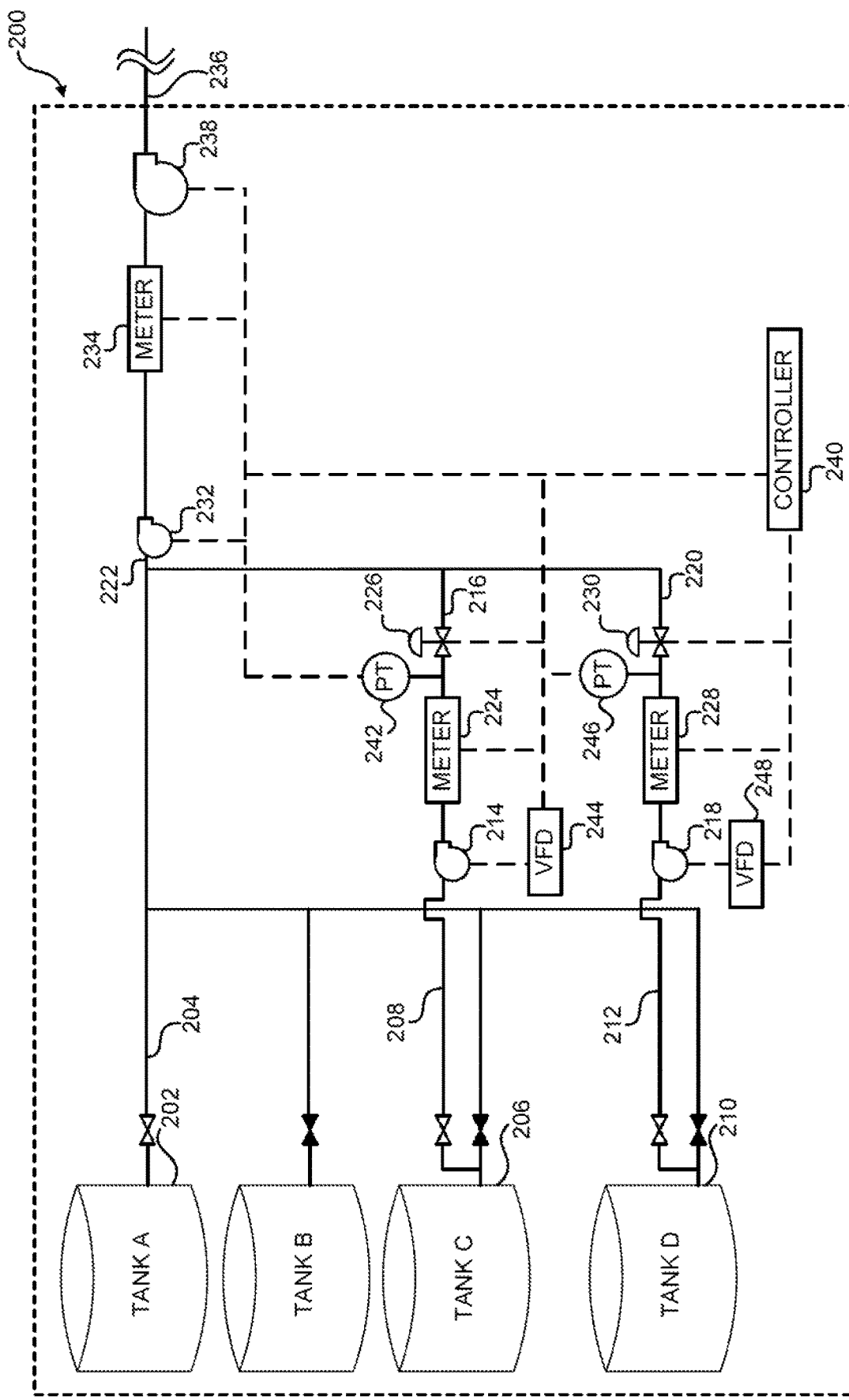
FIG. 2 is a schematic diagram of a three-component in-line mixing system positioned at a tank farm to admix three hydrocarbon liquids from separate tanks into a single pipeline according to an embodiment of the disclosure.
Figure 3:
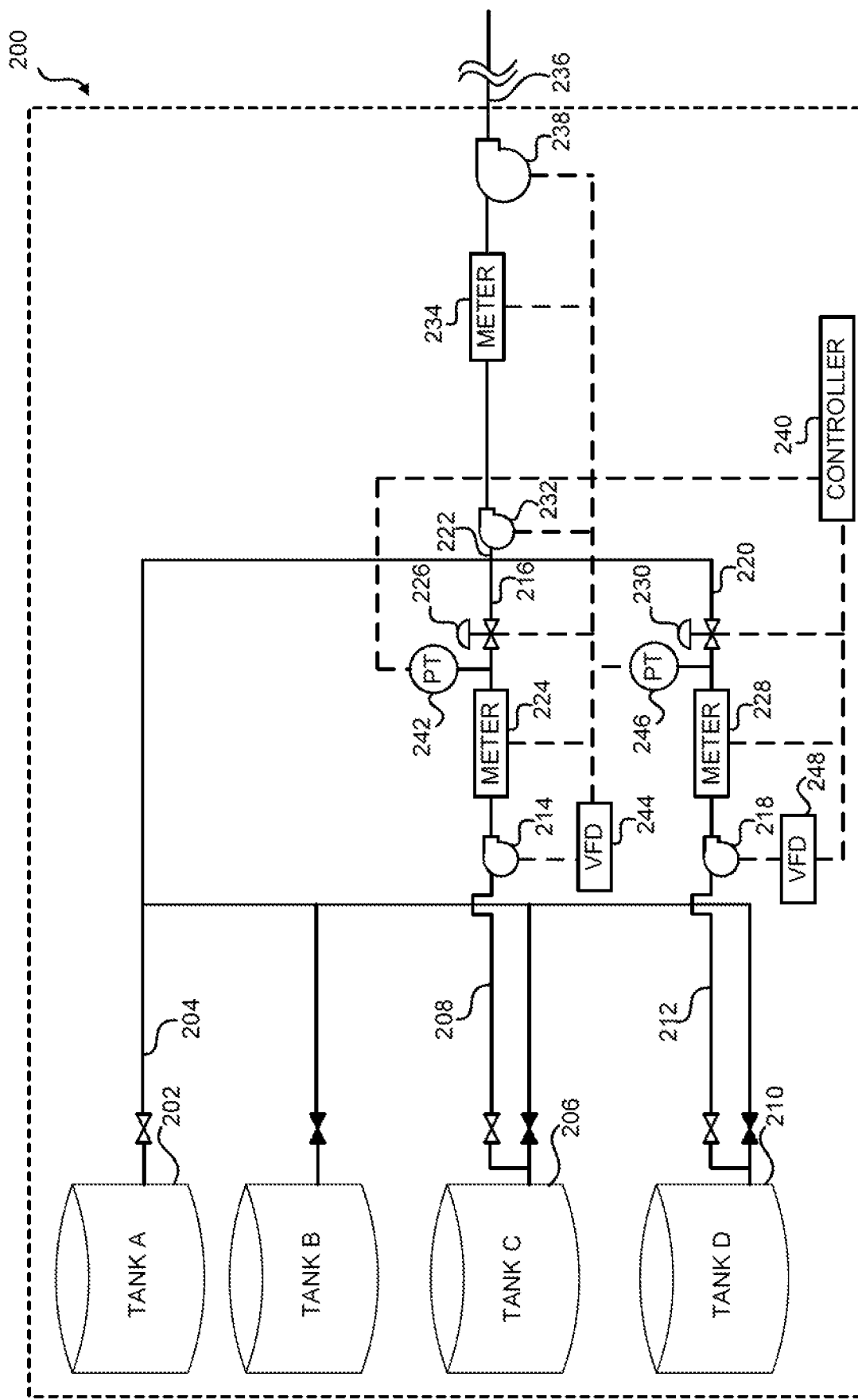
FIG. 3 is a schematic diagram of a three-component in-line mixing system positioned at a tank farm to admix three hydrocarbon liquids from separate tanks into a single pipeline according to an embodiment of the disclosure.
Figure 4:
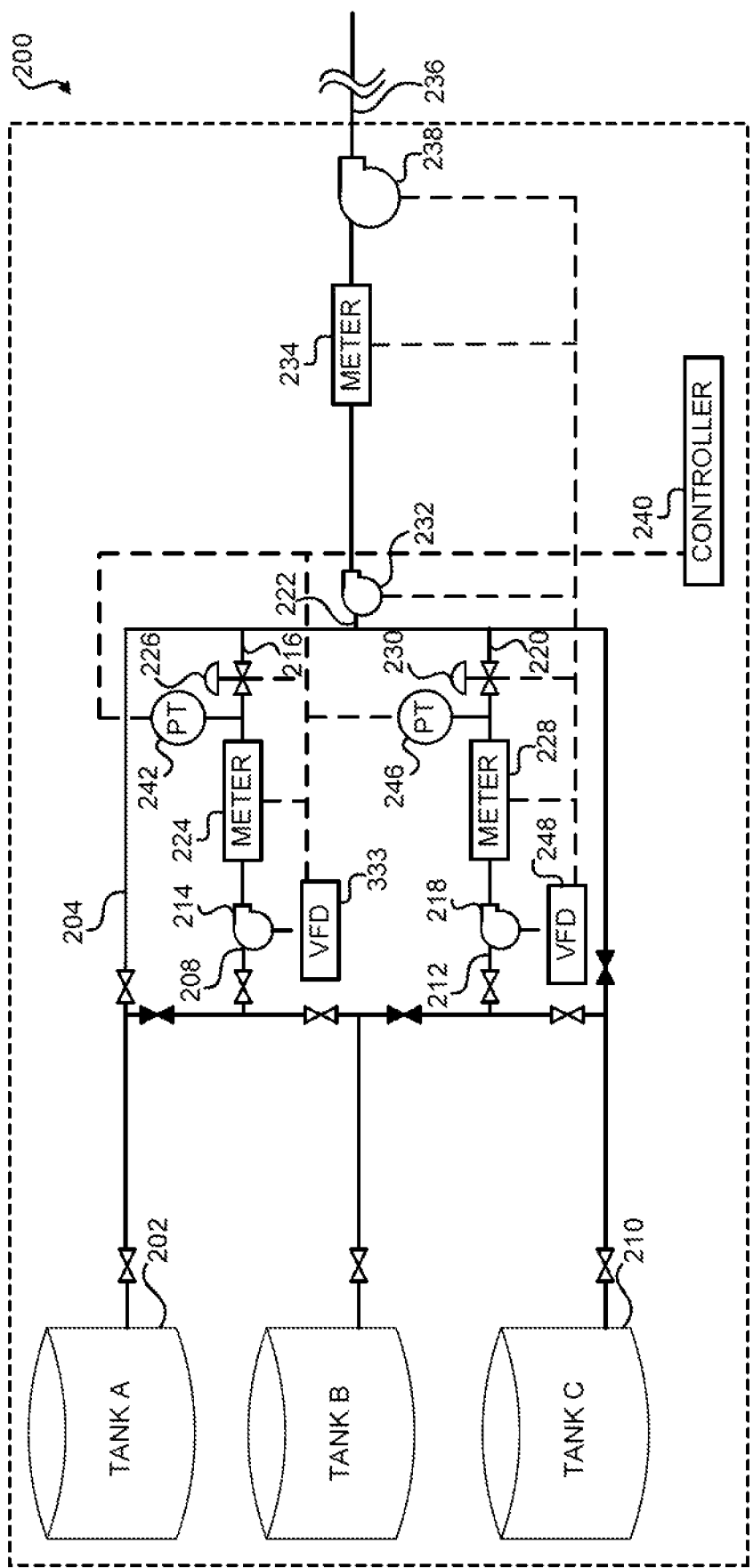
FIG. 4 is a schematic diagram of a three-component in-line mixing system positioned at a tank farm admix three hydrocarbon liquids from separate tanks into a single pipeline.

As noted above, in one or more embodiments, the system and methods described herein may provide in-line mixing of three or more component blends in a single pipe. For example, FIGS. 2-4 depict process diagrams of non-limiting, three-component in-line mixing system according to various embodiments of the disclosure. In particular, FIGS. 2-4 illustrate embodiments, of three-component in-line mixing systems 200 positioned at a tank farm (e.g., as depicted by the dashed rectangular boxes in FIGS. 2-4) to admix three hydrocarbon liquids from separate tanks into a single pipeline to provide a two-component blended fluid flow. As shown in FIGS. 2-4, a three-component in-line mixing system may include a first tank 202 positioned in a tank farm and containing a first fluid therein. Generally, the first fluid includes one or more hydrocarbon liquids, of a first density or gravity, as defined herein above and as would be understood by a person of skill in the art. In some embodiments, the first tank may include a first output pipe 204 connected to the first tank 202 proximate a bottom portion thereof and the first output pipe 204 may be in fluid communication with the first fluid to transport a flow of the first fluid from the first tank 202 through the first output pipe 204 at a first pressure. In some embodiments, the first pressure may be in the range of about 0.1 psi to about 100 psi, about 0.5 psi to about 50 psi, or about 1 psi to about 10 psi. In some embodiments, the first pressure may be less than about 20 psi, less than about 10 psi, less than about 5 psi, or less than about 1 psi. In the embodiments depicted in FIGS. 2-4, the first pressure results from force of gravity on the first fluid contained in the first tank.

In one or more embodiments, the three-component in-line mixing system may include a second tank 206 positioned in the tank farm and containing a second fluid therein. Generally, the second fluid includes one or more hydrocarbon liquids, of a second density or gravity, as defined herein above and as would be understood by a person of skill in the art. In some embodiments, the second tank 206 may include a second output pipe 208 connected to the second tank 206 proximate a bottom portion thereof and the second output pipe 208 may be in fluid communication with the second fluid to transport a flow of the second fluid from the second tank 206 through the second output pipe 208 at a second pressure. In some embodiments, the second pressure may be in the range of about 0.1 psi to about 100 psi, about 0.5 psi to about 50 psi, or about 1 psi to about 10 psi. In some embodiments, the second pressure may be less than about 20 psi, less than about 10 psi, less than about 5 psi, or less than about 1 psi. Similar to the first pressure, the second pressure also results from force of gravity on the second fluid contained in the second tank 206.

In one or more embodiments, the three-component in-line mixing system may include a third tank 210 positioned in the tank farm and containing a third fluid therein. Generally, the third fluid includes one or more hydrocarbon liquid, of a third density or gravity, as defined herein above and as would be understood by a person of skill in the art. In some embodiments, the third tank 210 may include a third output pipe 212 connected to the third tank 210 proximate a bottom portion thereof and the third output pipe 212 may be in fluid communication with the third fluid to transport a flow of the third fluid from the third tank 210 through the third output pipe 212 at a third pressure. In some embodiments, the third pressure may be in the range of about 0.1 psi to about 100 psi, about 0.5 psi to about 50 psi, or about 1 psi to about 10 psi. In some embodiments, the second pressure may be less than about 20 psi, less than about 10 psi, less than about 5 psi, or less than about 1 psi. Similar to the first and second pressures, the third pressure also results from the force of gravity on the third fluid contained in the third tank 210.

In one or more embodiments, three-component in-line mixing systems 200 as described herein may include a second tank pump 214 having an inlet and an outlet. For example, the inlet of the second tank pump 214 may be connected to the second output pipe 208 to increase pressure of the flow of the second fluid from the second pressure to a second pump pressure at the outlet of the second tank pump 214. In some embodiments, the second pump pressure at the outlet of the second tank pump 214 may be in the range of about 1 psi to about 100 psi, about 10 psi to about 50 psi, or about 25 psi to about 35 psi. In some embodiments, the second pump pressure at the outlet of the second tank pump 214 may be at least about 10 psi, at least about 20 psi, at least about 30 psi, at least about 40 psi, at least about 50 psi, or higher. Further, this second tank pump 214 may have a horsepower between 1 hp and 500 hp, between 50 and 250 hp or between 125 hp and 175 hp. In such embodiments, the second tank pump 214 may have a horsepower of 500 hp or less, 400 hp or less, 300 hp or less, 200 hp or less, 100 hp or less, and lower. Generally, the second pump pressure at the outlet of the second tank pump 214 is greater than the second pressure in the second output pipe 208. In some embodiments, a second tank mixing booster pipe 216 may be connected to the outlet of the second tank pump 214 to transport the flow of the second fluid therethrough. In some embodiments, three-component in-line mixing systems 200 as described herein may include a second variable speed drive 244 connected to the second tank pump 214 to control pump speed to thereby adjust the flow of the second fluid through the second tank pump 214.

The specific type and/or configuration of the second variable speed drive 244 may vary as would be understood by a person of skill in the art.

In one or more embodiments, three-component in-line mixing systems 200 as described herein may include a third tank pump 218 having an inlet and an outlet. For example, the inlet of the third tank pump 218 may be connected to the third output pipe 212 to increase pressure of the flow of the third fluid from the third pressure to a third pump pressure at the outlet of the third tank pump 218. In some embodiments, the third pump pressure at the outlet of the third tank pump 218 may be in the range of about 1 psi to about 100 psi, about 10 psi to about 50 psi, or about 25 psi to about 35 psi. In some embodiments, the third pump pressure at the outlet of the third tank pump 218 may be at least about 10 psi, at least about 20 psi, at least about 30 psi, at least about 40 psi, at least about 50 psi, or higher. Further, this third tank pump 218 may have a horsepower between 1 hp and 500 hp, between 50 and 250 hp or between 125 hp and 175 hp. In such embodiments, the third tank pump 218 may have a horsepower of 500 hp or less, 400 hp or less, 300 hp or less, 200 hp or less, 100 hp or less, and lower. Generally, the third pump pressure at the outlet of the third tank pump 218 is greater than the third pressure in the third output pipe 212. In some embodiments, a third tank mixing booster pipe 220 may be connected to the outlet of the third tank pump 218 to transport the flow of the third fluid therethrough. In some embodiments, three-component in-line mixing systems 200 as described herein may include a third variable speed drive 248 connected to the third tank pump 218 to control pump speed to thereby adjust the flow of the third fluid through the third tank pump 218. The specific type and/or configuration of the third variable speed drive 248 may vary as would be understood by a person of skill in the art.

As depicted in FIGS. 2-4, in some embodiments, three-component in-line mixing systems 200 may include a blended fluid pipe 222 connected to and in fluid communication with the first output pipe 204, the second tank mixing booster pipe 216, and the third tank mixing booster pipe 220 to admix the flow of the first fluid at the first pressure, the flow of the second fluid, and the flow of the third fluid into a blended fluid flow. In some embodiments, the pressures of the third fluid, the second fluid, and the first fluid may be about the same at the portion of the blended fluid pipe 222 configured to admix the flow of the first fluid, the flow of the second fluid, and the flow of the third fluid into the blended fluid flow.

As noted in FIGS. 2-4, for example, the connection point between the first output pipe 204, the second tank mixing booster pipe 216, the third tank mixing booster pipe 220, and the blended fluid pipe 222 may vary in different embodiments. As depicted in FIG. 2, for example, the blended fluid pipe 222 may be directly in line with the first output pipe 204 (i.e., the gravity fed output line) with the second tank mixing booster pipe 216 and the third tank mixing booster pipe 220, or a combined pipe thereof, flowing into first output pipe/blended fluid pipe junction, e.g., through a tee joint or y joint. As depicted in FIG. 3, the blended fluid pipe 222 may be directly in line with the second tank mixing booster pipe 216 or, in another example, the third tank mixing booster pipe 220 such that the first output pipe 204 is routed to flow into the junction between the blended fluid pipe and the second tank mixing booster pipe 216 and/or third tank mixing booster pipe 220, e.g., through a tee joint, y joint, or four-way joint. Further, as depicted in FIG. 4, any one of the plurality of tanks in the tank farm may be configurable to be a gravity fed line (e.g., such as the first output pipe 204 in FIG. 2) or to be a controlled, tank output stream (e.g., such as the second tank mixing booster pipe 216 or the third tank mixing booster pipe 220 in FIG. 2). For example, the first tank 202 may be configured to be the gravity fed line or the third tank 210 may, instead, be configured as the gravity fed line. Likewise, the first tank 202 or the third tank 210 may be configured to be a controlled, tank output stream. Such configurations and arrangements are not intended to be limiting and are presented by way of example only. Generally, the configuration and/or arrangement of the first output pipe, the second tank mixing booster pipe, the third tank mixing booster pipe, and the blended fluid pipe may vary based on the configuration of the tank farm.

Referring again to FIGS. 2-4, in some embodiments of three-component in-line mixing systems 200 as described herein, a second tank flow meter 224 may be connected to the second tank mixing booster pipe 216 and positioned between the second tank pump 214 and the blended fluid pipe 222 to measure flow rate of the flow of the second fluid between the second tank pump 214 and the blended fluid pipe 222. The second tank flow meter 224 may be a turbine flow meter or another type of flow meter as would be known to those skilled in the art. Generally, the booster flow meter 234 may provide flow readings in the form of barrels per hour of hydrocarbon liquids. In another embodiment, the second tank flow meter 224 may include a sensor or functionality to measure a density or gravity of the blended fluid or liquid (e.g., a mass flow meter or other meter as will be understood by those skilled in the art). In some embodiments, a second tank flow control valve 226 may be connected to the second tank mixing booster pipe 216 between the second tank flow meter 224 and the blended fluid pipe 222 to control the flow of the second fluid between the second tank pump 214 and the blended fluid pipe 222. In some embodiments, a second tank pressure sensor/transducer 242 may also be connected to the second tank mixing booster pipe 216 and positioned upstream of the second tank flow control valve 226. In some embodiments, for example, the second tank pressure sensor/transducer 242 may be connected to the second tank mixing booster pipe 216 between the second tank flow meter 224 and the second tank flow control valve 226. The second tank pressure sensor/transducer 242 may be configured to measure the back pressure at the second tank flow control valve 226. Any type of pressure sensor/transducer may be used to measure the back pressure at the second tank flow control valve 226 as would be understood by a person of skill in the art.

In some embodiments, three-component in-line mixing systems 200 as described herein may include a third tank flow meter 228 connected to the third tank mixing booster pipe 220 and positioned between the third tank pump 218 and the blended fluid pipe 222 to measure flow rate of the flow of the third fluid between the third tank pump 218 and the blended fluid pipe 222. The third tank flow meter 228 may be a turbine flow meter or another type of flow meter as would be known to those skilled in the art. Generally, the third tank flow meter 228 may provide flow readings in the form of barrels per hour of hydrocarbon liquids. In another embodiment the third tank flow meter 228 may include a sensor or functionality to measure a density or gravity of the blended fluid or liquid (e.g., a mass flow meter or other meter as will be understood by those skilled in the art). In some embodiments, a third tank flow control valve 230 may be connected to the third tank mixing booster pipe 220 between the third tank flow meter 228 and the blended fluid pipe 222 to control the flow of the third fluid between the third tank pump 218 and the blended fluid pipe 222. In some embodiments, a third tank pressure sensor/transducer 246 may also be connected to the third tank mixing booster pipe 220 and positioned upstream of the third tank flow control valve 230. In some embodiments, for example, the third tank pressure sensor/transducer 246 may be connected to the third tank mixing booster pipe 220 between the third tank flow meter 228 and the third tank flow control valve 230. The third tank pressure sensor/transducer 246 may be configured to measure the back pressure at the third tank flow control valve 230. Any type of pressure sensor/transducer may be used to measure the back pressure at the third tank flow control valve 230 as would be understood by a person of skill in the art.

In one or more embodiments, three-component in-line mixing systems 200 and methods may include a booster pump 232 having an inlet in fluid communication with the blended fluid pipe 222 and an outlet. Generally, the booster pump 232 will have a greater horsepower than the second tank pump 214 and the third tank pump 218 and thus, the pump pressure at the outlet of the booster pump 232 may be greater than the pump pressure at the outlet of the second tank pump 214 and/or the third tank pump 218. In some embodiments, for example, the pump pressure at the outlet of the booster pump 232 may be in the range of about 50 psi to about 500 psi, about 100 psi to about 300 psi, or about 150 psi to about 200 psi. In some embodiments, the pump pressure at the outlet of the booster pump 232 may be at least about 50 psi, at least about 100 psi, at least about 150 psi, at least about 200 psi, or higher. Further, the booster pump 232 may have a horsepower between 250 hp and 2,500 hp, between 500 and 2,000 hp or between 750 hp and 1,500 hp. In such embodiments, the booster pump 232 may have a horsepower of as much as 250 hp, 500 hp, 750 hp, 1,000 hp, 1,250 hp, 1,500 hp or more. The booster pump 232 is positioned relative to the second tank pump 214, the third tank pump 218 and the first tank 202 such that the pressure in the blended fluid pipe 222 at the inlet or suction of the booster pump 232 is sufficiently high to preclude cavitation within the booster pump 232. Generally, the pump pressure at the outlet of the booster pump 232 is considerably higher than the pressure at the outlet of the second tank pump 214 and/or the third tank pump 218 to ramp up the pressure of the blended fluid flow prior to transfer to the pipeline 236.

In some embodiments, three-component in-line mixing systems 200 as described herein may include a booster flow meter 234 in fluid communication with the blended fluid pipe 222 to measure total flow rate of the blended fluid flow transported through the blended fluid pipe 222. The booster flow meter 234 may be a turbine flow meter or another type of flow meter as would be known to those skilled in the art. Generally, the booster flow meter may provide flow readings in the form of barrels per hour of hydrocarbon liquids. In some embodiments, the three-component in-line mixing systems 200 as described herein may include a pipeline 236 connected to the outlet of the booster pump 232 to transport the blended fluid flow therethrough and away from the tank farm, e.g., to a pipeline origination station. In one or more embodiments, the three-component in-line mixing systems 200 described herein, and as shown in FIGS. 2-4, may include a pipeline origination station pump 238 positioned between the outlet of the booster pump 232 and the pipeline 236. The pipeline origination station pump 238 is arranged to be in fluid communication with the outlet of the booster pump 232, the booster flow meter 234 and the pipeline 236. Generally, the pipeline origination station pump 238 may have a greater horsepower and a greater outlet pump pressure than each of the second tank pump 214, the third tank pump 218, and the booster pump 232 in order to transport the blended fluid flow at much higher pressures through the pipeline 236. Such higher pressures are generally required for pumping the blended fluid flow through long pipelines before reaching a final destination. For example, such pipelines may be in excess of hundreds of miles in length. In some embodiments, the pump pressure at the outlet of the pipeline origination station pump 238 may be in the range of about 100 psi to about 10,000 psi, about 500 psi to about 5,000 psi, or about 1,000 psi to about 2,000 psi. In some embodiments, the pump pressure at the outlet of the second tank pump 214 and/or third tank pump 218 may be at least about 500 psi, at least about 1,000 psi, at least about 1,500 psi, or higher. Further, the pipeline origination station pump 238 may have a horsepower between 1,000 hp and 5,000 hp, between 2,000 and 4,500 hp or between 3,000 hp and 4,000 hp. In such embodiments, the pipeline origination station pump 238 may have a horsepower of as much as 2,500 hp, 3,000 hp, 3,500 hp, 4,500 hp, 5,000 hp or more. While the pipeline origination station pump 238 is shown in FIGS. 2-4 as being within the tank farm (e.g. as depicted by the dashed rectangular box in FIGS. 2-4), the pipeline origination station pump 238 (and start of the pipeline 236) may be located a distance apart from the tank farm, e.g., less than one mile, less than two or less than three miles. However, the pipeline origination station pump 238 may be positioned relative to the booster pump 232 such that the pressure at the inlet or suction of the pipeline origination station pump 238 is sufficiently high to preclude cavitation within the pipeline origination station pump 238.

In one or more embodiments, three-component in-line mixing systems 200 as described herein may include one or more controllers 240 in communication with the second tank flow meter 224, the third tank flow meter 228, the booster flow meter 234, the second tank pressure sensor/transducer 242, the second variable speed drive 244, the third tank pressure sensor/transducer 246, and the third variable speed drive 248. Generally, the one or more controllers 240 may perform a variety of functions (e.g., determining mix ratios, flow rates, various densities, various gravities, corrected mix ratios, and/or controlling one or more functions of various components within the system). In some embodiments, the one or more controllers 240 may be configured to determine percentages of the first fluid flow rate, the second fluid flow rate, and the third fluid flow rate in the total blended flow responsive to one or more signals received from the second tank flow meter 224, the third tank flow meter 228, and the booster flow meter 234. For example, the booster flow meter 234 may be configured to measure a total flow rate of the blended fluid flow therethrough; the second tank flow meter 224 may be configured to measure the flow rate of the flow of the second fluid therethrough; and the third tank flow meter 228 may be configured to measure the flow rate of the flow of the third fluid therethrough, such that the difference in the total flow rate of the blended fluid flow, the flow rate of the flow of the second fluid, and the flow rate of the flow of the third fluid is approximately equal to the flow rate of the flow of the first fluid (e.g., which is gravity-fed). In some embodiments, each of the second tank flow meter 224, the third tank flow meter 228 and the booster flow meter 234 may provide flow readings in units of barrels per hour of hydrocarbon liquids. For example, if the booster flow meter 234 indicates that the blended fluid flow has a flow rate of 10,000 barrels per hour and the second tank flow meter 224 indicates that the flow rate of second fluid flow is 4,000 barrels per hour and the third tank flow meter 228 indicates that the flow rate of the third fluid flow is 5,000 barrels per hour, then the calculated flow rate of the first fluid flow is 1,000 barrels per hour (e.g., providing mix percentages in the blended flow of 50/40/10 (third fluid:second fluid:first fluid)). In some embodiments, the one or more controllers 240 may be in communication with each of the second tank flow meter 224, the third tank flow meter 228, and the booster flow meter 234 to determine flow rate of the first fluid from the first tank 202 responsive to signals received from the second tank flow meter 224, third tank flow meter 228, and the booster flow meter 234.

In some embodiments, the percentages of the third fluid flow to the second fluid flow to the first fluid flow may be referred to herein as the mix percentages of the blended fluid flow. In some embodiments, the mix percentages may be varied in the range of about 1 percent to about 98 percent for each of the first fluid flow, the second fluid flow, and the third fluid flow. For example, in some embodiments, the blended fluid flow may include the first fluid flow in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the blended fluid flow may include the second fluid flow in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the blended fluid flow may include the third fluid flow in an amount of at least 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or more. In some embodiments, the percentages of the third fluid flow to the second fluid flow to the first fluid flow may be referred to in terms of a percentage mix ratio. For example, in some embodiments, the percentage mix ratio may be about 50:49:1 (third fluid:second fluid:first fluid). In other embodiments, the percentage mix ratio may be about 50:46:4 (third fluid:second fluid:first fluid). Generally, the percentage mix ratio may be varied such that any of the fluid flows are provided in amount between about 1 percent and about 98 percent of the total blended flow.

Advantageously, the systems and methods of in-line mixing as described herein provide far more accurate control of the mix ratio (both at the beginning of a blending operation run and for the duration of the blending operation run) than typically provided with other blending methods commonly used in the art. For example, in-line mixing systems and methods according to the disclosure may maintain the mix percentages within about +/−1.0 percent of the desired/preselected set point percentages. In some embodiments, in-line mixing systems and methods according to the disclosure may maintain the mix percentages within about +/−1.0 percent, about +/−0.5 percent, about +/−0.25 percent, about +/−0.1 percent, or about +/−0.05 percent of the desired/preselected set point percentages.

In at least one embodiment, the one or more controllers 240 may include a programmable logic controller. The one or more controllers 240 may be in communication with one or more variable speed drives (e.g., connected to the second tank pump 214 and/or to the third tank pump 218) and configured to control the variable speed drives. In some embodiments, for example, in-line mixing systems and methods of the disclosure may include a second variable speed drive 244 connected to the second tank pump 214 and a third variable speed drive 248 connected to the third tank pump 218. In such embodiments, the one or more controllers 240 may be configured to compare the mix percentages to a pre-selected set point percentages and to determine a modified flow of one or both of the second fluid flow and the third fluid flow, if necessary, to bring the mix percentages closer to the pre-selected set point percentages. For example, the one or more controllers 240 may be configured to send a control signal to at least one of the second variable speed drive 244 and the third variable speed drive 248 to control the pump speed of the second tank pump 214 and/or third tank pump 218, respectively, and thereby adjust the flow of at least one of the second fluid and the third fluid in order to drive the mix percentages toward the pre-selected set point percentages.

In one or more embodiments, the one or more controllers 240 may be in communication with second tank flow meter 224, third tank flow meter 228, and booster flow meter 234. The one or more controllers 240 may obtain or determine a density or gravity for each liquid flowing through second tank flow meter 224, third tank flow meter 228, and booster flow meter 234. In such examples, the one or more controllers 240 may include a target blend density or gravity or a preset blend density or gravity. Such a target blend density or gravity may indicate the desired or target density or gravity of the blended fluid. As is illustrated in FIGS. 2-4, a meter may not be associated with the first tank 202. In other words, the density or gravity may not be measured for the first tank 202. Further, the one or more controllers 240 may determine the first density or gravity of the first liquid, based on the second density or gravity (obtained or determined via second tank flow meter 224), the third density or gravity (obtained or determined via third tank flow meter 228), and the blend density or gravity (obtained or determined via booster flow meter 234). Once all densities or gravities are available, the one or more controllers 240 may compare the blend density or gravity with the target blend density or gravity. Based on differences of such comparisons, the one or more controllers 240 may determine a corrected mix ratio. The one or more controllers 240 may adjust the flow, based on the corrected mix ratio, of at least one of the second fluid and the third fluid, via the second variable speed drive 244 and the third variable speed drive 248 and/or second tank flow control valve 226 and the third tank flow control valve 230, in order to drive the blend density or gravity toward the target or preset blend density or gravity.

In one or more embodiments, the one or more controllers 240, e.g., a programmable logic controller, may be in communication with one or both of the second tank flow control valve 226 and the third tank flow control valve 230, and configured to control one or both of the second tank flow control valve 226 and the third tank flow control valve 230. For example, in some embodiments, the one or more controllers 240 may govern the second tank flow control valve 226 and the third tank flow control valve 230 to maintain pressure at each of the second tank flow meter 224 and the third tank flow meter 228 between about 15 psi and about 25 psi. In at least one embodiment, the one or more controllers 240 may be configured to compare the mix percentages to pre-selected set point percentages to determine a modified flow of one or both of the second fluid and the third fluid. In some embodiments, the one or more controllers 240 may be configured to send a control signal to at least one of the second tank flow control valve 226 and the third tank flow control valve 230 to control the respective valve setting and thereby the flow of second fluid and third fluid, respectively, in order to drive the mix percentages toward the pre-selected set point percentages.

In one or more embodiments of in-line mixing systems, the second variable speed drive 244 and the second tank flow control valve 226 may work together based on input from the one or more controllers 240, including the programmable logic controller. In some embodiments, the third variable speed drive 248 and the third tank flow control valve 230 may work together based on input from the one or more controllers 240, including the programmable logic controller. In some embodiments, for example, when the speed of the second tank pump 214 and/or the third tank pump 218 drops below 60%, the programmable logic controller may send a signal to pinch the second tank flow control valve 226 and/or the third tank flow control valve 230 (e.g., reducing the pressure at the output of the flow control valve by about 5 psi), respectively, to force the second tank pump and/or the third tank pump to increase speed to maintain the desired mix percentages. Likewise, if the speed of the second tank pump 214 and/or the third tank pump 218 increases to 100%, the programmable logic controller may send a signal to open the second tank flow control valve 226 and/or the third tank flow control valve 230 (e.g., increasing the pressure at the output of the flow control valve by about 5 psi), respectively, to force the second tank pump 214 and/or the third tank pump 218 to decrease speed to maintain the desired mix percentages. Generally, the pressure at both the second tank flow control valve 226 and the third tank flow control valve 230 is maintained at about 20 psi when the in-line mixing system is maintained at steady state.

Figure 5:
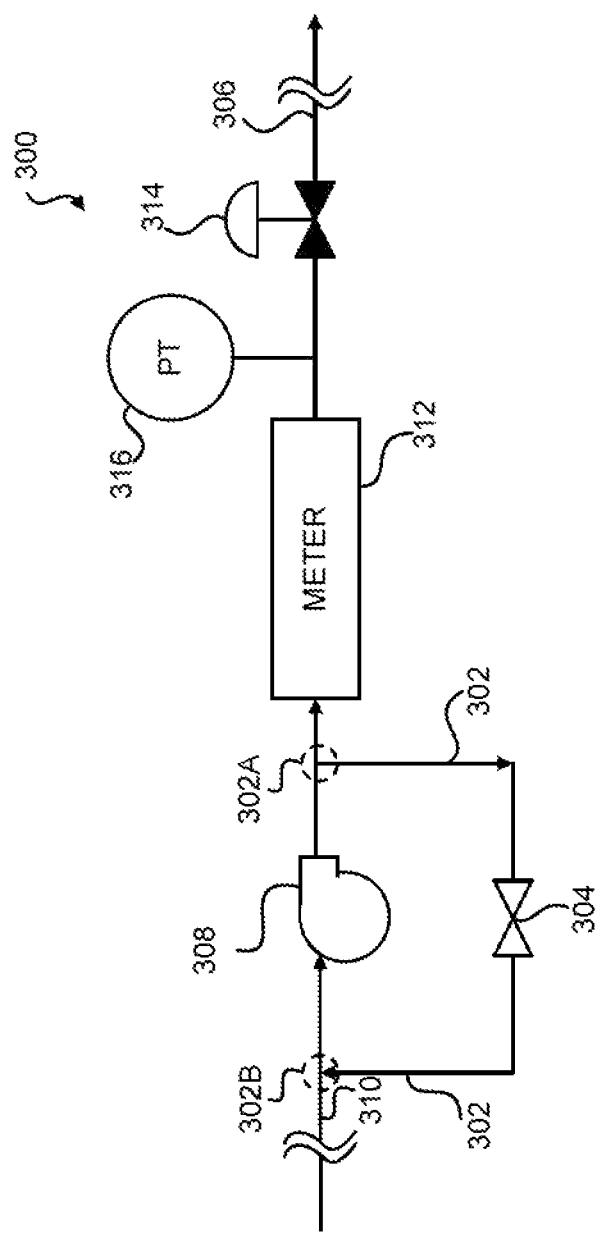
FIG. 5 is a schematic diagram of a control system on a single fluid line, the control system including tank output pipe, a pump, a mixing booster pipe, a blended fluid pipe, a tank flow meter, a flow control valve, a recirculation pipe, and a one-way valve disposed in the recirculation pipe, according to an embodiment of the disclosure.

FIG. 5 depicts a process diagram of a controlled, tank output stream 300 having a recirculation loop or spillback loop, the controlled output stream includes a recirculation pipe 302, and a one-way valve 304 disposed in the recirculation pipe, a mixing booster pipe 306, a pump 308, an output pipe 310, a tank flow meter 312, and a flow control valve 314. As depicted in FIG. 5, the controlled, tank output stream line may include an end portion 302a of a recirculation pipe 302 connected to and in fluid communication with a mixing booster pipe 306 downstream of a pump 308 and another end portion 302B of the recirculation pipe 302 connected to and in fluid communication with an output pipe 310. Thus, the recirculation pipe 302 is arranged to recirculate a fluid therethrough in order to maintain a minimum flow of the fluid through the pump 308. In some embodiments, the recirculation loop may include a one-way valve 304 disposed in the recirculation pipe 302 to prevent flow of the fluid from the output pipe to the mixing booster pipe 306.

A recirculation loop as depicted in FIG. 5 (e.g., including a recirculation pipe 302 and a one-way valve 304 disposed in the recirculation pipe 302) may be used in combination with any of the controlled, tank output streams in the systems described herein above (e.g., such as those depicted in FIGS. 1-4). In such embodiments, the recirculation pipe 302 may be positioned proximate to the pump 308 connected to the tank output pipe in the controlled, tank output streams (e.g., such as the second output pipe 108 in FIG. 1 and/or the second output pipe 208 in FIGS. 2-4 and/or the third output pipe 212 in FIGS. 2-4). In FIG. 1, for example, a recirculation pipe 302 and a one-way valve 304 disposed in the recirculation pipe 302 may be positioned proximate to first pump 110 to provide a recirculation system having the same components depicted in FIG. 5. In such embodiments, the recirculation pipe 302 may be configured to permit flow therethrough only when a ratio of the flow of second fluid to the flow of first fluid falls below a pre-selected threshold. In FIGS. 2-4, for example, a recirculation pipe 302 and a one-way valve 304 disposed in the recirculation pipe 302 may be positioned proximate one or both of second tank pump 214 and third tank pump 218 to provide a recirculation system having the same components depicted in FIG. 5. In such embodiments, the recirculation pipe 302 may be configured to permit flow therethrough when the flow of the second fluid is below a pre-selected percentage (e.g., when the recirculation pipe 302 is positioned proximate second pump tank 214) and/or configured to permit flow therethrough when the flow of the third fluid is below a pre-selected percentage (e.g., when the recirculation pipe 302 is positioned proximate third pump tank 218).

In one or more embodiments, in-line mixing systems and methods according to the disclosure may include a recirculation loop in each of the controlled, tank output streams. In such embodiments, the one-way valve 304 disposed in the recirculation pipe 302 may be in communication with one or more control components as described herein above. In some embodiments, if the flow control valve 314 holds a back pressure that exceeds a pre-selected setting (as determined by a pressure sensor/transducer 316 positioned upstream of the flow control valve 314) and the pump 308 falls at or below 60 percent operational capacity or throughput, the one or more controllers will send a signal to the one-way valve 304 to open the one-way valve 304. The pump 308 then pumps fluid through the recirculation pipe 302 via the open one-way valve 304 and back to the suction inlet of the pump 308, which increases fluid flow through the pump 308. Accordingly, the pump 308 is permitted to operate at greater than 60% throughout even while the flow control valve 314 holds a back pressure exceeding the pre-selected setting. Once the back pressure drops below a pre-selected value (as determined by the pressure sensor/transducer 316 positioned upstream of the valve), which corresponds to the valve opening to permit greater fluid flow therethrough, the one or more controllers will send a signal to the one-way valve to close. Advantageously, these three components (i.e., the variable speed pump, the flow control valve, and the recirculation loop) may work together to prevent damage (e.g., cavitation) to the pump by maintaining an acceptable flow rate through the pump at all times.

Some aspects of the disclosure relate to methods of admixing hydrocarbon liquids (such as those described herein above) from a plurality of tanks into a single pipeline, e.g., using one or more system embodiments herein, to provide in-line mixing thereof. As noted herein above, the systems and methods described herein are intended to be suitable for providing mixing of two or more hydrocarbon liquids in-line, e.g., to provide two-component blended flows, three-component blended flows, or blended flows having more than three components.

In one or more embodiments, for example, methods for admixing two hydrocarbon liquids from a plurality of tanks into a single pipeline may include determining a ratio of a second fluid flow to a first fluid flow based on signals received from a tank flow meter in fluid communication with the second fluid flow and a booster flow meter in fluid communication with a blended fluid flow. In such embodiments, the blended fluid flow may include a blended flow of the first fluid flow and the second fluid flow. In one or more embodiments, the methods described herein may include comparing the determined ratio to a pre-selected set point ratio to thereby determine a modified flow of the second fluid flow in order to drive the ratio toward the pre-selected set point ratio. In some embodiments, the methods described herein may include controlling a variable speed drive connected to a pump to thereby control the second fluid flow through the pump based on the determined modified flow.

In some embodiments, one or more methods as described herein may include maintaining the difference between the determined ratio and the pre-selected set point ratio within a pre-selected error range. For example, the pre-selected error range may be in the range of about 1.0% to −1.0%, about 0.5% to about −0.5%, about 0.25% to about −0.25%, about 0.1% to about −0.1%, or about 0.05% to about −0.05%, based on the pre-selected set point.

In some embodiments, one or more methods as described herein may include determining a flow rate of the first fluid flow, which is gravity-fed, based on the signals received from the tank flow meter and the booster flow meter. In some embodiments, the pressure of the first fluid flow may be about equal to pressure of the second fluid flow at the junction of the blended fluid pipe. In some embodiments, one or more methods as described herein may include controlling a flow control valve in fluid communication with the second fluid flow to thereby control the second fluid flow based on the determined modified flow. In some embodiments, one or more methods may include controlling a flow control valve in fluid communication with the second fluid flow to thereby maintain pressure at the tank flow meter between about 15 psi and about 25 psi.

In one or more embodiments, for example, methods for admixing three hydrocarbon liquids from a plurality of tanks into a single pipeline may include determining percentages of flow rates of a first fluid flow, a second fluid flow, and a third fluid flow in a blended fluid flow based on signals received from a second tank flow meter in fluid communication with the second fluid flow, a third tank flow meter in fluid communication with the third fluid flow, and a booster flow meter in fluid communication with the blended fluid flow. In such embodiments, the blended fluid flow may include a blended flow of the first fluid flow, the second fluid flow, and the third fluid flow. In some embodiments, such methods may include comparing the determined percentages to pre-selected percentages to thereby determine modified flows of the second fluid and the third fluid in order to drive the determined percentages toward the pre-selected percentages. In some embodiments, such methods may include controlling at least one of a second variable speed drive connected to a second pump and a third variable speed drive connected to a third pump to thereby control at least one of the second fluid flow and the third fluid flow based on the determined modified flows.

In some embodiments, one or more methods as described herein may include maintaining the difference between the determined percentages and the pre-selected percentages within a pre-selected error range. For example, in some embodiments, the pre-selected error range may be in the range of about 1.0% to −1.0%, about 0.5% to about −0.5%, about 0.25% to about −0.25%, about 0.1% to about −0.1%, or about 0.05% to about −0.05%, based on the pre-selected percentages.

In some embodiments, one or more methods as described herein may include determining a flow rate of the flow of the first fluid based on the signals received from the second tank first flow meter, the third tank flow meter, and the booster flow meter. In some embodiments, pressures of the first fluid flow, second fluid flow, and third fluid flow may be about the same at the junction of blended fluid pipe. In some embodiments, one or more methods as described herein may include controlling at least one of a second flow control valve in fluid communication with the second fluid flow and a third flow control valve in fluid communication with the third fluid flow to thereby control at least one of the second fluid flow and the third fluid flow based on the determined modified flows. In some embodiments, one or more methods as described herein may include controlling a second flow control valve in fluid communication with the second fluid flow and a third flow control valve in fluid communication with the third fluid flow to thereby maintain pressure at each of the second tank flow meter and the third tank flow meter between about 15 psi and about 25 psi.

Figure 6A:
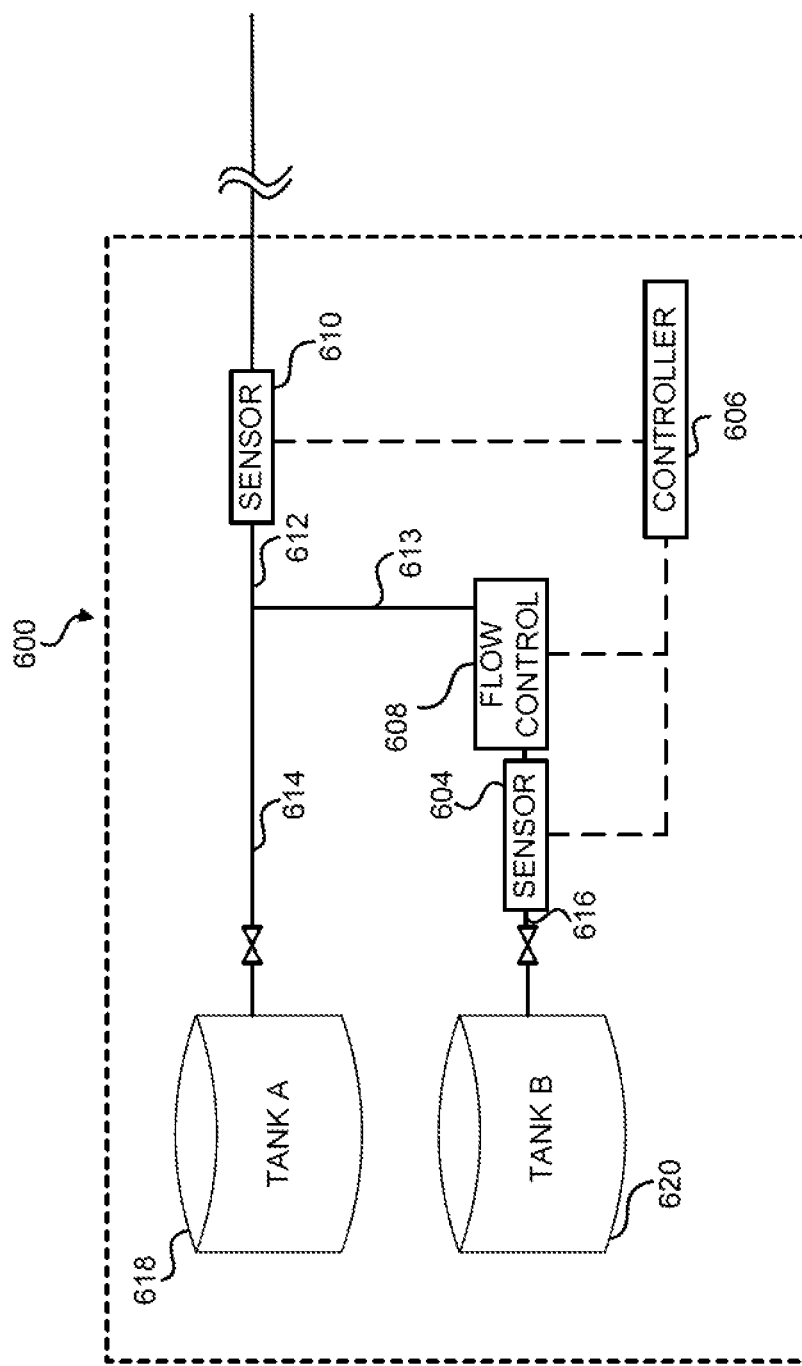
FIGS. 6A through 6B are schematic diagrams of a two-component in-line mixing system positioned at a tank farm to admix two hydrocarbon liquids from separate tanks into a single pipeline according to an embodiment of the disclosure.
Figure 6B:
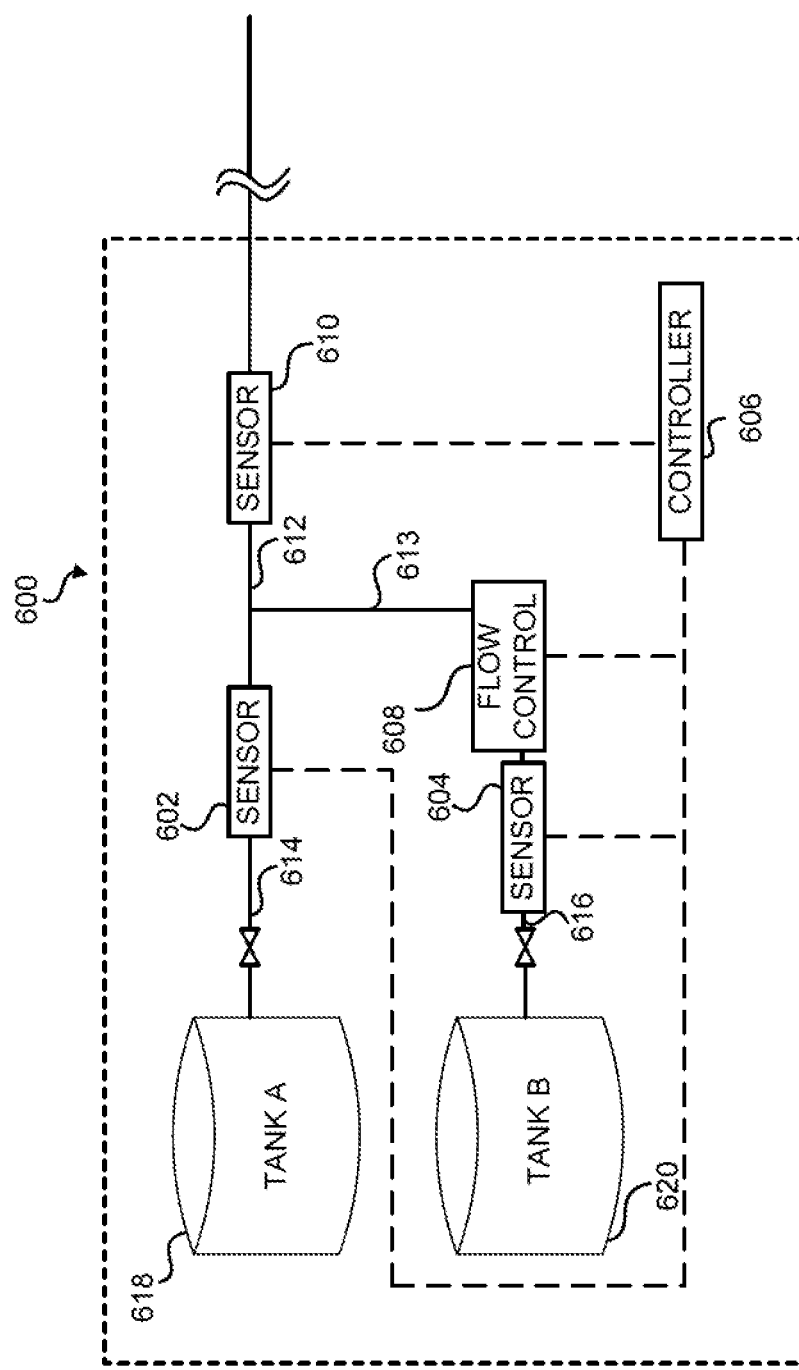

FIGS. 6A through 6B are schematic diagrams of a two-component in-line mixing system positioned at a tank farm to admix two hydrocarbon liquids from separate tanks into a single pipeline according to an embodiment of the disclosure. The in-line mixing system 600 may include two tanks (e.g., tank A 618 and tank B 620), three tanks, or more tanks, as noted above. Tank A 618 may store a less dense or denser liquid than that of the liquid stored in tank B 620, depending on the final blend (in other words, Tank A 618 may store a liquid of a different density than that of tank B 620). Each tank (e.g., tank A 618 and tank B 620) may include or be connected to and in fluid communication with output pipes (e.g., a first output pipe 614 and a second output pipe 616, respectively). Output pipe 614 may attach directly to a blend pipe 612. The flow of liquid stored in tank A 618 through the output pipe 614 may be gravity based or gravity-fed, as described above. Such a flow may be affected by the diameter of the output pipe 614 (e.g., smaller diameter pipes may increase pressure while decreasing flow and larger diameter pipes may decrease pressure while increasing flow). In an embodiment, output pipe 616 may be connected to and in fluid communication with a flow control device 608 (also referred to as a mechanical flow controller, a flow control apparatus, and/or flow control subsystem). In an example, a sensor 604 may be connected to and/or in fluid communication with either the output pipe 616, the flow control device 608, or tank 620. Further, the flow control device 608 may include sensors (e.g., the sensors including the functionality of sensor 604 and/or other functionality, such as the capability to provide a flow rate, pressure, and/or other variables of the in-line mixing system 600). The flow control device 608 may further be connected to and in fluid communication with a mixing pipe 613. The mixing pipe 613 and first output pipe 614 may be connected to and in fluid communication with a blend pipe 612. The blend pipe 612 may admix or mix the liquid flowing from tank A 618 and tank B 620 (e.g., a first liquid and second liquid, respectively) during a blending operation. A sensor 602, as illustrated in FIG. 6B, may be connected to and/or in fluid communication with the output pipe 614. A sensor 610 may be connected to and/or in fluid communication with the blend pipe 612. The sensor 602 and sensor 610 may be the same type of sensor as sensor 604.

In an example, a blending or mixing process or operation may include two or more liquids (e.g., the liquid stored in tank A 618 and tank B 620). The two or more liquids may be hydrocarbon liquids (e.g., petroleum liquids and/or renewable liquids). The density or gravity may or may not be known based on various configurations of the tank farm. For example, upon delivery of a liquid, a user may receive the density or gravity or an estimate density or gravity, based on the type of liquid and/or on a form or ticket. In another example, the liquid delivered to a tank may be of a certain type (i.e., heavy blend crude oil, light blend crude oil, other types of hydrocarbon liquids, and/or renewable liquids) and may be associated with an estimated density or gravity (e.g., for a heavy blend crude oil an API of about 30 degrees or less and for a light blend crude oil an API of higher than 30 degrees). In another example, one density or gravity may be unknown (e.g., a particular tank or pipe may not include a sensor or meter, such as tank A 618 or output pipe 614 in FIG. 6A), while all or some other densities or gravities may be known or measured based on various sensors or meters disposed throughout the in-line mixing system 600 (e.g., sensor 604). In another example, when a density or gravity is unknown, a sensor or meter (e.g., sensor 602 and/or sensor 604 and sensor 610) may be utilized to determine another density or gravity and, based on the other density or gravity (for example, the density or gravity of the second liquid and the blend liquid), the controller 606 may determine the unknown density or gravity. Such sensors or meters may be in signal communication with the controller 606. As noted, approximate, but inexact, densities or gravities may be known. In another example, the densities or gravities of all liquids to be blended may be measured via sensors or meters.

As used herein, "signal communication" refers to electric communication such as hard wiring two components together or wireless communication, as understood by those skilled in the art. For example, wireless communication may be Wi-Fi®, Bluetooth®, ZigBee, forms of near field communications, or other wireless communication methods as will be understood by those skilled in the art. In addition, signal communication may include one or more intermediate controllers, relays, or switches disposed between elements that are in signal communication with one another.

In an example, the sensors (e.g., sensor 602, sensor 604, and other sensors as will be described below) may be hydrometers, gravitometers, densitometers, density measuring sensors, gravity measuring sensors, pressure transducers, flow meters, mass flow meters, Coriolis meters, other measurement sensors to determine a density, gravity, or other variable as will be understood by those skilled in the art, or some combination thereof. In such examples, the sensors may measure the density and/or gravity of a liquid, the flow of the liquid, and/or the pressure of the liquid. As noted above, the controller 606 may be in signal communication with the sensors or meters. The controller 606 may poll or request data from the sensors at various points in a blending operation. While a variety of sensors may be utilized, a hydrometer may be preferred as, typically, hydrocarbon products are characterized by API gravity and a hydrometer may measure the specific gravity of a liquid. Thus, the controller 606 may convert an input API gravity once to specific gravity for further determinations and/or calculations. A mass flow meter or Coriolis meter may also be preferred, as such meters may measure flow and density. While such meters may potentially require conversion of density to gravity, the use of such meters may reduce the total amount of equipment to use. Further, the sensor or meter may be in fluid communication with a liquid to measure the density or gravity or may indirectly measure density or gravity (e.g., an ultrasonic sensor). In other words, the sensor or meter may be a clamp-on device to measure flow and/or density indirectly (such as via ultrasound passed through the pipe to the liquid).

As noted above, the sensors (sensor 602, sensor 604, and other) may measure the density or gravity of a liquid and/or a user may enter or the controller 606 may store a density or gravity. The controller 606 may be configured to perform the determination or calculations described herein based on either density, gravity, specific gravity, or API gravity. The controller 606 may be configured to convert any given measurement based on the type of determinations or calculations (e.g., determinations or calculations based on density, gravity, specific gravity, or API gravity). For example, a user may enter an API gravity for a liquid at a user interface in signal communication with the controller. 606. The controller 606, may convert the entered API gravity to a specific gravity. In such examples, the sensors disposed throughout the system may measure the gravity of other liquids. In another example, the sensors may provide different measurements, e.g., density, and the controller 606 may further convert those measurements to gravity. In another example, the controller 606 may convert the entered API gravity to density. In such examples, the sensors disposed throughout the system may measure the density of other liquids. In another example, the sensors may provide different measurements, e.g., gravity, and the controller 606 may further convert those measurements to density.

As noted, the in-line mixing system 600 may perform various blending or mixing operations or processes. Rather than base control of the flow control device 608 on just the flow and/or mix ratio of the liquids to be blended, the in-line mixing system 600 may base control of the flow control device 608 on the density or gravity of the liquids to be blended and a target blend density or gravity (in other words, the target density or gravity, being a density or gravity that may be sought or desired for the final blend, may be utilized, rather than utilization of just a mix ratio and/or flow of liquids to be blended). As noted, various liquids may be blended via the blend pipe 612. Further, one or more densities or gravities of liquids to be blended (e.g., the density or gravity of liquid stored in tank B 620) may be known or measured and another unknown (e.g., the density or gravity of liquid stored in tank A 618). As the blending or mixing operation or process starts, the controller 606 may determine or obtain a density or gravity from any available sensors of the in-line mixing system 600 (e.g., from sensor 604, sensor 610, and, if available, sensor 602) or from an input (e.g., via a user interface). Based on the density or gravity obtained from the sensors (e.g., sensor 604 and sensor 610), the controller 606 may determine the density or gravity of the liquid of unknown density. As noted, sensors (e.g., sensor 604, sensor 610, and, if present, sensor 602) may be disposed throughout the in-line mixing system 600 or included in flow control devices to measure all densities.

In the blending or mixing operation or process, a blend may be blended to a target blend density or gravity. In other words, the blending or mixing operation or process may be based on a target blend density or gravity. A target blend density or gravity may be set or preset (in other words, loaded into or stored in) in the controller 606. The target blend density or gravity may be set via a user interface in signal communication with the controller 606. For example, a user may set the target blend density or gravity at the user interface and the user interface may send or transmit the target blend density or gravity to the controller 606. In another example, the target blend density or gravity may be determined based on a particular or specified end product or blend. For example, a blending or mixing operation or process may be set to blend a high-volatile bituminous mixture or blend. In such a blend, an ideal or target blend density or gravity may be an API gravity of about 30 degrees. In such examples, the end product or blend (e.g., the high-volatile bituminous mixture or blend) API gravity may be included in or preset in the controller 606. In another example, a user interface may include a selectable list of various options for end products or blends. Based on the selected end product or blend, a target blend density or gravity may be set for a blending or mixing operation or process.

As the blending or mixing operation or process is initiated, the controller 606 may obtain or determine the density or gravity from each of the tanks (e.g., tank A 618 and tank B 620) at the tank farm. The controller 606 may further include, determine, or obtain an initial mix ratio and/or flow rate for any flow control devices in the in-line mixing system 600 (e.g., flow control device 608). In an example, the density or gravity of each liquid to be blended may be a known value. Further and as noted above, the density or gravity of each liquid to be blended may be entered into the user interface and sent or transmitted to the controller 606. In another example, each tank (e.g., tank A 618 and tank B 620) may include sensors or meters (for example, sensor 602 and sensor 604). In other examples, sensors or meters (e.g., sensor 602 and sensor 604) may be disposed on or added onto the pipe (e.g., the first output pipe 614 and second output pipe 616). For example, the sensors or meters may be clamp-on sensors or may be integrated into or onto the pipe or components of the pipe (such as a pump or flow control valve, as described above). In such examples, prior to or just after the initiation of the blending or mixing operation or process, the controller 606 may determine or obtain the density or gravity measurements of the liquids to be blended from the sensors or meters (or obtain the density or gravity measurements where such measurements may be stored, such as from another controller, sub-controller, or memory). The controller 606 may also obtain other data from the sensor or meters, such as flow rate, pressure, and/or other variables.

In yet other examples, one tank and pipeline associated with or corresponding to the tank may not include a sensor or meter (in other words, tank A 618 may or may not include a sensor 602). If a density or gravity of a liquid to be blended is unknown and no sensor is available to measure or determine the density or gravity, the controller 606 may determine the density or gravity based on the other determined or obtained densities or gravities, as well as the blend density or gravity obtained from sensor 610. For example, in FIG. 6A, a second density or gravity may be known or determinable (e.g., measurable via the sensor 604 or a meter). As such, the controller 606 may determine the second density or gravity. Further, the blended density or gravity may be determinable (as in, measureable via the sensor 610 or a meter). Yet further still, a ratio of the two liquids to be blended may be known (as in, the initial ratio of the liquids to be combined, such as a 50:50, 60:40, 30:70 mix ratio and so on or a mix ratio from 1:99 to 99:1). Based on the ratio and the determined densities or gravities, the unknown density of a first liquid (e.g., the liquid stored in tank A 618) may be determined, using, for example, the blended gravity as equal to the first ratio multiplied by the first density or gravity plus the second ratio multiplied by the second density or gravity (rearranged to solve for the first density or gravity or the unknown value), as shown by the following equations:

$$\text{Blended Gravity} = \text{First Gravity} * \text{First Ratio} + \text{Second Gravity} * \text{Second Ratio}$$

$$\text{First Gravity} = \frac{\text{Blended Gravity} - \text{Second Gravity} * \text{Second Ratio}}{\text{First Ratio}}$$

If a first density or gravity is unknown, but the second density or gravity and blended density or gravity are known, the controller 606 may determine the first density or gravity. For example, if a synthetic fuel of a specific gravity of 0.857 is to be mixed with a heavier liquid at an initial mix ratio of 50:50, the controller 606 may determine the unknown specific gravity after measuring the blended gravity at the start of the blending operation, which may be, for example, 0.886. Utilizing the equations above, the controller 606 may determine that the specific gravity of the heavy liquid is 0.915 (e.g., ((0.886−50%)*0.857)/50%).

If all densities or gravities are known or once all densities or gravities have been determined, the flow of the liquids to be blended may be adjusted as needed or at specified time intervals, to produce an accurate and precise blend. The specified time interval may be an interval set by a user at the user interface. In another example, the specified time interval may be an interval set in the controller 606. In such examples, the specified time interval may be a constant value or a variable value (variable, for example, depending on known or unknown densities or gravities). A specified time interval may be an interval of 10 to 20 minutes. In such examples, the amount of specified time intervals may be based on the length of a specified time interval and the total length of the blending or mixing operation or process (e.g., a blend operation of 4 hours may include 12 to 24 specified time intervals of 10 to 20 minutes).

In another example, the specified time intervals may vary in length of time as the blending or mixing operation or process proceeds. For example, neither density or gravity of any of the tanks (e.g., tank A 618 and tank B 620) may be known, while in other examples, an estimate may be known (e.g., based on which liquid is heavy and which is light). In such examples, none of the tanks (e.g., tank A 618 and tank B 620) may include sensors or meter to determine densities or gravities, except for the sensor 610 to measure the blend density or gravity. Further, the controller 606 may check the blend density or gravity (via sensor 610), to allow for adjustment of the flow or mix ratio of liquids, more frequently near the beginning of the blending or mixing operation or process (e.g., at the first 30 minutes of the blending operation) to determine an accurate (e.g., if each density or gravity is unknown) or more accurate (e.g., if an estimate of one or more of the densities or gravities is known) estimate of each liquids density or gravity. The blend density or gravity may be checked or determined, for example, every 1 to 5 minutes or 1 to 10 minutes for the beginning (e.g., the first 30 minutes) of the blending or mixing operation or process and the flow rate or mix ratio adjusted. Such frequent measurements and adjustments may allow for the controller 606 to estimate the densities or gravities of each of the liquids to allow for further and less frequent adjustments during the blending or mixing operation or process, to ensure an accurate blend near (e.g., within about 1% of the target blend density or gravity) or at the target blend density or gravity. After such estimates are determined, the controller 606 may check blend density or gravity and adjust the flow rate or mix ratios of liquids less frequently (i.e., every 10 to 20 minutes), until the blending operation is finished.

At the end of each specified time interval, the controller 606 may determine the current density or gravity of the blend at the blend pipe 612. The controller 606 may then compare the current density or gravity to the target blend density or gravity. If there is a difference between the current density or gravity to the target blend density or gravity, the controller 606 may determine a corrected ratio of the first liquid and second liquid to reach the target blend density or gravity. Based on the corrected ratio, the controller 606 may adjust the flow, via a flow control device, of at least one of the liquids (e.g., the controller 606, via the flow control device 608, may adjust the flow rate of the second liquid from tank B 620, while maintaining the proper pressure).

In an embodiment the flow control device 608 may include a pump, a meter, a pressure transducer, a flow control valve, and/or some combination thereof. In another example, the sensor 604 may be a part of the flow control device 608. In another example, the sensor 604 may be included with or a part of the meter of the flow control device 608 (e.g., a Coriolis meter, to measure flow and density). In such examples, each component of the flow control device 608 may be in signal communication with the controller 606. The flow control device 608 may allow for mix ratio adjustments of the liquids being blended thereby to adjust the density or gravity. For example, the flow control device 608 may, as noted, include a flow control valve. The flow control valve may adjust the flow and/or pressure of the liquid based on opening or closing/pinching the flow control valve. In another example, the flow control device 608 may include a pump and variable speed drive. The variable speed drive may increase/decrease the speed of the pump to increase/decrease the flow rate of a liquid to adjust the ratio of liquids to be blended.

Figure 7A:
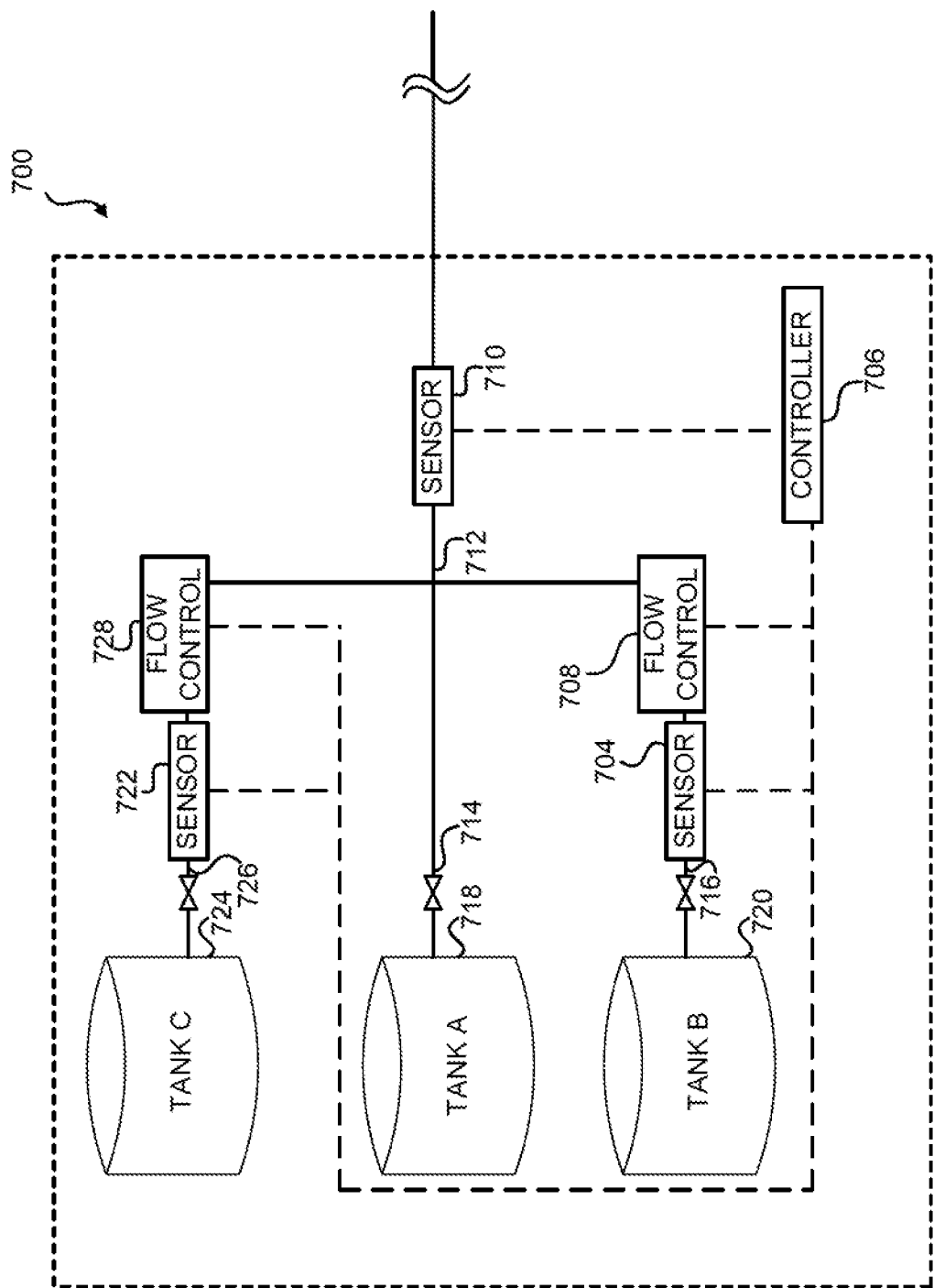
FIGS. 7A through 7B are schematic diagrams of a three-component in-line mixing system positioned at a tank farm to admix three hydrocarbon liquids from separate tanks into a single pipeline according to an embodiment of the disclosure.
Figure 7B:
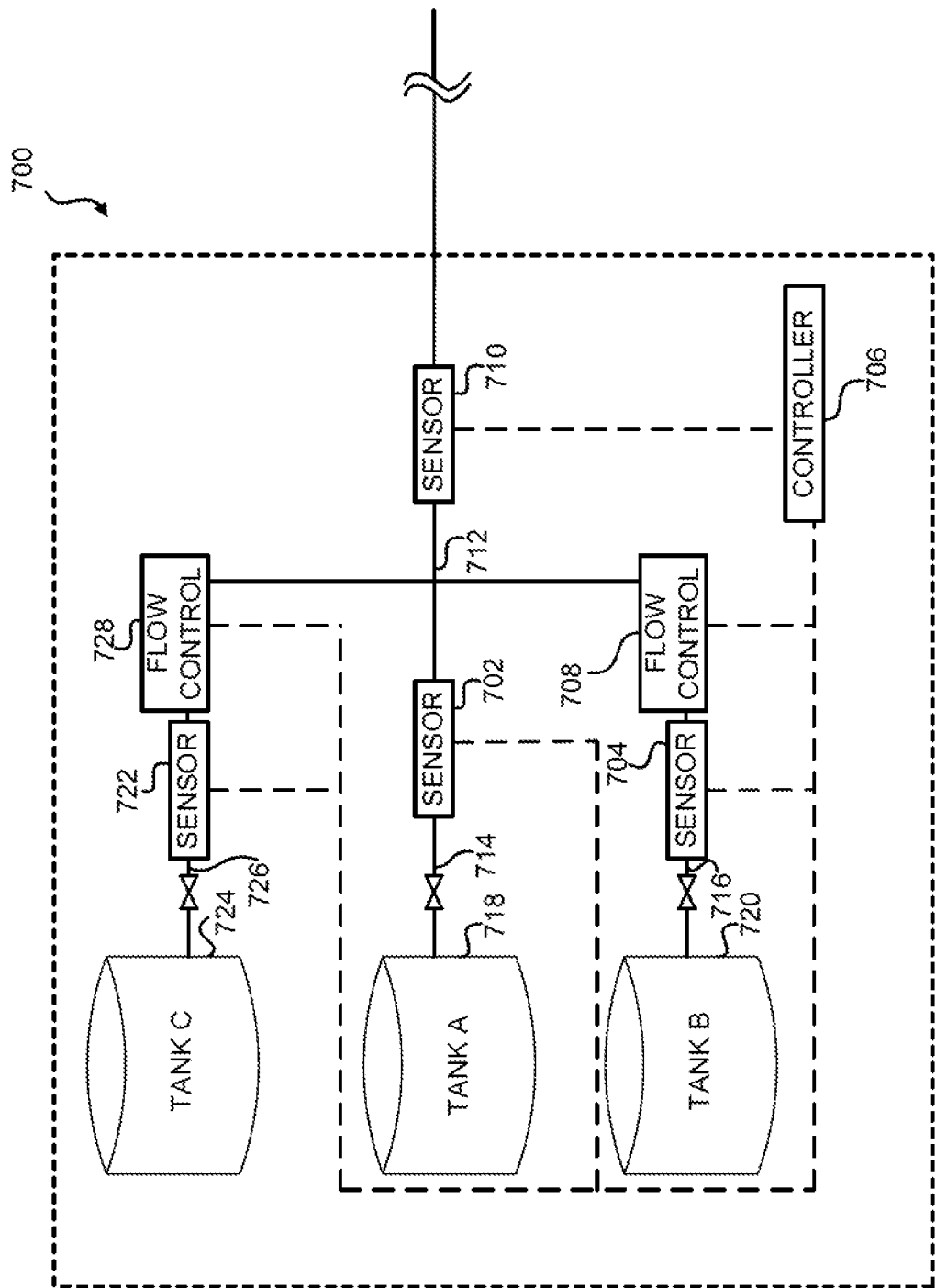

FIGS. 7A through 7B are schematic diagrams of a three-component in-line mixing system 700 positioned at a tank farm to admix three hydrocarbon liquids from separate tanks into a single pipeline according to an embodiment of the disclosure. As described above, a tank farm may include two or more tanks (e.g., tank A 718, tank B 720, and tank 724). In such examples, the tank farm may include extensive piping, as well as numerous other components, such as flow control devices 708, 728, various sensors 702, 704, 710, 722, and a controller 706. In such examples, a blending or mixing operation or process may include at least two of the tanks or all three tanks. In such operations or processes, various initial ratios may be utilized (e.g., 50:45:5, 60:30:10, and so on). Further, a blend may be based on target blend density or gravity (the ratio determined based on the desired blend density or gravity). In such examples, once all the densities or gravities are gathered, the controller 706 may determine the actual blend density or gravity, via the sensor 710 at the blend pipe 712. Based on the target blend density or gravity compared to the actual blend density or gravity, as well as the current liquid ratio and/or a target ratio, the controller 706 may adjust the flow of one or more of the liquids in the blend while the blending or mixing operation or process occurs.

Figure 8A:
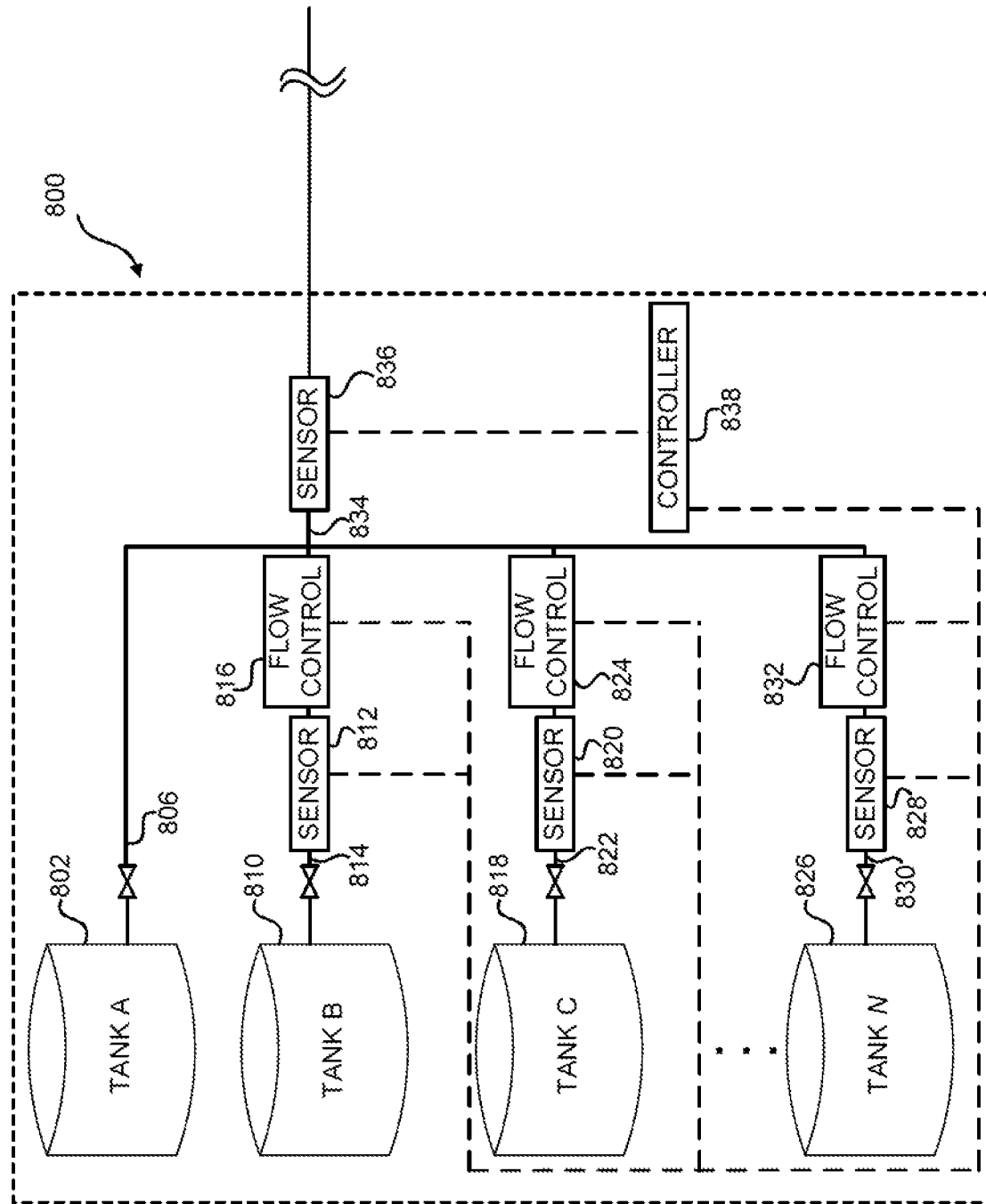
FIGS. 8A through 8B are schematic diagrams of a multi-component in-line mixing system positioned at a tank farm to admix two or more hydrocarbon liquids from separate tanks into a single pipeline according to an embodiment of the disclosure.
Figure 8B:
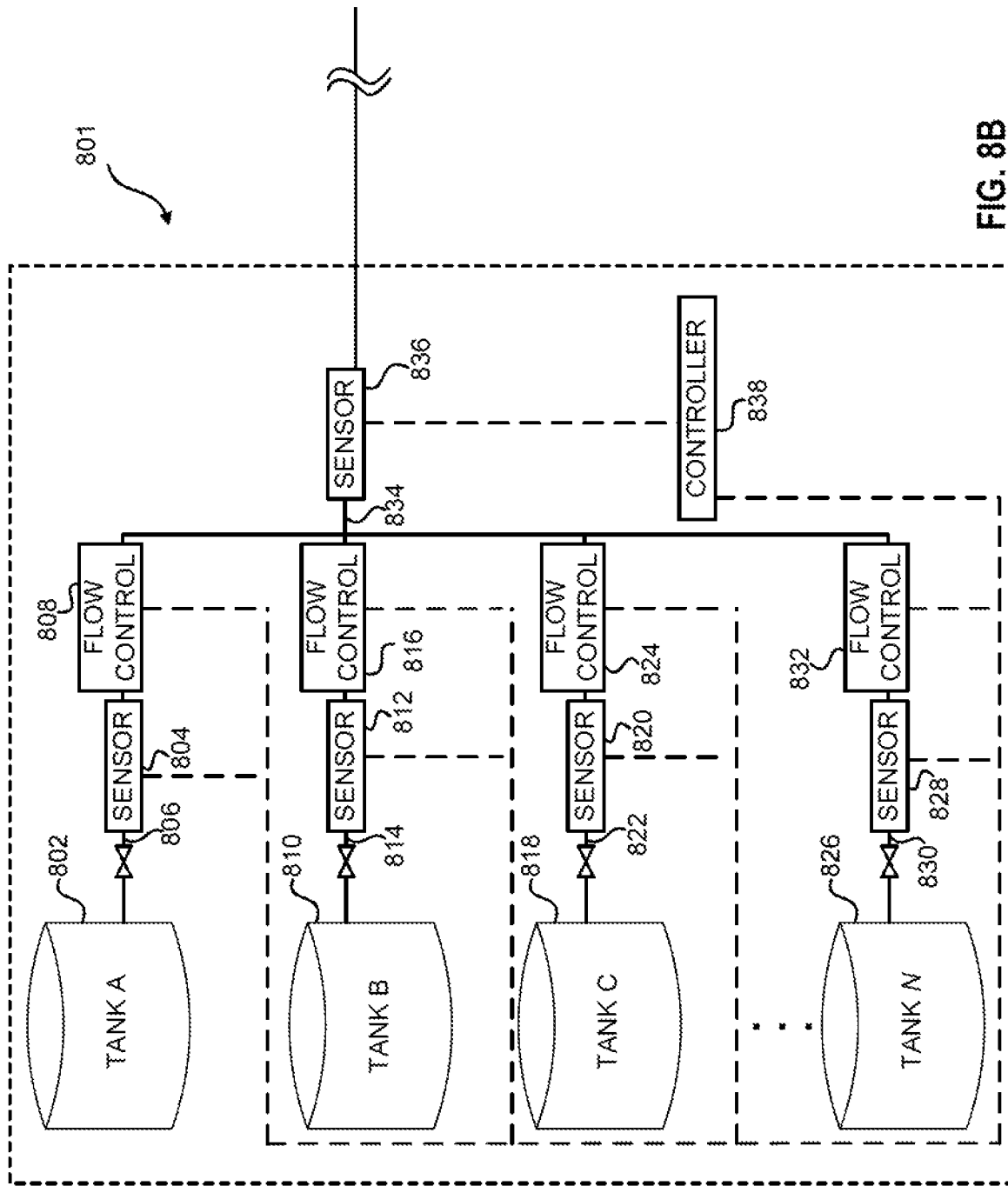

FIGS. 8A through 8B are schematic diagrams of a multi-component in-line mixing system 800 positioned at a tank farm to admix two or more hydrocarbon liquids from separate tanks into a single pipeline according to an embodiment of the disclosure. In such examples, the tank farm may include any number of tanks (e.g., tank A 802, tank B 810, and tank C 818 to tank N 826) to store various liquids for various blending operations. In such examples, different tanks may be used for different blending operations. In other words, two or more tanks may be active at a time, while other tanks may be de-active (as in, not utilized in a blending operation). Such tanks may store particular liquids not utilized for specific blends or may be empty at that particular point in time. Thus, various amounts of liquids may be blended in such a tank farm (from 3 component blending to 5 component blending or more).

As noted, the tank farm may include various components and some tanks may utilize the same components (as in, tank B 810 when active may use a set of components, while tank C 818 remains de-active and tank C 818 may use the same set of components, while tank B 810 remains de-active). The components utilized at the tank farm may include flow control devices 816, 824, 832, various sensors 804, 812, 820, 828, 836, and a controller 838.

Figure 9:
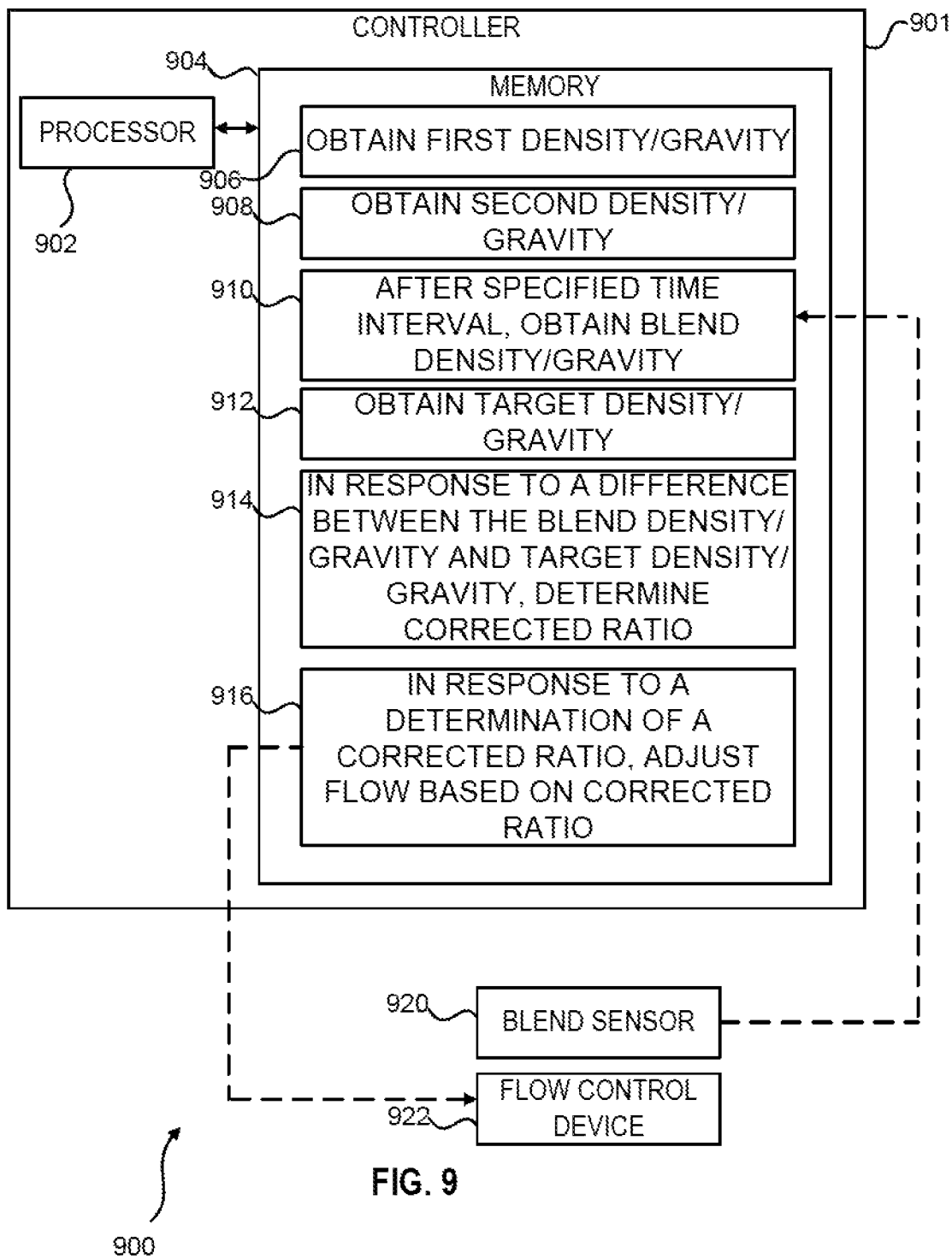
FIG. 9 is a simplified diagram illustrating a control system for managing a multi-component in-line mixing system according to an embodiment of the disclosure.

FIG. 9 is a simplified diagram illustrating a control system for managing a multi-component in-line mixing system according to an embodiment of the disclosure. The control system, as described herein, may be a controller 901, one or more controllers, a PLC, a SCADA system, a computing device, and/or other components to manage a blending operation. The controller 901 may include one or more processors (e.g., processor 902) to execute instructions stored in memory 904. In an example, the memory 904 may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 904 may store or include instructions executable by the processor 902. As used herein, a "processor" may include, for example one processor or multiple processors included in a single device or distributed across multiple computing devices. The processor 902 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The instructions may include an instruction 906 to obtain or determine a first density or gravity. In such examples, at the beginning of or prior to start of a blending operation, the controller 901 may obtain the first density or gravity from a user (e.g., the density or gravity entered via a user interface). In another example, the controller 901 may obtain the first density or gravity from a sensor. The controller 901 may obtain the first density or gravity from a ticket or order slip (or another form including such data). In another example, the controller 901 may determine the density or gravity based on other known densities or gravities. The controller 901 may include the first density or gravity as a preset value. In such examples, a particular tank may be store the same liquid for each blending operation. As such, the density or gravity of the liquid may be the same or slightly different per batch. The instructions may include an instruction 908 to obtain a second density or gravity, similar to that of or the same as instructions 906. In other words, the second density or gravity may be obtained via a user at a user interface, via measurement (as in, measurement from a sensor), via determination based on other measurements and/or data, or via a preset density or gravity.

The instructions may include an instruction 910 to obtain a target blend density or gravity. Such a target blend density or gravity may be determined based on the product to be blended or mixed. In another example, the target blend density or gravity may be based on user input via a user interface. In yet another example, the target blend density or gravity may be preset or stored in the memory 904 of the controller 901. The instructions may include an instruction 910 to, after a specified time interval, obtain or determine the actual blend density or gravity. Such instructions 910 may determine the actual blend density or gravity based on a measurement from a blend sensor 920.

After reception of the actual blend density or gravity, the controller 901 may compare the actual blend density or gravity to the target blend density or gravity. The instructions may include an instruction 914 to, based on a difference between the actual blend density or gravity and the target blend density or gravity, determine a corrected ratio. In other words, the corrected ratio may be the mix ratio of the first and second liquid (or any other liquids to be blended) transported to a blend pipe for mixing.

The instructions may include instructions 916 to, in response to a determination of a corrected ratio, adjust the flow of one or more of the liquids, based on the corrected ratio. Such adjustments may occur during operation or execution of the blending or mixing operation or process. For example and as noted, the target blend may be a 30 API bend. If at a current ratio of 60:40, the blend is currently at 25 API, the lighter of the two fluids flow rate may be increased to increase the API gravity of the overall blend (e.g., an increase from 60:40 to 50:50, 40:60, etc. to increase the API gravity).

For example, a blend may be a 60:40 (first liquid:second liquid) blend with a target of an API of 30 degrees. In such examples, the first liquid, which may be a heavier liquid, may be fed via gravity to the blending pipe at a constant flow and pressure and the second liquid, which may be a lighter liquid, may be fed to the blend pipe, via a flow control device 922, at a set flow and/or pressure. At the beginning of such a blending operation, the current or actual blend API may be 28 degrees. Based on the difference between the target blend gravity and the actual blend gravity and the new determined ratio, the flow control device 922 may increase the flow of the second liquid during the blending operation, thus adjusting the mix ratio or increasing the ratio of the second liquid in the blend to ensure that the API is increased, so as to reach the target API. Such operations may ensure an accurate blend that meets the target blend density or gravity.

Other instructions may include instructions to obtain a current flow rate and/or mix ratio based on data obtained from the flow control device 922 and/or the blend sensor 920. Further, at the initiation of a blending operation the controller 901 may set the initial flow rate of liquids from each tank. The initial flow rate may be based on a known first density and second density, on an estimate of the first density and second density, or on an arbitrary mix ratio (e.g., an initial mix ratio may be 50:50 and, as such, the flow rate, via the flow control device 922, may be set to an appropriate setting to allow for the first liquid and second liquid to mix at the 50:50 ratio). In other examples, the flow rate of one liquid, e.g., the first liquid, may be a constant value, as the liquid may be gravity fed to the blend pipe. In such examples, the flow rate or mix ratio may be utilized to determine unknown densities or gravities.

Figure 10:
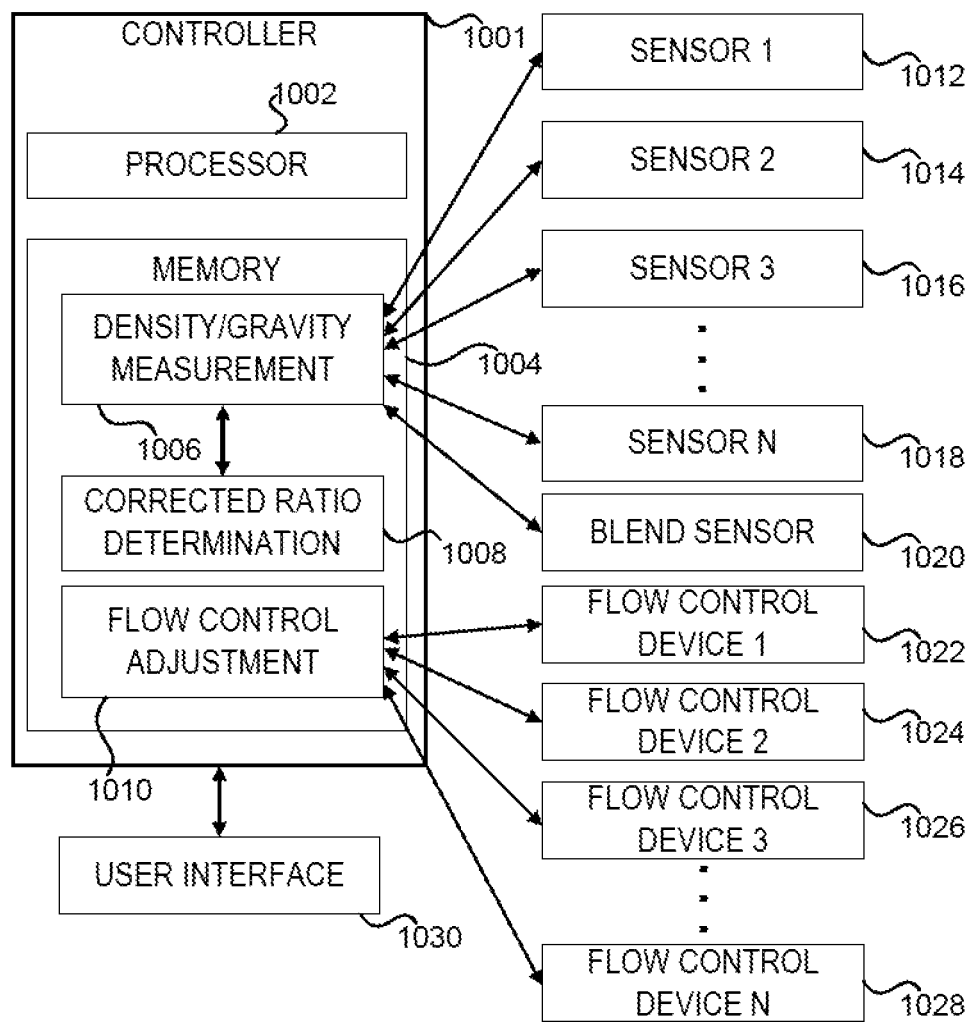
FIG. 10 is another simplified diagram illustrating a control system for managing a multi-component in-line mixing system according to an embodiment of the disclosure.

FIG. 10 is another simplified diagram illustrating a control system for managing a multi-component in-line mixing system according to an embodiment of the disclosure. In such examples, the controller 1001 may include instructions to measure or obtain a density or gravity from various sensors (e.g., blend sensor 1020, sensor 1012, sensor 1014, sensor 1016, sensor N 1018, etc.) or from a user interface 1030. Further, the controller 1001 may include instructions to determine a corrected ratio based on the determined or obtained densities or gravities. Further still, the controller 1001 may include instructions to adjust the flow and/or pressure of one or more of the various liquids being blended, via one or more flow control devices (e.g., flow control device 1022, flow control device 1024, flow control device 1026, flow control device N 1028, etc.), based on the determined or obtained densities or gravities. Such adjustments may occur during continuous operation of the blending or mixing operations or processes.

In an example, the sensors (e.g., blend sensor 1020, sensor 1012, sensor 1014, sensor 1016, sensor N 1018, etc.) may provide measurements as a density or as a gravity (e.g., a specific gravity). However, some values may be entered via the user interface as an API gravity. For example, if there are no sensors associated with a first tank or first output pipe, a user may enter the density or gravity of the first liquid at the user interface 1030. The user may enter such a value as an API gravity, which may typically be utilized to describe characteristics of hydrocarbon liquids. As such, the controller 1001 may include instructions to convert measurements, whether from density or specific gravity, to an API gravity or to convert an API gravity to a density or specific gravity. In another example, the user interface 1030 may include an option to select the type of measurement to enter when entering in a density or gravity (e.g., a list or drop-down list including measurements as density, specific gravity, or API gravity).

Figure 11:
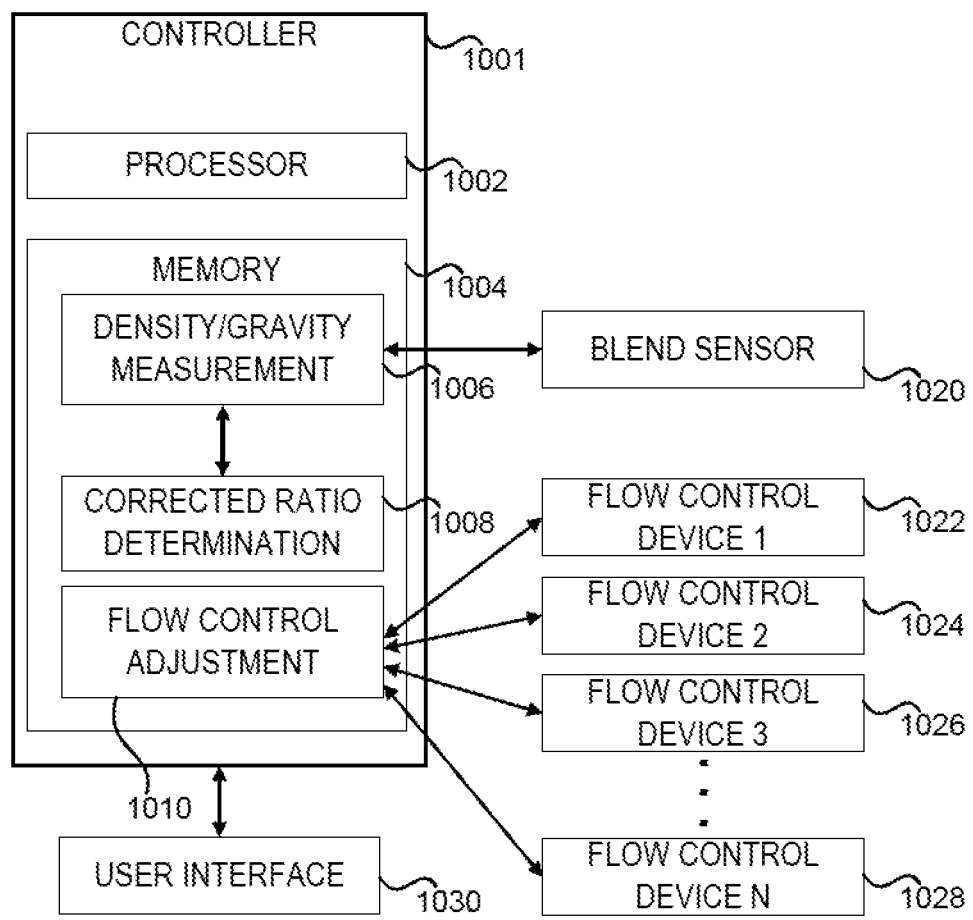
FIG. 11 is another simplified diagram illustrating a control system for managing a multi-component in-line mixing system according to an embodiment of the disclosure.

FIG. 11 is another simplified diagram illustrating a control system for managing a multi-component in-line mixing system according to an embodiment of the disclosure. As noted above, the controller 1001 may include instructions 1006 to measure or obtain the density or gravity of liquid associated with a corresponding sensor or meter (e.g., blend sensor 1020). In some cases, a tank farm may include a sensor (e.g., blend sensor 1020) corresponding to the blend pipe, rather than a sensor for the blend pipe and for each tank or pipe corresponding to each tank. In such cases, the density or gravity from each tank may be known, input at a user interface 1030, or be estimated as described above.

Figure 12:
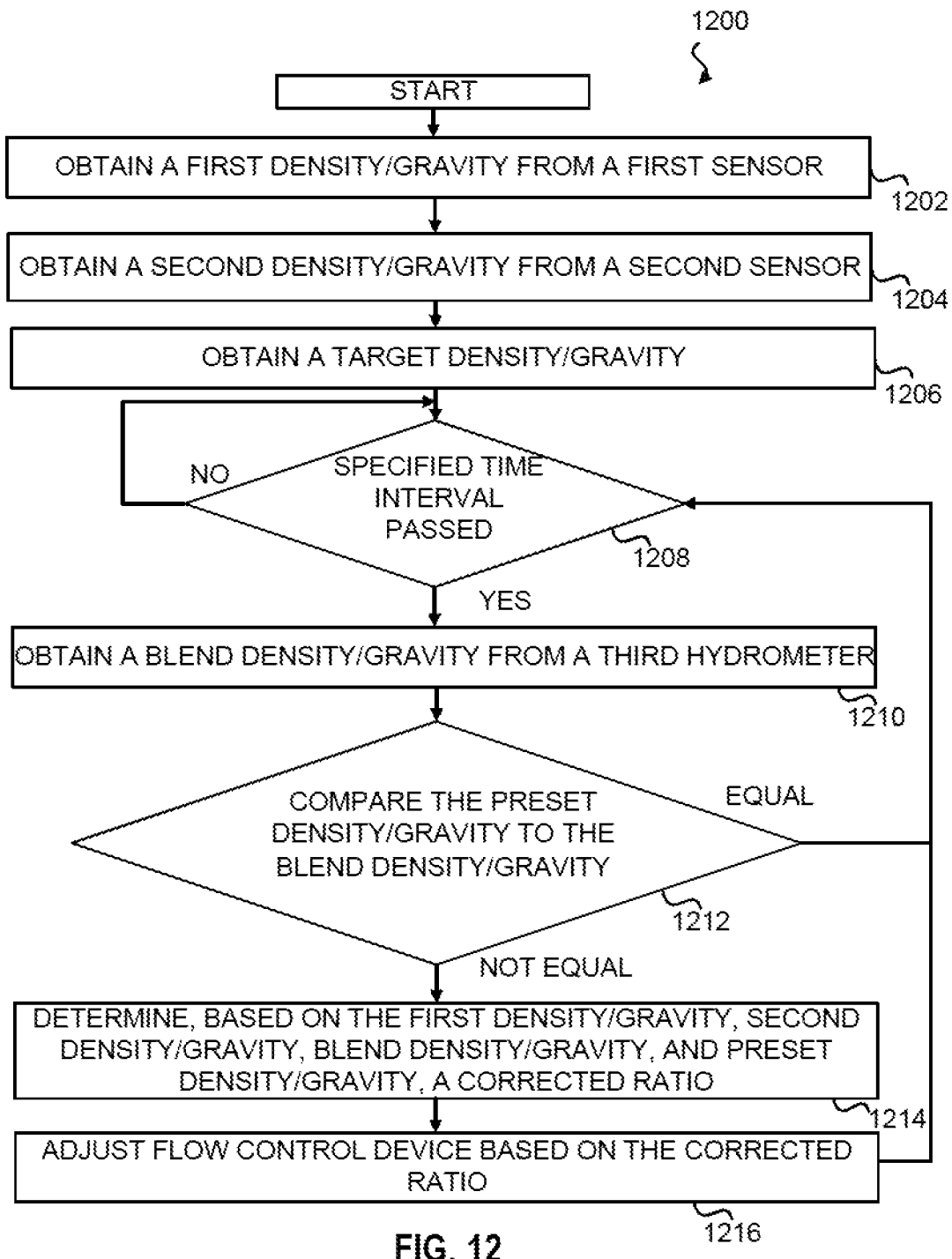
FIG. 12 is a flow diagram, implemented in a controller, for managing a multi-component in-line mixing system according to an embodiment of the disclosure.
Figure 13:
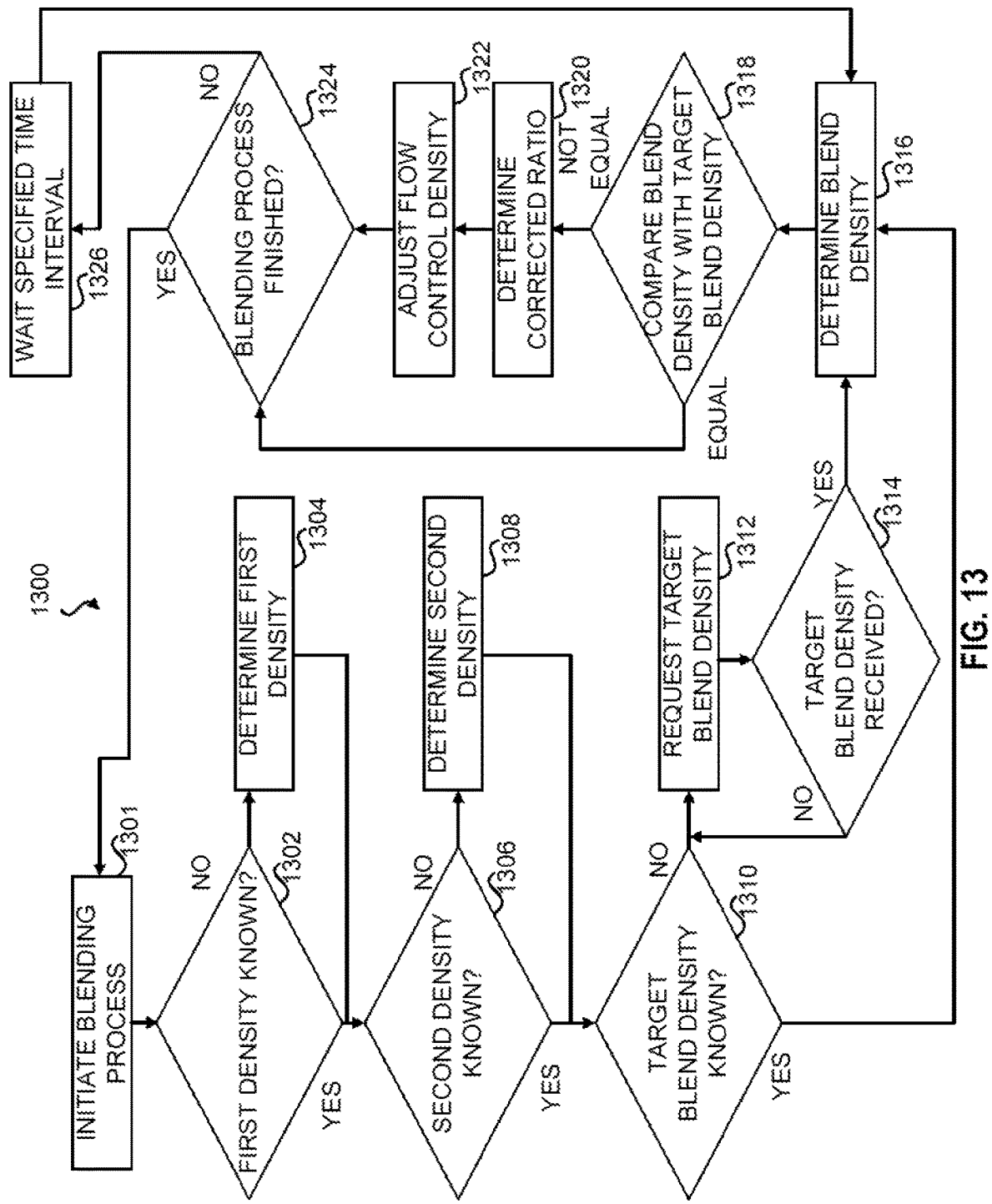
FIG. 13 is a flow diagram, implemented in a controller, for managing a multi-component in-line mixing system according to an embodiment of the disclosure.

FIGS. 12 through 13 are flow diagrams, implemented in a controller, for managing a multi-component in-line mixing system according to an embodiment of the disclosure. The method is detailed with reference to the controller 1001 and system 1000 of FIG. 10. Unless otherwise specified, the actions of methods 1200 and 1300 may be completed within the controller 1001. Specifically, methods 1200 and 1300 may be included in one or more programs, protocols, or instructions loaded into the memory of the controller 1001 and executed on the processor or one or more processors of the controller 1001. The order in which the operations are described is not intended to be construed as a limitation, and any number of the described blocks may be combined in any order and/or in parallel to implement the methods.

At block 1202, the controller 1001 may obtain or determine a first density or gravity from a first sensor 1012. In another example, the controller 1001 may obtain the first density or gravity from the user interface 1030 (e.g., based on an input from a user). In another example, the first density or gravity may be determined based on other known or determined densities or gravities. At block 1204, the controller 1001 may obtain or determine a second density or gravity from a second sensor 1014 (similar to that of obtaining or determining the first density or gravity from the first sensor 1012). In other examples, more densities or gravities, based on other liquids to be blended in a blending or mixing operation or process, may be obtained from other sensors located or disposed at the tank farm (e.g., a third sensor 1016, sensor N 1018, etc.).

At block 1206, a target blend density or gravity may be obtained. In such examples, the target blend density or gravity may be input at the user interface 1030. The target blend density or gravity may be preset and stored in memory 1004. At block 1208, the controller 1001 may determine whether a specified time interval has passed. If the specified time interval has not passed, the controller 1001 may continue to check whether the specified time interval has passed after a certain period of time. If the specified time interval has passed, the controller 1001 may obtain an actual blend density or gravity from a third sensor (e.g., blend sensor 1020) located at the blend pipe. The actual blend density or gravity may be the density or gravity of a blended liquid comprised of a ratio of the first liquid, the second liquid, and/or other liquids included in the blend operation.

At block 1212 the controller 1001 may compare the target density or gravity to the actual blend density or gravity. If the target blend density or gravity is equal to the actual blend density or gravity, the controller 1001 may wait for the next specified time interval to pass. If the values are not equal, at block 1214, the controller 1001 may determine a corrected ratio, based on the densities or gravities of each liquid being blended, the target blend density or gravity, and the actual blend density or gravity. In another example, prior to determination of a corrected ratio the controller 1001 may convert any number of measurements to different types of measurements, depending on controller 1001 configuration and/or measurements obtained from sensors disposed throughout the system. For example, the controller 1001 may be configured to determine a corrected ratio based on gravity, while the sensors may measure density. In such examples, the controller 1001 may be configured to convert the densities measured to gravities, prior to either comparison or determination of the corrected ratio. In another example, the controller 1001 may be configured to determine a corrected ratio based on density, while the sensors may measure gravity. In such examples, the controller 1001 may be configured to convert the gravities measured to densities, prior to either comparison or determination of the corrected ratio. In another example, the controller 1001 may be reconfigured to perform determinations or calculations based on the measurements performed by the sensors. In other words, a controller 1001 may be reconfigured to perform determinations based on density or gravity if the sensors measure density or gravity, respectively.

At block 1216, the controller 1001 may adjust the flow, via the flow control device of either the first liquid and second liquid (e.g., via flow control device 1022 and flow control device 1024, respectively), the second liquid (e.g., via the flow control device 1024), other liquids being blended (e.g., flow control device 1026, flow control device 1028, etc.), or a combination thereof.

For example, a first liquid from a first tank may be gravity-fed to the blend pipe. In such examples, the flow control device for the second liquid of the second tank may adjust the flow of the second liquid, thus controlling or adjusting the mix ratio of the first liquid and second liquid. Similar to the equations noted above, the new ratio may be calculated based on the first liquid's density or gravity, the second liquid's density or gravity, the actual blend density or gravity, and the target blend density or gravity. The following equation may be utilized to determine the corrected ratio (while the equation is shown utilizing gravity, density or API gravity may be utilized):

$$\text{Second Ratio} = \frac{\text{Target Blend Gravity} - \text{First Gravity}}{\text{First Gravity} - \text{Second Gravity}}$$

Based on the new second ratio, the flow control device may adjust the flow of the second liquid. In other examples, both the first liquid and second liquid may pass through a flow control device. In such examples, the first liquid flow and the second liquid flow may both be adjusted. While the equation described above is based on a two component blend, the equation may be utilized for a three or more component blend.

For FIG. 13, at block 1301, the controller 1001 may initiate a blending process or receive a signal to initiate a blending process. In such examples, the controller 1001 may not begin the actual blending process until a first density or gravity and a second density or gravity are determined. In another example, the controller 1001 may start the blending process upon reception of the initiation signal or indicator and determine the first and second densities or gravities as the blending process occurs.

At block 1302, the controller 1001 may determine whether a first density or gravity of a first liquid from a first tank is known. If the first density or gravity is unknown, at block 1304, the controller 1001 may determine the first density or gravity (e.g., via sensor, via the equations referenced above, or via a user interface 1030). At block 1306, the controller 1001 may determine if a second density or gravity of a second liquid from a second tank is known. If the second density or gravity is unknown, at block 1308, the controller 1001 may determine the second density or gravity (e.g., via sensor, via the equations referenced above, or via a user interface 1030).

At block 1310, the controller 1001 may determine whether the target blend density or gravity is known. If the target blend density or gravity is unknown, the controller 1001, at block 1312, may request the target blend density or gravity from a user (e.g., sending a prompt to a user interface indicating a target blend density or gravity may be entered to proceed). At 1314, if the target blend density or gravity has not been received the controller 1001 may wait for the target blend density or gravity. If the target blend density or gravity is received, the controller 1001, at block 1316, may determine the actual blend density or gravity, the blend density or gravity based on the density or gravity of the first and second liquid and the ratio the first and second liquid are blended or mixed at.

At block 1318, the controller 1001 may compare the blend density or gravity with the target blend density or gravity. If the blend density or gravity and the target blend density or gravity do not match, at block 1320 the controller 1001 may determine the corrected ratio, based on the density or gravity of the first liquid, the second liquid, the blended liquid, and the ratio of the first liquid and second liquid. At block 1322, the controller 1001 may adjust any flow control devices present to adjust the flow of one or more of the liquids to be blended or mixed.

At block 1324, the controller 1001 may determine whether the blending process is finished. If the blending process is finished, the controller 1001, at block 1326 may wait a specified time period and then determine the blend density again. Once the blending process is finished, the controller 1001 may initiate another blending process.

FIGS. 14A, 14B, 14C, and 14D are schematic diagrams of in-line mixing systems positioned at a tank farm 1400 to admix two or more hydrocarbon liquids from separate sets of tanks 1402, 1403 into a single pipeline according to an embodiment of the disclosure. In an embodiment, rather than employing components, such as pumps, meters, and sensors, at each individual tank at the tank farm 1400, a different configuration to, e.g., holistically, maintain pressure and flow rate of hydrocarbon fluid flows from a plurality of tanks to a single pipeline at a lower cost may be utilized. Such configurations may include, for at least two sets of in-series tanks 1402, 1403, pumps 1412, 1442 with corresponding spillback loops 1410, 1440 added to the at least two sets of in-series tanks 1402, 1403. In one or more embodiments, each set of in-series tanks 1402, 1403 may be physically separated, e.g., by distance, such as 500 feet, 1,000 feet, 1,500 feet, 2,000 feet, 2,500 feet, 3,000 feet, 3,500 feet, 4,000 feet, 4,500, feet, 5,000 feet, a full mile or more. In other embodiments, each set of in-series tanks 1402, 1403 may be located at different tank farms, proximate tank farms, or at separate locations within the tank farm 1400.

In one or more such embodiments, each set of in-series tanks 1402, 1403 may include a varying number of tanks (e.g., two tanks, three tanks, or more). For example, a first set of tanks 1403 may include two sets of tanks in series, each set including three tanks. As noted, the first set of tanks 1403 may include several tanks, such as tank D 1422, tank E 1424, tank F 1426, tank G 1434, tank H 1436, and tank 11438. The first spillback loop 1440 may loop around a portion of or all of the first set of tanks 1403 (for example, the first spillback loop 1440 as shown loops around pump 1442, tank G 1434, tank H 1436, and tank 11438). In other words, the first spillback loop 1440 may include a first header 1445 to which tank G 1434, tank H 1436, and tank I 1438 connect to via their respective output pipes (e.g., output pipe 1435), a pump 1442 that has an inlet that connects to the first header 1445 and an outlet that connects to a first booster pipe 1457, and a first spillback pipe 1451. The first spillback pipe 1451 connects at one end portion to the first booster pipe 1457 at a point downstream of pump 1442 and connects at its other end portion to the first header 1445 at a point upstream of the points where the output pipes (e.g., output pipe 1435) of tank G 1434, tank H 1436, and tank I 1438 connect to the first header 1445. In one or more embodiments, the output pipes, the first header 1445, and the first booster pipe 1457 may be considered a single first pipe that delivers hydrocarbon fluids/liquids from a set of tankage to junction 1452 (i.e., the point of blending with other hydrocarbon fluids/liquids from another set of tankage). In one or more other embodiments, the first header 1445 may extend downstream of pump 1442 such that pump 1442 is disposed in the first header 1445 and the first spillback pipe 1451 connects to the first header 1445 both downstream of and upstream of pump 1442.

The first spillback loop 1440 may include a motor operated valve 1444, a control valve 1448, and a one-way valve 1461. The motor operated valve 1444 may open and close (e.g., fully open and fully close) to allow for the use of the first spillback loop 1440. In one embodiment, the controller 1460 may include instructions to open the motor operated valve 1444 upon initiation of a blending or mixing operation or process. In another example, the controller 1460 may include instructions to open or close the motor operated valve 1444 at any other point during the blending or mixing operation or process. The control valve 1448 may open and close at varying percentages to allow for adjustment of the flow rate and/or pressure of hydrocarbon liquids/fluids entering from the tanks (e.g., by adjusting the flow spilling back or flowing/entering into the spillback pipe 1451/loop). The one-way valve 1461 may prevent hydrocarbon liquid/fluid from flowing in the reverse direction through the first spillback loop 1440 (i.e., by-passing pump 1442).

As noted above, each set of in-series tanks 1402, 1403 may include a varying number of tanks (e.g., two tanks, three tanks, or more). For example, a second set of tanks 1402 may include one set of tanks in "series." As noted, the second set of tanks 1402 may include several tanks, such as tank A 1404, tank B 1406, and tank C 1408. The second spillback loop 1410 may loop around a portion of or all of the second set of tanks 1402 (for example, the second spillback loop 1410 as shown loops around pump 1412, A 1404, tank B 1406, and tank C 1408). In other words, the second spillback loop 1410 may include a second header 1415 to which tank A 1404, tank B 1406, and tank C 1408 connect to via their respective output pipes (e.g., output pipe 1405), a pump 1412 that has an inlet that connects to the second header 1415 and an outlet that connects to a second booster pipe 1455, and a second spillback pipe 1417. The second spillback pipe 1417 connects at one end portion to the second booster pipe 1455 at a point downstream of pump 1412 and connects at its other end portion to the second header 1415 at a point upstream of the points where the output pipes of tank A 1404, tank B 1406, tank C 1408 connect to the second header 1415. In one or more embodiments, the output pipes, the second header 1415, and the second booster pipe 1455 may be considered a single second pipe that delivers hydrocarbon fluids/liquids from a set of tankage to junction 1452 (i.e., the point of blending with other hydrocarbon fluids/liquids from another set of tankage). In one or more other embodiments, the second header 1415 may extend downstream of pump 1412 such that pump 1412 is disposed in the second header 1415 and the second spillback pipe 1417 connects to the second header 1415 both downstream of and upstream of pump 1412.

The second spillback loop 1410 may include a motor operated valve 1414, a control valve 1416, and a one-way valve 1462. The motor operated valve 1414 may open and close (e.g., fully open and fully close) to allow for the use of the second spillback loop 1410. In one embodiment, the controller 1460 may include instructions to open the motor operated valve 1462 upon initiation of a blending or mixing operation or process. In another example, the controller 1460 may include instructions to open or close the motor operated valve 1414 at any other point during the blending or mixing operation or process. The control valve 1416 may open and close at varying percentages to allow for adjustment of the flow rate and/or pressure of hydrocarbon liquids entering from the tanks (e.g., by adjusting the flow spilling back or flowing into the spillback pipe/loop). The one-way valve 1462 may prevent backflow or hydrocarbon liquid/fluid from flowing in the reverse direction into and/or through the second spillback loop 1410 (i.e., by-passing pump 1412).

Each of the sets of in-series tanks (e.g., the first set of tanks 1403, the second set of tanks 1402, and/or another set of tanks at the tank farm 1400), and each of the tanks therein, may include different types of hydrocarbon liquids, with each of the hydrocarbon liquids having one or more of a varying viscosity, density, amount, and/or exhibiting other characteristics. In one or more embodiments, the hydrocarbon liquid may be a crude oil. A hydrocarbon liquid/fluid may flow from its respective tank through the output pipe 1405, 1435 of the tank, into the header 1415, 1445, and through a corresponding pump 1412, 1442 (e.g., disposed in the header). Thereafter, a portion of the hydrocarbon liquid/fluid may then flow through a corresponding spillback loop 1410, 1440 (e.g., based on percentage open of a control valve 1416, 1448). The remaining portion of the hydrocarbon liquid/fluid may flow to junction 1452. Junction 1452 is configured to allow for at least two hydrocarbon liquids to flow to a blend pipe 1453 (e.g., via second booster pipe 1455 or first booster pipe 1457), where the at least two hydrocarbon liquids may be blended or mixed. As shown, the pipe connected to the junction 1452 may either be the second booster pipe 1455 or an extension of the second header 1415. Similarly, the other pipe connected to the junction 1452 may either be the first booster pipe 1457 or an extension of the first header 1445. Other pipes, to allow for other hydrocarbon liquid/fluids, may connect to junction 1452. Throughout a blending operation, the flow rate and pressure of hydrocarbon liquids/fluids from the tanks utilized for the blending operation may vary based on different factors, such as liquid level in a tank, line speedups (e.g., flow rate and pressure increase at the output line), and/or flow interruptions, such as from switching or swapping from one tank to another. In at least one embodiment, one of the spillback loops and associated pumps (e.g., the first spillback loop 1440, the second spillback loop 1410, or any other spillback loops for any other series of tanks at tank farm 1400, another tank farm or tank farms) may operate to allow for a continuous and/or constant flow rate and pressure to junction 1452. The other spillback loops and pumps at the tank farm 1400 may operate to adjust the flow rate of hydrocarbon liquid/fluid flow at junction 1452, based on a target blend or mixture (either based on flow rate, density, or gravity).

In another embodiment, the tank farm 1400 may include one or more meters (e.g., meter 1420 and/or meter 1454) or sensors. The meters or sensors may measure flow rate, pressure, density, gravity, or some other value or characteristic of hydrocarbon liquids flowing through an associated portion of pipe or pipeline. The meters or sensors may be in fluid communication with the hydrocarbon liquid to measure the value or characteristic of the hydrocarbon liquid directly, or the meters or sensors may clamp on to the pipeline to measure the values or characteristics of the hydrocarbon liquids indirectly, e.g., via ultrasonic measurement.

During a blending or mixing operation, the pressure and flow rate of hydrocarbon liquids/fluids that are recirculating in at least one of the spillback pipes/loops associated with a set of in-series tanks may be held or maintained constant, e.g., at or driven to a set point, as a result of control valve adjustments of the corresponding spillback loop. In another embodiment, the pressure and flow rate of hydrocarbon liquids/fluids flowing to junction 1452 from one of the booster pipes (e.g., the second booster pipe 1455 or the first booster pipe 1457) may be held constant, e.g., at or driven to a set point, as a result of control valve adjustments of the corresponding spillback loop (in other words, the corresponding spillback loop may hold a constant flow from a corresponding booster pipe based on control valve adjustments), rather than holding the pressure and flow rate of hydrocarbon liquids/fluids that are recirculating in at least one of the spillback pipes/loops constant. Such adjustments, e.g., of the control valve, occur by changing the opened/closed percentage of the control valve of the corresponding spillback loop (e.g., control valve 1416 of the second spillback loop 1410 and/or control valve 1448 of the first spillback loop 1440), based on an estimated or calculated spillback flow rate. The estimated or calculated spillback flow rate may be determined from a measured differential pressure across the control valve of the spillback loop, the density of the hydrocarbon fluid/liquid flowing through the spillback pipe/loop, and the open percentage of the control valve. In one or more embodiments, the differential pressure may be measured via a differential pressure transmitter (DPIT) (e.g., DPIT 1418 of the second spillback loop 1410 and/or the DPIT 1450 of the first spillback loop 1440), as will be understood by those skilled in the art. Based on the measured differential pressure, hydrocarbon density and characteristics of the control valve (e.g., open percentage, pump curves, etc.), the estimated or calculated spillback flow rate may be used to adjust the open percentage of the control value, e.g., by comparing the estimated or calculated spillback flow rate to a desired or pre-selected flow rate set point.

A blending/mixing operation or process, according to one or more embodiments, may begin by establishing a target blend ratio (e.g., 50:50, 60:40, etc.) of the hydrocarbon fluid/liquid from the first set of in-series tank to be blended with the hydrocarbon fluid/liquid from the second set of in-series tanks. A flow rate for hydrocarbon fluid/liquid recirculation within at least one of the spillback loops associated with one set of in-series tanks is set at a set point, i.e., to be maintained at a constant or near constant flow rate. After the pumps 1412, 1442 begin pumping a portion of their hydrocarbon liquids/fluids through their respective spillback pipes/loops and the remaining portion of their hydrocarbon liquids/fluids to junction 1452, a controller 1460 may estimate or measure flow rate of the hydrocarbon liquid in the first spillback loop 1440 and/or second spillback loop 1410 associated with the first set of in-series tanks 1403 and second set of in-series tanks 1402, respectively. The flow rate in a spillback pipe/loop may be estimated in proportion to the square root of the pressure differential at the control valve 1448, 1416 over the density or specific gravity (known based on previous analysis of the hydrocarbon liquid or via user input) multiplied by the percentage that the control valve 1448, 1416 is open, as represented by the equation below:

$$\text{Flow Rate} \propto \text{Valve Open Precentage} * \sqrt{\left(\frac{\Delta \text{ Pressure}}{\text{Gravity}}\right)}$$

As will be understood by those skilled in the art, the valve open percentage is a proxy for the cross-sectional area through which the flow passes (i.e., similar to the cross-sectional area of an orifice in an orifice plate), which is a characteristic specific to the control valve 1448, 1416. Based on this estimated/calculated flow rate, the controller 1460 may adjust the control valve 1448 and/or control valve 1416 (open to increase flow rate; close to decrease flow rate) to ensure that the calculated flow rate through the first spillback loop 1440 and/or second spillback loop 1410 matches the established set point. In this way, the measured differential pressure along with the open percentage of the control valve are used to maintain a constant flow rate of the hydrocarbon liquids in the first spillback loop 1440 or in the second spillback loop 1410.

In conjunction with or at the same time as the above-described process, a blend flow meter (e.g., meter 1454) may measure the flow rate of the combined hydrocarbon liquids in blend pipe 1453 downstream of junction 1452 and meter 1420, e.g., connected to second booster pipe 1455 (or another meter disposed at the tank farm 1400) may measure the flow rate of hydrocarbon liquid or liquids from the second series of in-line tanks 1402, which are upstream of junction 1452. While not shown on FIG. 14A, those skilled in the art will recognize that meter 1420 could alternatively be connected to first booster pipe 1457 to measure flow rate of the hydrocarbon fluid/liquid passing from tanks 1403 to junction 1452. As may be understood from FIG. 14A, the difference in flow rate between that measured by the blend flow meter and that measured by meter 1420 is the flow rate originating from the first set of in-series tanks 1403. Based on those measurements and subsequent calculations, the controller 1460 may determine ratios of flow originating from the first set of in-series tanks 1403 (i.e., calculated) and the flow originating from the second set of in-series tanks 1402 (i.e., measured by meter 1420) and compare such ratios against the desired blend ratio. If the calculated blend ratio strays too far (e.g., outside of a set bound, such as greater than 10%, greater than 5%, greater than 2% or even greater than 1%) from the desired blend ratio, then the controller 1460 may adjust the flow in the first spillback loop 1440 (involving the first set of in-series tanks 1403) or second spillback loop 1410 (involving the second set of in-series tanks 1402) by opening or closing the control valve 1448 or the control valve 1410, respectively. Such an adjustment may alter the pressure and/or flow of the hydrocarbon liquid flowing through the second spillback loop 1410 or first spillback loop 1440, such that a greater flow or lesser flow of the hydrocarbon liquid is passed to junction 1452 to blend with the hydrocarbon liquid originating from the first set of in-series tanks 1403 or second set of in-series tanks 1402, as the case may be.

It should be noted that, in one or more embodiments, one or more of the pumps disposed in the tank farm may be a set speed/frequency pump or a variable speed/variable frequency drive (VFD) pump. If the pump is a VFD pump, then the pump may speed up or slow down to increase or decrease, respectively, pressure and/or flow rate, while the control valve in the spillback loop may adjust open percentage in conjunction with the adjusted speed/frequency of the pump to further alter the flow and/or pressure. In another embodiment, the VFD pump may provide for a slow or soft start up to the blending operation. The slow or soft start up may provide for a gradual ramp up of power to the VFD pump, rather than immediately powering up to full power. Any of the pumps disposed throughout the tank farm 1400 may be VFD pumps. For example, and not to be limiting in any way, pump 1430 may connect to VFD 1431, such that the variable speed or frequency allows for thorough mixing of hydrocarbon liquids from tank D 1422, tank E 1424, and tank F 1426.

Figure 14A:
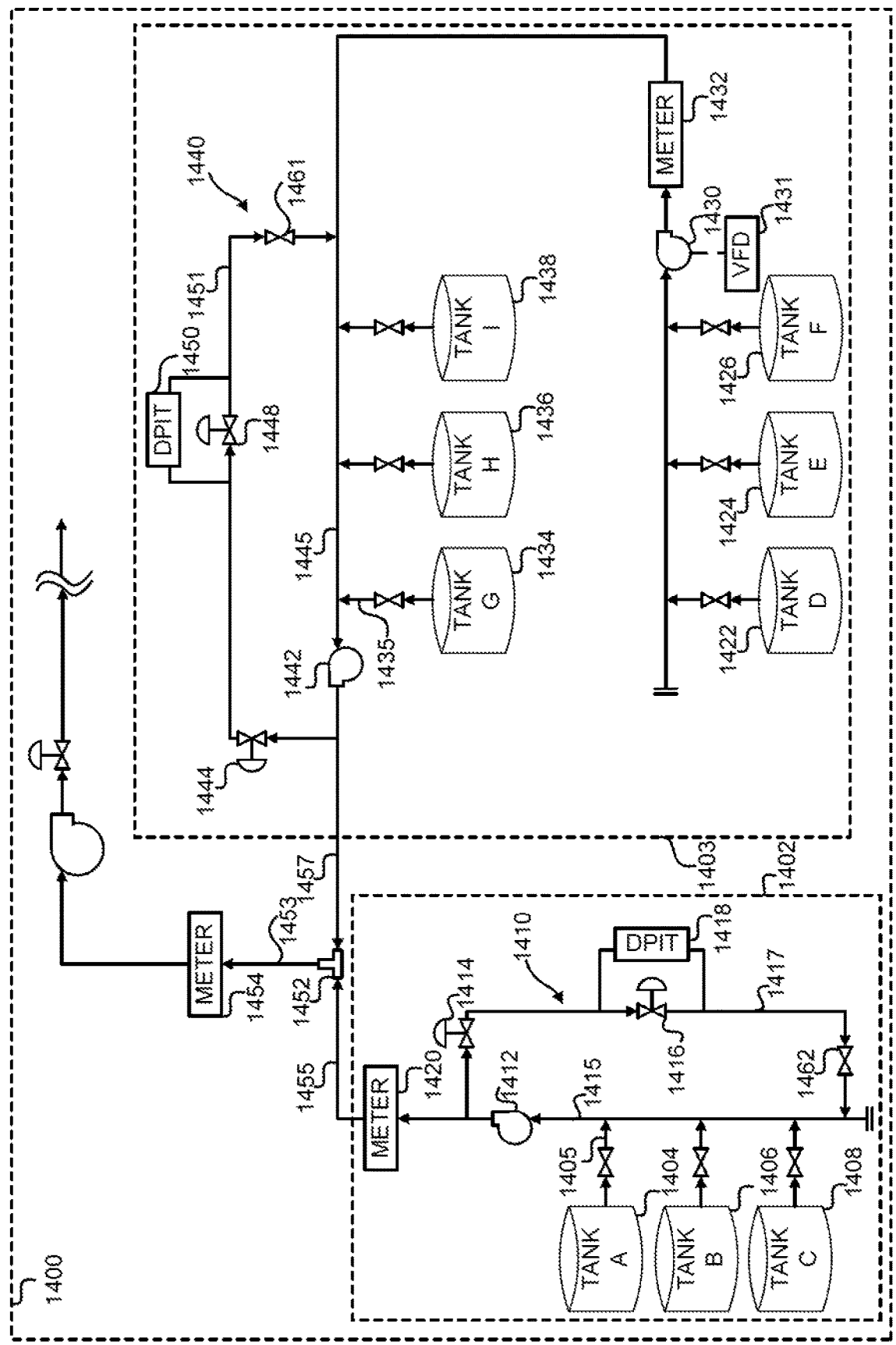
FIGS. 14A, 14B, 14C, and 14D are schematic diagrams of in-line mixing systems positioned at a tank farm to admix two or more hydrocarbon liquids from separate tanks into a single pipeline according to an embodiment of the disclosure.
Figure 14B:
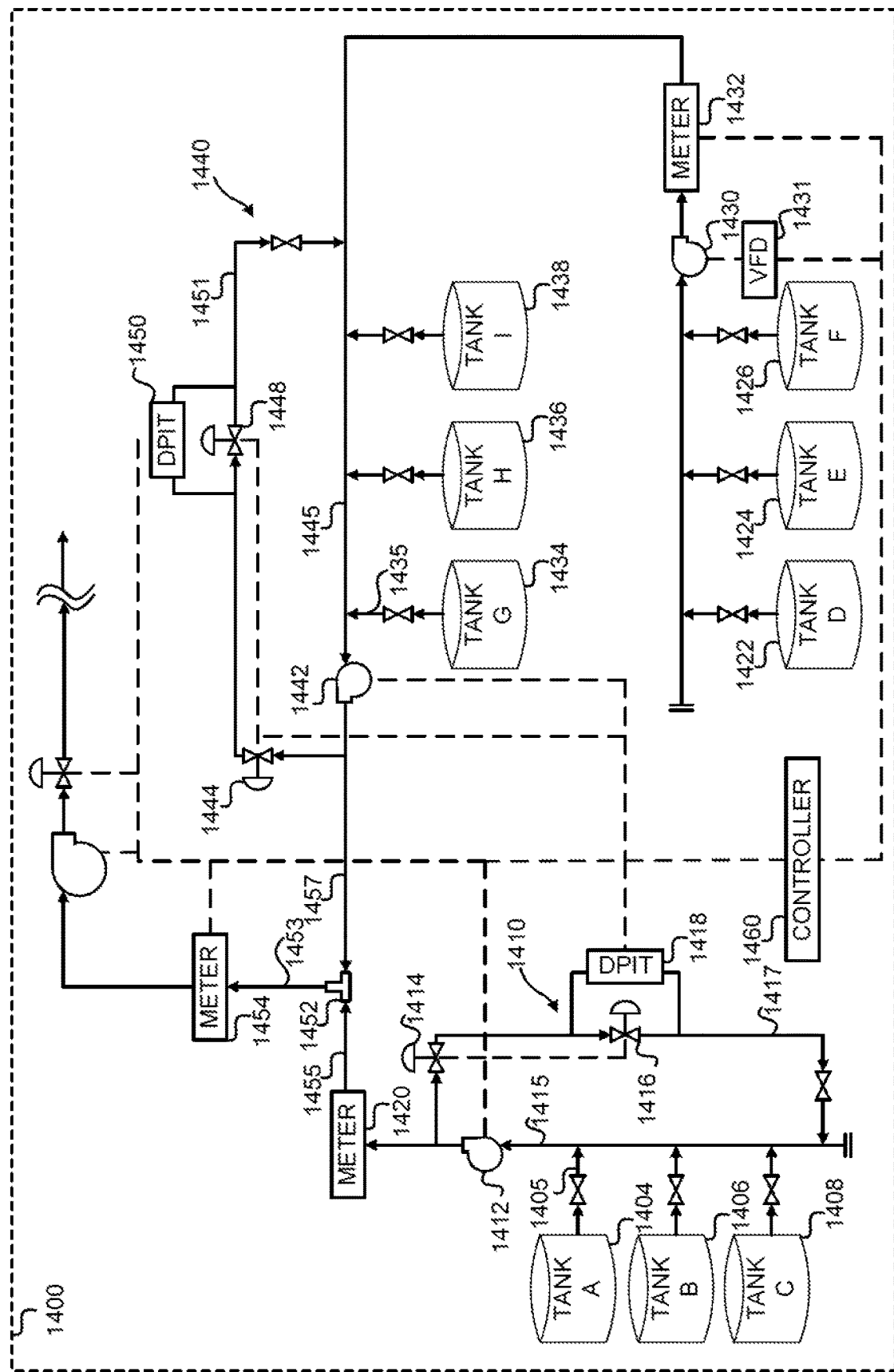
Figure 14C:
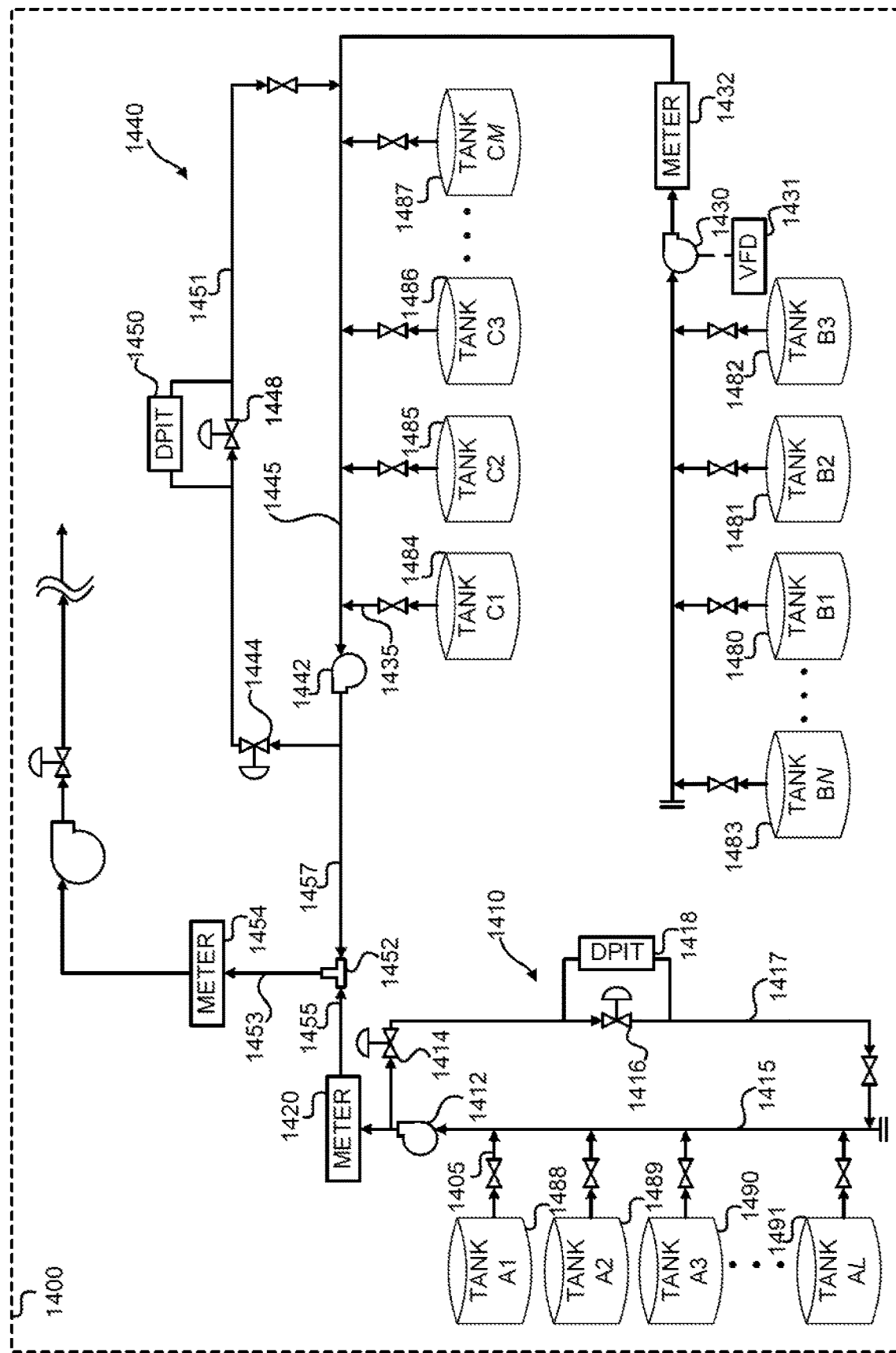

As illustrated in FIGS. 14A and 14B, the tank farm 1400 includes sets of in-line series tanks (e.g., the first set of in-line series tanks 1403 and the second set of in-line series tanks 1402). In another embodiment, and as illustrated in FIG. 14C, the tank farm 1400 may include any number of tanks, based on the physical size of the tank farm and/or cost. In other words, more than just three or six tanks may be included in each set of in-series tanks. For example, the first set of in-series tanks, may include tank B1 1480, tank B2 1481, tank B3 1482, and/or up to tank BN 1483. The first set of in-series tanks may also include tank C1 1484, tank C2 1485, tank C3 1486, and/or up to tank CN 1487. The second set of in-series tanks may include tank A1 1488, tank A2 1489, tank A3 1490, and/or up to tank AL 1491. In another example, other sets of tanks (e.g., in-series, in parallel, and/or individual tanks) with corresponding pumps and spillback loops may be disposed throughout the tank farm 1400 to allow for mixing of two or more hydrocarbon liquid/fluid streams from two or more sets of tanks (e.g., to create two-component, three-component, or other multi-component blends).

Figure 14D:
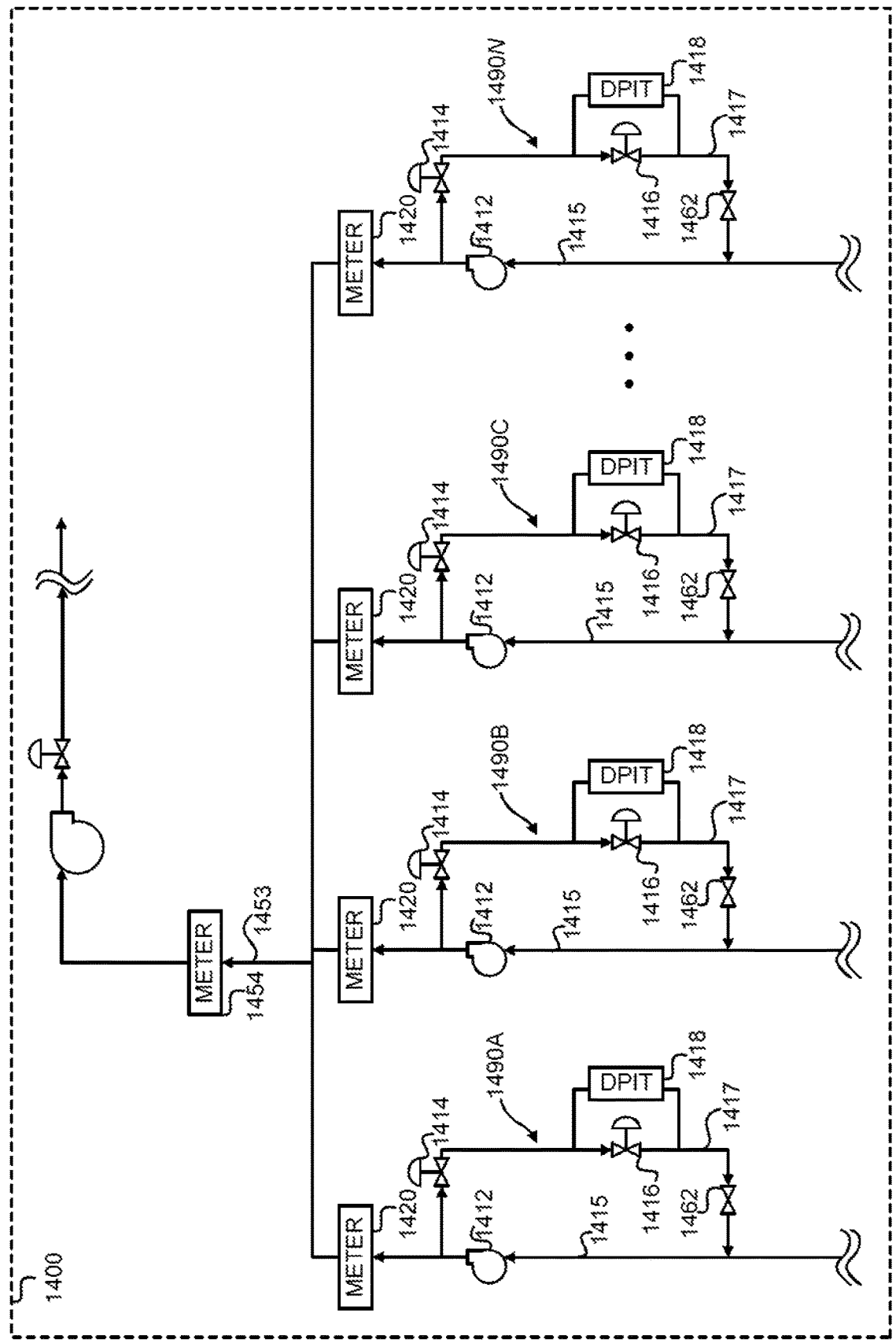

As illustrated in FIG. 14D, the tank farm 1400 may include a plurality of spillback loops to control various flow rates and/or pressure from various hydrocarbon liquid sources. In such embodiments, the tank farm 1400 may include spillback loop A 1490A, spillback loop B 1490B, spillback loop C 1490C, and/or up to spillback loop N 1490N. As illustrated in FIGS. 14A through 14C, each spillback loop may loop around (i.e., be connected to) a number of tanks. In FIG. 14D, each spillback loop may loop around tanks and/or some other hydrocarbon liquid source. For example, a hydrocarbon liquid may flow into the spillback loop 1490A (or any of loops 1490A to 1490N) from a hydrocarbon liquid source that is not a tank or nearby tankage, e.g., a pipeline.

Figure 15:
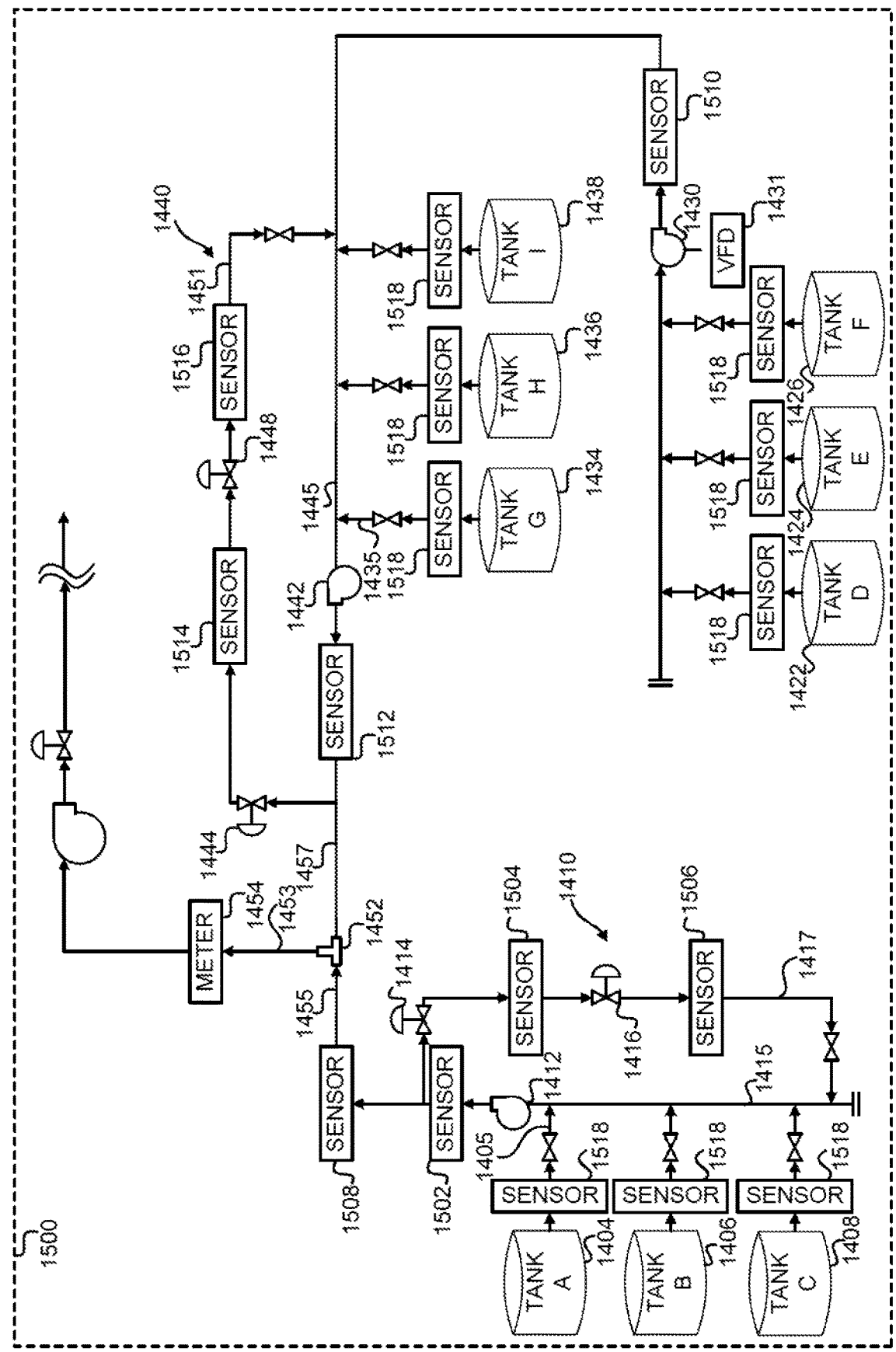
FIG. 15 is a schematic diagram of an in-line mixing system positioned at a tank farm to admix two or more hydrocarbon liquids from separate tanks into a single pipeline according to an embodiment of the disclosure.

FIG. 15 is a schematic diagram of an in-line mixing system positioned at a tank farm 1500 to admix two or more hydrocarbon liquids from separate sets of tanks, e.g., sets of in-series crude tanks, into a single pipeline, according to an embodiment of the disclosure. In one embodiment, sensors 1502, 1504, 1506, 1508, 1510, 1512, 1514, 1516, and 1518 may be associated with and/or connected to pipes throughout the tank farm 1500 to measure various characteristics of hydrocarbon liquids. As illustrated in FIGS. 14A, 14B, 14C, and 14D, the tank farm 1400 may utilize a DPIT (e.g., DPIT 1418 and DPIT 1450) to measure pressure differential across a control valve positioned in a spillback pipe, and using such measurement, estimate/calculate the flow rate of hydrocarbon fluid/liquid flowing through the control valve 1416, 1448. In another embodiment, sensors 1504, 1506 may measure the pressure at their respective locations and may provide a pressure differential (e.g., as shown across control valve 1416) to a controller. In this way, sensor 1504, 1506 may be used to measure pressure differential, rather than or in addition to a DPIT, for flow rate estimation/calculation. Additionally, sensors 1502, 1512 may be utilized to directly measure a flow rate, pressure, density, or gravity. Sensors 1518 may measure or be utilized to determine density, gravity, viscosity, or other characteristics of a hydrocarbon liquid/fluid in a corresponding tank. In one or more embodiments, the sensors may each provide multiple different types of data, such as two or more of flow rate, pressure, density, or gravity. In addition, varying numbers of additional sensors may be associated with and/or connected to pipes and/or tankage throughout the tank farm 1500. For example, one configuration may include sensor 1504 or sensor 1506, but not both. Data gathered from the various sensors may be utilized to adjust control valves 1416, 1448 in their respective spillback pipes and thus the flow rate and pressure of hydrocarbon liquids that flow or recirculate through the respective spillback pipes. In one or more embodiments, at least one of the control valves 1416, 1448 is adjusted on a continuous or semi-continuous basis using such data in order to drive the flow rate or pressure of flow through the control valve towards a set point, i.e., a constant. As previously described, adjustment of the control valves 1416, 1448 regulates the flow or recirculation of hydrocarbon fluids/liquids (i.e., that originated from the respective set of tanks) via the first spillback loop 1440 and/or the second spillback loop 1410. This in turn regulates the portion of hydrocarbon fluid/liquid flow that is pumped by pump 1412, 1442 that enters into the respective spillback pipe (and thus the spillback loop 1410, 1440) versus the portion of hydrocarbon fluid/liquid flow that is pumped by pump 1412, 1442 that continues flowing to junction 1452 or the blend point.

Figure 16:
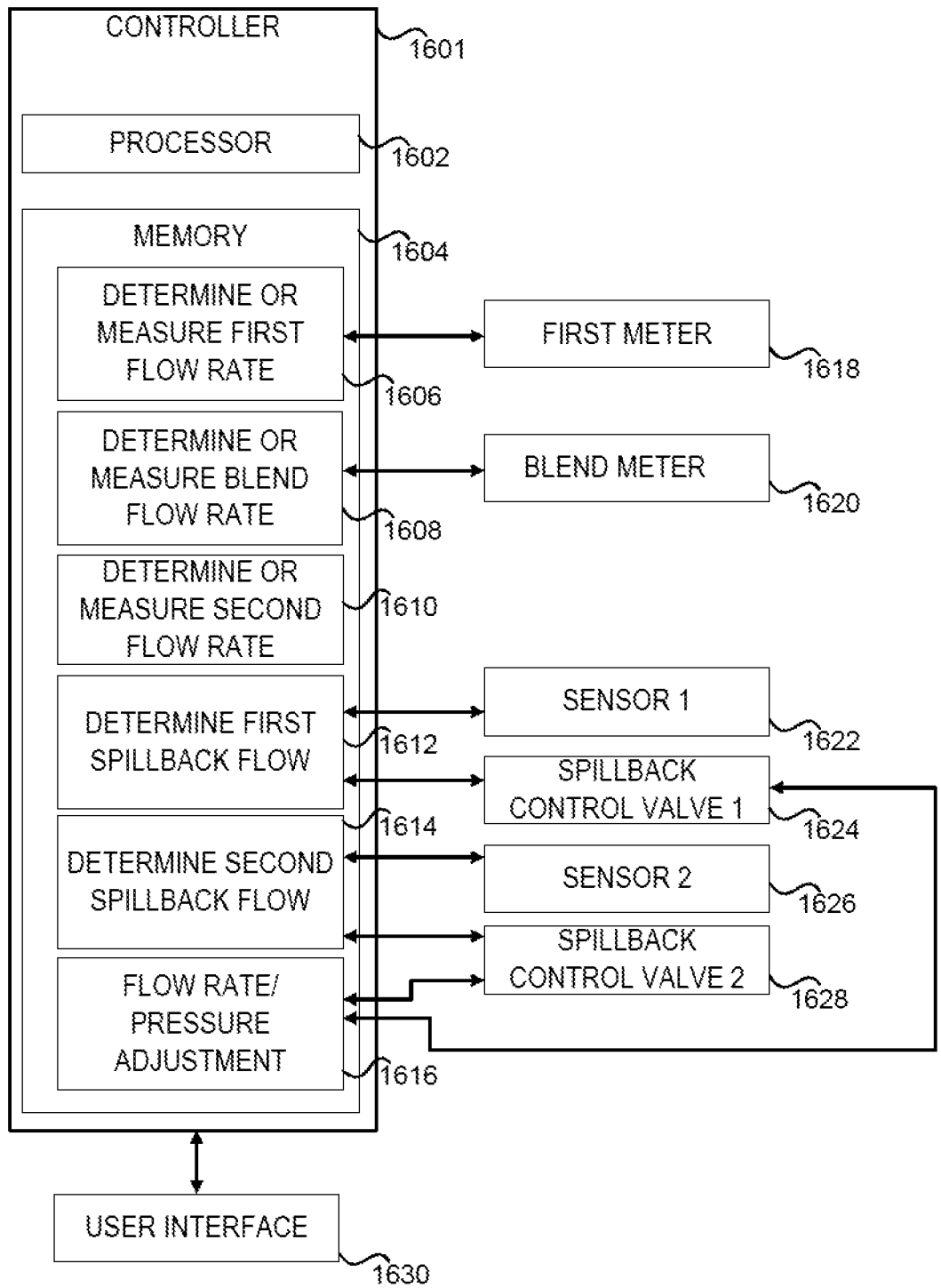
FIG. 16 is a simplified diagram illustrating a control system for managing a multi-component in-line mixing system according to an embodiment of the disclosure.

FIG. 16 is a simplified diagram illustrating a control system for managing a multi-component in-line mixing system according to an embodiment of the disclosure. Similar to the controller described above in relation to FIGS. 9, 10, and 11, controller 1601 may include a processor 1602 or one or more processors. The controller 1601 may include memory 1604 to store instructions. The instructions may be executable by the processor 1602. The instructions may include instructions 1606 to determine or measure a first flow rate. The first flow rate may be a flow rate of a first hydrocarbon liquid from a first set of tanks at a tank farm. The first flow rate may be measured by a first meter 1618, sensor, or a first flow meter. The first meter 1614 may be a clamp on device (i.e., an ultrasonic flow meter) or may be integrated into or with the associated piping.

The instructions may include instructions 1608 to determine or measure a blend flow rate of the blend flow. The blend flow may be the sum of the first flow and a second flow. The second flow rate may be a flow rate of a second hydrocarbon liquid from a second set of tanks at the tank farm. In such examples, the second flow rate may be unknown or estimated. The blend flow rate may be measured by a blend meter 1620, sensor, or blend flow meter. The blend meter 1620 may be a clamp on device (i.e., an ultrasonic flow meter) or integrated into or with the associated piping.

The instructions may include instructions 1610 to determine or estimate the second flow rate of a second hydrocarbon liquid. The second flow rate may be determined based on the first flow rate and the blend flow rate. For example, if the blend flow rate is equal to 10,000 barrels per hour and the first flow rate is 6,000 barrels per hour, then the second flow rate may be determined to be 4,000 barrels per hour. In another example, the second flow rate may be measured by another meter disposed at the tank farm (not shown).

The instructions may include instructions 1612 to determine a first spillback flow rate. In an example, the actual flow rate of the first hydrocarbon liquid may be known. However, the amount of hydrocarbon liquid flowing through an associated spillback pipe may be unknown. To determine the amount of hydrocarbon liquid flowing through the spillback loop (i.e., the spillback pipe), controller 1601 may measure data from sensor 1 1622 and spillback control valve 1 1624. In such examples, the sensor 1 1622 may be a DPIT or a different sensor to measure relevant pressure/flow rate data. The controller 1601 may determine the first spillback loop flow rate as a function of the differential pressure across spillback control valve 1 1624, the density of the hydrocarbon liquid flow through the spillback loop (i.e., across the spillback control valve 1 1624), and the percentage that the spillback control valve 1 1624 is open (among other control valve characteristics as understood by those skilled in the art), as previously described. The controller 1601 may compare the determined first spillback loop flow rate to a desired set point (e.g., user entered value or controller entered value) and then determine whether the flow of hydrocarbon liquid should be increased or decreased across the spillback control valve 1 1624. If such flow is to be increased slightly, then the controller 1601 may determine how much to open the spillback control valve 1 1624 and transmit a signal to the spillback control valve 1 1624 to open to that specified percentage, e.g., the spillback control valve 1 1624 may be opened by a proportional amount. If such flow is to be decreased slightly, then the controller 1601 may determine how much to close the spillback control valve 1 1624 and transmit a signal to the spillback control valve 1 1624 to close to that specified percentage, e.g., the spillback control valve 1 1624 may be closed by a proportional amount. The controller 1601 then, after an optional period of time for the flow through the spillback pipe to attain steady state, again determines the first spillback loop flow rate, compares the determined value to the set point and adjusts the spillback control valve 1 1624 to drive the first spillback loop flow rate toward the set point. In one or more embodiments, the controller 1601 continues to measure the actual flow rate of the first hydrocarbon liquid via first meter 1618, which is the flow of the first hydrocarbon liquid (i.e., in FIG. 14A-B, the first hydrocarbon is the hydrocarbon liquid from either tanks 1402 or tanks 1403 depending on whether the flow meter is disposed in or on the second booster pipe 1455 or the first booster pipe 1457) that flows on toward the blend point (and is not recirculated through the spillback pipe). The controller 1601 may establish the set point for the first spillback flow rate to maintain a spillback flow rate that provides adequate flow of the first hydrocarbon liquid to junction 1452 (FIG. 14A-C) or the blend point, or to maintain a minimum flow through the pump of the spillback loop such that the pump operates in range that extends pump life.

The instructions may include instructions 1614 to determine a second spillback flow. In an example, an estimate flow rate of the second hydrocarbon liquid may be known (e.g. as the difference between the measured flow rate of the blend flow via blend meter 1620 and the measured flow rate of the first hydrocarbon liquid via first meter 1618). However, the amount of hydrocarbon liquid flowing through an associated spillback may be unknown. To determine the amount of hydrocarbon liquid flowing through the spillback loop (i.e., the spillback pipe), controller 1601 may measure data from sensor 2 1626 and spillback control valve 2 1628. In such examples, the sensor 2 1626 may be a DPIT or a different sensor to measure relevant pressure/flow rate data. The controller 1601 may determine the second spillback loop flow rate as a function of the differential pressure across spillback control valve 2 1628, the density of the hydrocarbon liquid flow through the spillback loop (i.e., across the spillback control valve 2 1628), and the percentage that the spillback control valve 2 1628 is open (among other control valve characteristics as understood by those skilled in the art), as previously described. The controller 1601 may compare the determined second spillback loop flow rate to a desired set point (e.g., user entered value or controller entered value) and then determine whether the flow of hydrocarbon liquid should be increased or decreased across the spillback control valve 2 1628. If such flow is to be increased slightly, then controller 1601 may determine how much to close the spillback control valve 2 1628 and transmit a signal to the spillback control valve 2 1628 to close to that specified percentage, e.g., the spillback control valve 2 1628 may be closed by a proportional amount. If such flow is to be decreased slightly, then the controller 1601 may determine how much to close the spillback control valve 2 1628 and transmit a signal to the spillback control valve 2 1628 to close to that specified percentage, e.g., the spillback control valve 2 1628 may be closed by a proportional amount. The controller 1601 then, after an optional period of time for the flow through the spillback pipe to attain steady state, again determines the second spillback loop flow rate, compares the determined value to the set point and adjusts the spillback control valve 2 1628 to drive the second spillback loop flowrate toward the set point.

In one or more embodiments, the controller 1601 may establish the set point for the second spillback flow rate to maintain a spillback flow rate that provides adequate flow of the second hydrocarbon liquid to junction 1452 (FIG. 14A-c) or the blend point, or to maintain a minimum flow through the pump of the spillback loop such that the pump operates in range that extends pump life. In one or more embodiments, the controller 1601 may establish the set point by comparing the first flow rate, the blend flow rate and/or the second flow rate to assess whether the desired ratio of the first hydrocarbon flow to the second hydrocarbon flow is achieved in the blend flow. As will be understood by those skilled in the art, such comparisons may be made by comparing ratios of first hydrocarbon flow rate to blend flow rate, first hydrocarbon flow rate to second hydrocarbon flow rate, second hydrocarbon flow rate to blend flow rate and the like to corresponding, desired ratios in the blend flow. Additionally, pressure or other flow characteristics of the first hydrocarbon liquid flow preceding junction 1452 or the blend point, pressure or other flow characteristics of the second hydrocarbon liquid flow preceding junction 1452 or the blend point, and/or the pressure or other flow characteristics of the blend flow may also be used to determine if the desired ratio of first hydrocarbon liquid to second hydrocarbon liquid is present in the blend flow. Based on such comparisons, the controller 1601 may determine that the flow rate of the second hydrocarbon liquid/fluid at junction 1452 or the blend point should be increased or decreased relative the flow rate of the first hydrocarbon liquid/fluid at junction 1452 or the blend point. The controller 1601 may then determine the magnitude of such flow rate increase or decrease and set the set point of the second spillback flow rate according. Thereafter, the controller 1601 generates and sends one or more signals to the spillback control valve 2 1628 to adjust its open percentage accordingly to drive the spillback loop flow rate toward the new set point (i.e., based on the desired ratio of first to second hydrocarbon in the fluid blend), thereby modifying the spillback loop flow rate and subsequently the flow rate of the second hydrocarbon liquid/ fluid flowing to junction 1452 or the blend point. While FIG. 16 has been described herein with the flow meter measuring the first flow rate (i.e., of the first hydrocarbon liquid flow), the flow rate of the second hydrocarbon liquid flow (i.e., at/preceding junction 1452) being determined as the difference between the measured blend flow rate and the first flow rate, and the first spillback loop flow rate being maintained constant or nearly constant (e.g. being driven toward a set point) while the corresponding set point of the second spillback loop flow rate is adjusted to drive the ratio of the first to second hydrocarbon liquid in the blend flow toward a desired ratio, those skilled in the art will appreciate that the opposite configurations (and other configurations) may be equally employed. Thus, in one or more embodiments, a first flow meter 1618 measures the flow rate of the second hydrocarbon fluid, the flow rate of the first hydrocarbon fluid is determined as the difference between the blend flow rate and the flow rate of the second hydrocarbon fluid, and the second spillback loop flow rate is maintained constant or nearly constant while the corresponding set point of the first spillback loop flow rate is adjusted to drive the ratio of the first to second hydrocarbon liquid in the blend flow toward a desired ratio.

As noted above, the controller 1601 may include instructions 1616 to adjust flow rate and pressure of one or more of spillback control valve 1 1624, spillback control valve 2 1628, or other spillback control valves. The controller 1601 may generate and send signals to the respective control valve to adjust open percentage of the control valve, thereby modifying the flow rate and/or pressure of hydrocarbon flow across the control valve in the spillback loop. For example, if two hydrocarbon liquids from two different tank areas of the tank farm are utilized, then at least one of the spillback control valves at the spillback loop (e.g., spillback control valve 1 1624 and/or spillback control valve 2 1628) associated with those respective tank areas may be adjusted based on a target blend ratio (i.e., the desired or targeted ratio of the first hydrocarbon liquid to the second hydrocarbon liquid in the blend flow), an actual blend ratio, and/or an established set point spillback flow rate. The actual blend ratio may be based on the first flow rate, the estimate of the second flow rate, the blend flow rate, and/or other hydrocarbon liquid data (e.g., density, gravity, etc.). In one or more embodiments, controller 1601 may generate and send signals to each spillback control valve (e.g., spillback control valve 1 1624 and spillback control valve 2 1628) to directly adjust its open percentage based on a difference between the target blend ratio and the actual blend ratio and/or based on an established set point spillback flow rate.

In another example, the controller 1601 may connect to a user interface 1630. A user may input various data points at the user interface 1630, such as a target blend ratio, a density or gravity of any of the hydrocarbon liquids to be mixed/ blended, an amount of respective hydrocarbon liquids to be mixed and/or the type of hydrocarbon liquids to be mixed.

Figure 17:
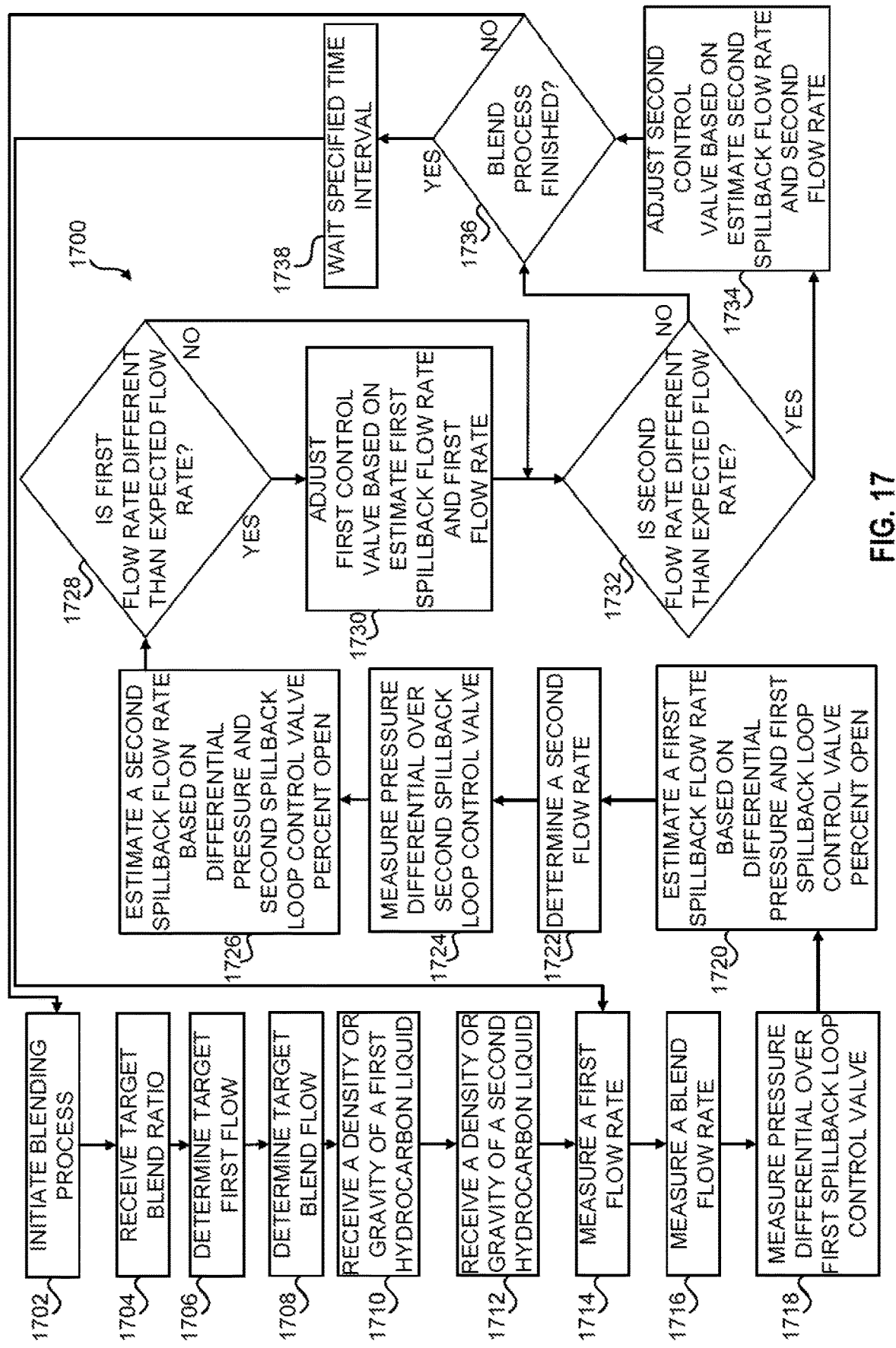
FIG. 17 is a flow diagram, implemented in a controller, for managing a multi-component in-line mixing system according to an embodiment of the disclosure.

FIG. 17 is a flow diagram, implemented in a controller, for managing a multi-component in-line mixing system according to an embodiment of the disclosure. The method 1700 is detailed with reference to the controller 1460 and system 1400 of FIG. 14B. Unless otherwise specified, the actions of method 1700 may be completed within the controller 1460. Specifically, method 1700 may be included in one or more programs, protocols, or instructions loaded into the memory of the controller 1460 and executed on the processor or one or more processors of the controller 1460. The order in which the operations are described is not intended to be construed as a limitation, and any number of the described blocks and/or additional steps may be combined in any order and/or in parallel to implement the methods At block 1702, controller 1460 may initiate a blending or mixing operation or process. In an example, a user may initiate the blending or mixing operation or process at the controller 1460 or at a computing device in signal communication with the controller 1460. In another example, upon initiation, prior to initiation, or after initiation, a user may enter in data or details regarding the blending operation or process, such as a target blend ratio, a density or gravity of any of the hydrocarbon liquids to be mixed/blended, and/or an amount of respective hydrocarbon liquids to be mixed and/or the type of hydrocarbon liquids to be mixed.

At block 1704, the controller 1460 may receive a target blend ratio. The controller 1460 may receive the target blend ratio via a user interface, as described above. The controller 1460 may also be preset with a target blend ratio or may be preset with different selectable target blend ratios. At block 1706, the controller 1460 may determine a target first flow. The target first flow may be the flow rate at which the first flow is set to. In another example, the controller may include a target second flow. At block 1708, the controller 1460 may determine a target blend flow. In an example, the target blend flow may be entered in via a user interface. In another example, the target blend flow may be stored in the controller 1460 or may include a selectable list of target blend flows.

At block 1710, the controller 1460 may receive or determine a density or gravity of the first hydrocarbon liquid. In such examples, a user may enter the density or gravity at a user interface connected to the controller 1460. In another example, sensors may be connected to and/or otherwise associated with pipes and/or tankage throughout the tank farm 1400. In such examples, the sensors may measure the density of each hydrocarbon liquid. Similarly, at block 1712, the controller 1460 may receive or determine a density or gravity associated with the second hydrocarbon liquid.

At block 1714, as the actual blending operation or process begins, a meter (e.g., meter 1420) or sensor may measure a first flow rate of a first hydrocarbon liquid to be blended or mixed. At block 1716, as hydrocarbon liquids are mixed at junction 1452 (or another blend point) and begin to pass through the blend flow pipe (e.g., the mixing pipeline), another meter 1454 may measure the blend flow rate.

At block 1718, the controller 1460 may measure the pressure differential at the control valve 1448 of the spillback loop via a DPIT (e.g., DPIT 1450) or other sensor. At block 1720, the controller 1460 may measure or estimate a first flow of a first hydrocarbon liquid through the first spillback loop 1440 based on the differential pressure over the control valve 1448 at the first spillback loop 1440, the density or gravity of the liquid flowing through the spillback loop, and the open percentage of the control valve 1448.

At block 1722, the controller 1460 may determine a second flow rate based on the measured first flow rate and the measured blend flow rate. At block 1724, the controller 1460 may measure the pressure differential at the control valve 1416 of the spillback loop via a DPIT (e.g., DPIT 1418) or other sensor. At block 1726, the controller 1460 may measure or estimate a second flow of a second hydrocarbon liquid through the second spillback loop 1410 based on the differential pressure over the control valve 1418 at the second spillback loop 1410, the density or gravity of the liquid flowing through the spillback loop, and the open percentage of the control valve 1410.

At block 1728, based on the measured first flow rate, the target first flow rate, and the estimated first spillback flow, the controller 1460 may determine whether to adjust the flow rate of the first hydrocarbon liquid. For example, the controller 1460 may determine to adjust the control valve 1448 based on an established set point for a spillback flow rate (e.g., the flow rate through the first spillback loop 1440) in order to drive the estimated first spillback flow toward the established set point. As described above, the first flow rate and the spillback flow rate may be adjusted via control valve 1448 in the spillback loop (e.g., first spillback loop 1440). At block 1730, if the first flow rate is to be adjusted, e.g., to maintain the flow through the first spillback pipe/loop at a constant flow or driven toward a constant flow, the control valve 1448 at the spillback loop (e.g., first spillback loop 1440) may open or close to some degree, depending on whether the flow rate is to increase or decrease (i.e., opening the control valve 1448 increases spillback flow and decreases first flow rate while closing the control valve 1448 decreases spillback flow and increases first flow rate). Such open percentage may be based on the estimated first spillback flow rate and/or based on the established set point for the first spillback flow rate.

At block 1732, the controller 1460 may determine whether the second flow rate is to be adjusted. The determination may be based on the first flow rate, the second flow rate, the blend flow rate, an actual blend ratio, the target blend ratio, and/or an established set point for the estimated second spillback flow rate. At block 1734, if it is determined that the second flow rate is to be adjusted, e.g., to drive the actual blend toward the target blend ratio, then the control valve 1416 at the spillback loop (e.g., second spillback loop 1410) may open or close to some degree, depending on whether the flow rate is to increase or decrease (i.e., opening the control valve 1416 increases spillback flow and decreases second flow rate while closing control valve 1416 decreases spillback flow and increases second flow rate). In an example, the controller 1460 may determine whether the first flow or the second flow should be adjusted based on the target blend ratio and an actual blend ratio. The actual blend ratio may be determined via the first flow rate, the estimated second flow rate, and/or the blend flow rate or other flow characteristics thereof (e.g., pressure). In another example, and as described above with respect to blocks 1728 and 1730, one of the flow rates (e.g., the first flow rate, the second flow rate, the first spillback flow rate, and/or the second spillback flow rate) may be kept at a constant or near constant value throughout the blending process via spillback control valve adjustments, thus only the other flow rates may be adjusted to control blend ratios.

At block 1736, the controller 1460 may determine whether the blending operation or process is finished or complete. If not, at block 1738, the controller 1460 may wait for a specified time interval or period of time before further adjusting flow rates and/or pressures, e.g., to permit the hydrocarbon liquid flows to achieve steady state or near steady state. If the blending operation or process is finished, the controller 1460 may wait for a new blending operation/process to be initiated or may begin an already queued blending operation/process.

EXPERIMENTAL DATA

Experiments were conducted to test two-component and three-component in-line mixing systems as described herein. Testing was conducted at a pipeline origination station having a tank farm housing various different types of crude oil and other hydrocarbon liquids. In a first blending operation run, two different types of crude were blended using a two-component in-line mixing system (e.g., having a gravity-fed stream containing a first fluid and a controlled feed stream containing a second fluid) with a target mix ratio of 50:50 (second fluid:first fluid). The two-component blending operation run was conducted for three hours with constant measurement of the actual percentage of the controlled feed stream being delivered in the total blended fluid flow (e.g., based on the measured flow rate of the crude oil in the controlled feed stream).

Table 1 includes data from the two-component blending operation run performed at the pipeline origination station. As shown in Table 1, the average actual percentage of the controlled feed stream was 49.87% over the duration of the three-hour two-component blending operation run based on a target set point ratio of 50:50 in the blended fluid flow. As indicated in Table 1, this represents a 0.13% linear difference and a 0.26% percent difference between the actual mix ratio and the target set point mix ratio. It should be noted that the percentage difference between the actual mix ratio and the target mix ratio would be expected to be even lower if the blending operation testing run were to be conducted for a longer duration (e.g., for 6 hours, or 9 hours, or 12 hours, or more).

TABLE 1

| Average Actual Percentage (%) | Target Percentage (%) | Linear Difference (%) | Percent Difference (%) |
|---|---|---|---|
| 49.8684% | 50% | 0.132% | −0.2632% |

In a separate blending operation run, three different types of crude oil were blended using a three-component in-line mixing system (e.g., having a gravity-fed stream containing a first fluid and two controlled feed streams containing a second fluid and a third fluid, respectively) with a target mix ratio of 50:46:4 (third fluid:second fluid:first fluid). The three-component blending operation run was conducted for six hours with constant measurement of the actual percentage of both controlled feed streams being delivered to the total blended fluid flow (e.g., based on the measured flow rate of the crude oil in each of the controlled feed streams).

Table 2 includes data from a blending operation run performed at a pipeline origination station using a three-component in-line mixing system according to the disclosure. As shown in Table 2, the average actual percentage of the third fluid was 49.95% over the duration of the six-hour three-component blending operation run based on a target set point ratio of 50:46:4 (third fluid:second fluid:first fluid) in the blended fluid flow. As indicated in Table 2, this represents a 0.05% linear difference and a 0.09% percent difference between the actual percentage of the third fluid and the target set point percentage of the third fluid. As also shown in Table 2, the average actual percentage of the second fluid was 49.89% over the duration of the six-hour three-component blending operation run based on a target set point ratio of 50:46:4 (third fluid:second fluid:first fluid) in the blended fluid flow. As indicated in Table 2, this represents a 0.11% linear difference and a 0.25% percent difference between the actual percentage of the second fluid and the target set point percentage of the second fluid. It should be noted that the percentage difference between the actual mix percentages and the target mix percentages would be expected to be even lower if the blending operation testing run were to be conducted for a longer duration (e.g., for 9 hours, 12 hours, 15 hours, or more).

TABLE 2

| Average Actual Percentage - Third Fluid (%) | Target Percentage - Third Fluid (%) | Linear Difference (%) | Percent Difference (%) |
|---|---|---|---|
| 49.9547% | 50% | 0.045% | −0.0906% |

| Average Actual Percentage - Second Fluid (%) | Target Percentage - Second Fluid (%) | Linear Difference (%) | Percent Difference (%) |
|---|---|---|---|
| 45.8859% | 46% | 0.114% | −0.2481% |

The present application is a Continuation of U.S. application Ser. No. 17/566,768, filed Dec. 31, 2021, titled "METHODS AND SYSTEMS FOR INLINE MIXING OF HYDROCARBON LIQUIDS BASED ON DENSITY OR GRAVITY", which is a Continuation of U.S. application Ser. No. 17/247,880, filed Dec. 29, 2020, titled "METHODS AND SYSTEMS FOR INLINE MIXING OF HYDROCARBON LIQUIDS BASED ON DENSITY OR GRAVITY", now U.S. Pat. No. 11,247,184, issued Feb. 15, 2022, which is a Continuation-in-Part of U.S. application Ser. No. 17/247,700, filed Dec. 21, 2020, titled "METHODS AND SYSTEMS FOR INLINE MIXING OF HYDROCARBON LIQUIDS BASED ON DENSITY OR GRAVITY", which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", and, the disclosures of which are incorporated herein by reference in their entirety. U.S. application Ser. No. 17/247,880 is further a Continuation-in-Part of U.S. application Ser. No. 17/247,704, filed Dec. 21, 2020, titled "METHODS AND SYSTEMS FOR INLINE MIXING OF HYDROCARBON LIQUIDS", now U.S. Pat. No. 10,990,114, issued Apr. 27, 2021, which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entirety.

In the drawings and specification, several embodiments of systems and methods to provide in-line mixing of hydrocarbon liquids have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. An in-line liquid mixing system to admix one or more of hydrocarbon liquids, petroleum liquids, or renewable liquids from a plurality of tanks into a single pipeline, the in-line liquid mixing system comprising:

a first set of tanks, one or more tanks of the first set of tanks containing a first liquid of the one or more hydrocarbon liquids, petroleum liquids, or renewable liquids therein, each tank in the first set of tanks connected to and in liquid flow communication with a first header, thereby to transport a flow of the first liquid from the first set of tanks;

a second set of tanks, one or more tanks containing a second liquid of the one or more hydrocarbon liquids, petroleum liquids, or renewable liquids therein, each tank in the second set of tanks connected to and in liquid flow communication with a second header, thereby to transport a flow of the second liquid from the second set of tanks;

one or more first pumps each having an inlet and an outlet, the outlet of each of the one or more first pumps connected to one or more first booster pipes and the inlet of each of the one or more first pumps connected to the first header, thereby to increase pressure of liquid flow therethrough;

one or more second pumps each having an inlet and an outlet, the outlet of each of the one or more second pumps connected to one or more second booster pipes and the inlet of the one or more second pumps connected to the second header, thereby to increase pressure of the liquid flow therethrough;

one or more flow meters connected to one or more of: (a) the one or more first booster pipes, or (b) the one or more second booster pipes, thereby to measure a flow rate;

one or more spillback pipes each having one or more control valves positioned to adjust a flow rate of liquid flow through the one or more spillback pipes between one or more of: (a) the one or more first booster pipes and the first header, or (b) the one or more second booster pipes and the second header;

one or more blend pipes configured to admix liquid that flows from the one or more first booster pipes downstream of the one or more flow meters with liquid that flows through the one or more second booster pipes downstream, thereby to create a blend flow; and one or more blend meters connected to the one or more blend pipes, thereby to measure flow rate of the blend flow through the one or more blend pipes.

2. The in-line liquid mixing system of claim 1, wherein the one or more spillback pipes comprise: (a) a first spillback pipe having a first connection to the one or more first booster pipes positioned between a first flow meter of the one or more flow meters and the one or more first pumps and a second connection to the first header upstream of the first set of tanks, the first spillback pipe including a first control valve of the one or more control valves, the first control valve configured to adjust a flow rate of liquid flow through the first spillback pipe between the one or more first booster pipes and the first header, and (b) a second spillback pipe having a first connection to the second booster pipe downstream of the second pump and a second connection to the second header upstream of the second set of tanks, the second spillback pipe including a second control valve of the one or more control valves, the second control valve configured to adjust a flow rate of liquid flow through the second spillback pipe between the one or more second booster pipes and the second header.

3. The in-line liquid mixing system of claim 2, wherein the first spillback pipe includes a first differential pressure transmitter (DPIT) positioned to measure differential pressure of liquid flow upstream and downstream of the first control valve and the second spillback pipe includes a second DPIT positioned to measure differential pressure of liquid flow upstream and downstream of the second control valve.

4. The in-line liquid mixing system of claim 3, further comprising one or more controllers in signal communication with each of the first control valve and the second control valve, and wherein the one or more controllers controls an open percentage of the first control valve to adjust the flow rate of the liquid flow through the first spillback pipe and thereby the first flow rate.

5. The in-line liquid mixing system of claim 4, wherein the one or more controllers further is positioned in signal communication with the one or more flow meters, the first DPIT, and the second DPIT, wherein the one or more controllers determines the flow rate of liquid through the first spillback pipe based on the differential pressure measured by the first DPIT, and wherein the one or more controllers determines the flow rate of liquid through the second spillback pipe based on the differential pressure measured by the second DPIT.

6. The in-line liquid mixing system of claim 2, further comprising one or more controllers in signal communication with each of the first control valve and the second control valve, and wherein the one or more controllers controls an open percentage of the first control valve to adjust the flow rate of the liquid flow through the first spillback pipe and thereby the first flow rate.

7. The in-line liquid mixing system of claim 2, further comprising one or more controllers in signal communication with each of the first control valve and the second control valve, and wherein the one or more controllers controls an open percentage of the second control valve to adjust the flow rate of liquid flow through the second spillback pipe and thereby a ratio of first flow rate to blend liquid flow rate.

8. The in-line liquid mixing system of claim 2, further comprising one or more controllers in signal communication with each of the first control valve and the second control valve, and wherein the one or more controllers adjusts the first control valve to drive the flow rate of the liquid flow through the first spill back pipe toward a first set point flow rate.

9. The in-line liquid mixing system of claim 8, further comprising one or more controllers in signal communication with each of the first control valve and the second control valve, and wherein the one or more controllers adjusts the second control valve to drive the flow rate of the liquid flow through the first spill back pipe toward a second set point flow rate.

10. The in-line liquid mixing system of claim 2, further comprising one or more controllers in signal communication with each of the first control valve and the second control valve, and wherein the one or more controllers adjusts at least one of the first control valve or the second control valve, thereby to drive a ratio of first flow rate to blend liquid flow rate toward a set point.

11. A method of admixing one or more hydrocarbon liquids, petroleum liquids, or renewable liquids from a plurality of sets of tanks into a single pipeline to provide in-line mixing thereof, the method comprising:

initiating a blending process that includes blending two or more liquids of the one or more of the hydrocarbon liquids, petroleum liquids, or renewable liquids over a period of time, at least one of the two or more liquids being stored in a tank of a first set of tanks and at least another of the two or more liquids being stored in a tank of a second set of tanks, each tank of the first and second sets of tanks being connected to one or more blend pipes; thereby to blend the two or more liquids into a blended liquid;

determining a density of each of the two or more liquids to be blended during the blending process;

upon initiation of the blending process:
determining a first flow rate of the one or more liquids flowing from the first set of tanks into the one or more blend pipes,
determining a blend flow rate of the blended liquid in the one or more blend pipes,
determining a second flow rate of the one or more liquids flowing from the second set of tanks into the one or more blend pipes,
determining a first spillback flow rate of a flow of the one or more liquids from the first set of tanks when recirculated in a first spillback loop positioned upstream of the one or more blend pipes,
determining a second spillback flow rate of a flow of the one or more liquids from the second set of tanks when recirculated in a second spillback loop positioned upstream of the one or more blend pipes; and
responsive to a difference between a target ratio and a ratio of the first flow rate and the second flow rate:
determining ratio adjustments for the first flow rate relative to the second flow rate, and
adjusting one or more control valves based on the ratio adjustments, thereby to modify the first spillback flow rate and the first flow rate so as to drive the ratio towards the target ratio.

12. The method of claim 11, wherein the determining the first spillback flow rate is based on a function of at least density of the one or more liquids that flow from the first set of tanks and a differential pressure upstream and downstream of one or more flow control valves connected to the first spillback loop, and wherein the determining the second spillback flow rate is based on a function of at least density of the one or more liquids that flow from the second set of tanks and a differential pressure upstream and downstream of one or more control valves connected to the second spillback loop.

13. The method of claim 11, wherein at least one of first flow rate or the second flow rate is determined based on the blend flow rate.

14. The method of claim 11, wherein the flow of the one or more fuel liquids from the first set of tanks that is recirculated in the first spillback loop enters the first spillback loop downstream of a first pump and upstream of the blend pipe, and wherein the flow of the one or more liquids from the second set of tanks that is recirculated in the second spillback loop enters the second spill back loop downstream of a second pump and upstream of the blend pipe.

15. The method of claim 12, wherein the differential pressure upstream and downstream of the one or more control valves connected to the first spillback loop is determined by a first DPIT, and wherein the differential pressure upstream and downstream of the one or more control valves connected to the second spillback loop is determined by a second DPIT.

16. The method of claim 12, further comprising adjusting the one or more control valves, thereby to drive the second spillback flow rate towards a set point.

17. A controller for an in-line mixing system for admixing one or more of hydrocarbon liquids, petroleum liquids, or renewable liquids from a plurality of sets of tanks into a single pipeline via spillback loops, the controller comprising:
an input/output configured to:
(1) receive a target blend ratio of a first liquid of the one or more hydrocarbon liquids, petroleum liquids, or renewable liquids to a second liquid of the one or more hydrocarbon liquids, petroleum liquids, or renewable liquids,
(2) receive a first density of the first liquid, and
(3) receive a second density of the second liquid;
a first input in signal communication with a first meter to measure a first flow rate of the first liquid, the first meter being connected to a first pipe that is connected to a first set of tanks of a tank farm, one or more tanks of the first set of tanks being configured to store the first liquid of the first density and to transfer the first liquid from the first set of tanks through the first pipe, the controller configured to obtain the first flow rate from the first meter via the first input;
a second input in signal communication with a blend meter connected to a blend pipe to measure a blend flow rate of a blended liquid, the blended liquid being the first liquid entering the blend pipe from the first set of tanks and the second liquid entering the blend pipe from a second set of tanks, the blend pipe being connected to the first set of tanks via the first pipe and to the second set of tanks via a second pipe, one or more tanks of the second set of tanks being configured to store the second liquid of the second density and to transfer the second liquid from the second set of tanks through the second pipe, the controller configured to obtain the blend flow rate from the blend meter via the second input;
a first input/output in signal communication with a first flow control device, the first flow control device designed to adjust recirculation of the first liquid, thereby modifying the first flow rate, the controller further configured to:
determine whether the first flow rate is to be modified based on at least two of the first flow rate, the blend flow rate, or the target blend ratio, and
in response to a determination that the first flow rate is to be modified:
adjust an open percentage of the first flow control valve that
adjusts recirculation of the first liquid, thereby to modify the first flow rate; and
a second input/output in signal communication with a second flow control device, the second flow control device designed to adjust recirculation of the second liquid, the controller configured to:
determine whether flow of the second liquid into the blend pipe is to be modified based on at least two of the first flow rate, the blend flow rate, or the target blend ratio, and
in response to a determination that flow of the second liquid into the blend pipe is to be modified:
adjust the open percentage of the second flow control valve that adjusts recirculation of the second liquid, thereby to modify flow of the second liquid into the blend pipe.

18. The controller of claim 17, wherein the open percentage of the first flow control valve is adjusted, thereby to drive the first flow rate toward a set point.

19. The controller of claim 17, wherein adjustment of the open percentage of the second flow control valve modifies flow of the second liquid into the blend pipe and drives blend ratio of the first liquid to second liquid in the blend pipe towards the target blend ratio.

20. The controller of claim 17, wherein a first flow rate is determined based on the density of the first liquid, a differential pressure across the first control valve, and open percentage of the first control valve, and wherein a second flow rate is determined based on the density of the second liquid, a differential pressure across the second control valve, and open percentage of the second control valve.

21. The controller of claim 20, wherein differential pressure is measured via one or more of: (a) at least one DPIT, or (b) at least one pressure sensor.

22. A method of admixing one or more hydrocarbon liquids or renewable liquids from a plurality of sets of tanks into a single pipeline to provide in-line mixing thereof, the method comprising:
initiating a blending process that includes blending two or more liquids of the one or more of the hydrocarbon liquids or renewable liquids over a period of time, at least one of the two or more liquids being stored in a tank of a first set of tanks and at least another of the two or more liquids being stored in a tank of a second set of tanks, each tank of the first and second sets of tanks being connected to one or more blend pipes; thereby to blend the two or more liquids into a blended liquid;
determining a density of each of the two or more liquids to be blended;
after initiation of the blending process:
determining a first flow rate of the one or more liquids flowing from the first set of tanks into the one or more blend pipes,
determining a blend flow rate of the blended liquid in the one or more blend pipes, determining a second flow rate of the one or more liquids flowing from the second set of tanks into the one or more blend pipes, determining a first spillback flow rate of a flow of the one or more liquids from the first set of tanks when recirculated in a first spillback loop positioned upstream of the one or more blend pipes, determining a second spillback flow rate of a flow of the one or more liquids from the second set of tanks when recirculated in a second spillback loop positioned upstream of the one or more blend pipes; and responsive to a difference between a target ratio and a ratio of the first flow rate and the second flow rate:
  determining ratio adjustments for the first flow rate relative to the second flow rate, and
  adjusting one or more control valves based on the ratio adjustments, thereby to modify the first spillback flow rate and the first flow rate so as to drive the ratio towards the target ratio.

23. The method of claim 22, wherein the determining the first spillback flow rate is based on a function of at least density of the one or more liquids that flow from the first set of tanks and a differential pressure upstream and downstream of one or more flow control valves connected to the first spillback loop, and wherein the determining the second spillback flow rate is based on a function of at least density of the one or more liquids that flow from the second set of tanks and a differential pressure upstream and downstream of one or more control valves connected to the second spillback loop.

24. The method of claim 22, wherein at least one of first flow rate or the second flow rate is determined based on the blend flow rate.

25. The method of claim 22, wherein the flow of the one or more fuel liquids from the first set of tanks that is recirculated in the first spillback loop enters the first spillback loop downstream of a first pump and upstream of the blend pipe, and wherein the flow of the one or more liquids from the second set of tanks that is recirculated in the second spillback loop enters the second spill back loop downstream of a second pump and upstream of the blend pipe.

26. The method of claim 23, wherein the differential pressure upstream and downstream of the one or more control valves connected to the first spillback loop is determined by a first DPIT, and wherein the differential pressure upstream and downstream of the one or more control valves connected to the second spillback loop is determined by a second DPIT.

27. The method of claim 23, further comprising adjusting the one or more control valves, thereby to drive the second spillback flow rate towards a set point.

28. A method of admixing one or more renewable liquids from a plurality of sets of tanks into a single pipeline to provide in-line mixing thereof, the method comprising:
  initiating a blending process that includes blending two or more liquids of the one or more of the renewable liquids over a period of time, at least one of the two or more liquids being stored in a tank of a first set of tanks and at least another of the two or more liquids being stored in a tank of a second set of tanks, each tank of the first and second sets of tanks being connected to one or more blend pipes; thereby to blend the two or more liquids into a blended liquid;
  determining a density of each of the two or more liquids to be blended;
  after initiation of the blending process:
    determining a first flow rate of the one or more liquids flowing from the first set of tanks into the one or more blend pipes,
    determining a blend flow rate of the blended liquid in the one or more blend pipes,
    determining a second flow rate of the one or more liquids flowing from the second set of tanks into the one or more blend pipes,
    determining a first spillback flow rate of a flow of the one or more liquids from the first set of tanks when recirculated in a first spillback loop positioned upstream of the one or more blend pipes,
    determining a second spillback flow rate of a flow of the one or more liquids from the second set of tanks when recirculated in a second spillback loop positioned upstream of the one or more blend pipes; and
    responsive to a difference between a target ratio and a ratio of the first flow rate and the second flow rate:
      determining ratio adjustments for the first flow rate relative to the second flow rate, and
      adjusting one or more control valves based on the ratio adjustments, thereby to modify the first spillback flow rate and the first flow rate so as to drive the ratio towards the target ratio.

29. The method of claim 28, wherein the determining the first spillback flow rate is based on a function of at least density of the one or more liquids that flow from the first set of tanks and a differential pressure upstream and downstream of one or more flow control valves connected to the first spillback loop, and wherein the determining the second spillback flow rate is based on a function of at least density of the one or more liquids that flow from the second set of tanks and a differential pressure upstream and downstream of one or more control valves connected to the second spillback loop.

30. The method of claim 28, wherein at least one of first flow rate or the second flow rate is determined based on the blend flow rate.

31. The method of claim 28, wherein the flow of the one or more fuel liquids from the first set of tanks that is recirculated in the first spillback loop enters the first spillback loop downstream of a first pump and upstream of the blend pipe, and wherein the flow of the one or more liquids from the second set of tanks that is recirculated in the second spillback loop enters the second spill back loop downstream of a second pump and upstream of the blend pipe.

32. The method of claim 29, wherein the differential pressure upstream and downstream of the one or more control valves connected to the first spillback loop is determined by a first DPIT, and wherein the differential pressure upstream and downstream of the one or more control valves connected to the second spillback loop is determined by a second DPIT.

33. The method of claim 29, further comprising adjusting the one or more control valves, thereby to drive the second spillback flow rate towards a set point.

* * * * *